(12) United States Patent
Huang et al.

(10) Patent No.: US 12,501,561 B2
(45) Date of Patent: Dec. 16, 2025

(54) FOLDABLE SUPPORT PLATE, FLEXIBLE DISPLAY MODULE, AND FOLDABLE ELECTRONIC DEVICE

(71) Applicant: HUAWEI TECHNOLOGIES CO., LTD., Guangdong (CN)

(72) Inventors: Lizhong Huang, Dongguan (CN); Fujia Chen, Shenzhen (CN); Changyong Wang, Shanghai (CN); Yaoxu Zhao, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 198 days.

(21) Appl. No.: 18/547,283

(22) PCT Filed: Dec. 8, 2021

(86) PCT No.: PCT/CN2021/136370
§ 371 (c)(1),
(2) Date: Aug. 21, 2023

(87) PCT Pub. No.: WO2022/174654
PCT Pub. Date: Aug. 25, 2022

(65) Prior Publication Data
US 2024/0155788 A1 May 9, 2024

(30) Foreign Application Priority Data
Feb. 22, 2021 (CN) .......................... 202110198143.8

(51) Int. Cl.
*H05K 5/02* (2006.01)
*E05D 1/02* (2006.01)
(52) U.S. Cl.
CPC ............. *H05K 5/0217* (2013.01); *E05D 1/02* (2013.01); *E05Y 2999/00* (2024.05)

(58) Field of Classification Search
CPC .......................... H05K 5/0017; H05K 5/0217
(Continued)

(56) References Cited

U.S. PATENT DOCUMENTS

2005/0156525 A1 7/2005 Joo et al.
2014/0226275 A1* 8/2014 Ko ........................ G06F 1/1601
361/679.27
(Continued)

FOREIGN PATENT DOCUMENTS

CN 202013461 U 10/2011
CN 108335638 A 7/2018
(Continued)

OTHER PUBLICATIONS

International Search Report and Written Opinion in International Appln. No. PCT/CN2021/136370, mailed on Feb. 9, 2022, 22 pages (with English translation).
(Continued)

*Primary Examiner* — Hung S. Bui
(74) *Attorney, Agent, or Firm* — Fish & Richardson P.C.

(57) ABSTRACT

This application prides relates to a foldable support plate, a flexible display module, and a foldable electronic device. In an example, a foldable support plate includes a first support portion, a foldable support portion, and a first transition support portion. When the foldable support plate is folded, the first support portion is in a flat state. The foldable support portion is in a bent state when the foldable support plate is folded. The first transition support portion is connected between the first support portion and the foldable support portion. A bending radian of the first transition support portion is less than a bending radian of the foldable support portion when the foldable support plate is folded.

26 Claims, 26 Drawing Sheets

(58) Field of Classification Search
USPC .......................................... 361/807, 809, 810
See application file for complete search history.

(56) References Cited

U.S. PATENT DOCUMENTS

| | | | |
|---|---|---|---|
| 2019/0132987 A1* | 5/2019 | Koo | ........................ H05K 7/18 |
| 2021/0274663 A1 | 9/2021 | Yu et al. | |

FOREIGN PATENT DOCUMENTS

| | | | | |
|---|---|---|---|---|
| CN | 110518039 A | * | 11/2019 | ............... G09F 9/30 |
| CN | 110767096 A | * | 2/2020 | ............. G09F 9/301 |
| CN | 110853520 A | | 2/2020 | |
| CN | 111316344 A | | 6/2020 | |
| CN | 210835505 U | | 6/2020 | |
| CN | 111445796 A | * | 7/2020 | ........... B32B 27/283 |
| CN | 111508371 A | | 8/2020 | |
| CN | 111653204 A | | 9/2020 | |
| CN | 211928943 U | * | 11/2020 | ........... G06F 1/1601 |
| CN | 112489564 A | | 3/2021 | |
| CN | 113763814 A | | 12/2021 | |
| KR | 20190003257 A | | 1/2019 | |
| WO | 2020105794 A1 | | 5/2020 | |

OTHER PUBLICATIONS

Extended European Search Report in European Appln. No. 21926368.8, mailed on May 24, 2024, 9 pages.

\* cited by examiner

FOLDABLE SUPPORT PLATE, FLEXIBLE DISPLAY MODULE, AND FOLDABLE ELECTRONIC DEVICE

CROSS-REFERENCE TO RELATED APPLICATIONS

This application is a National Stage of International Application No. PCT/CN2021/136370 filed on Dec. 8, 2021, which claims priority to Chinese Patent Application No. 202110198143.8 filed on Feb. 22, 2021. Both of the aforementioned applications are hereby incorporated by reference in their entireties.

TECHNICAL FIELD

This application relates to the field of electronic devices, and more specifically, to a foldable support plate, a flexible display module, and a foldable electronic device.

BACKGROUND

A user has an increasingly high requirement for an electronic device that has a large size and is easy to carry. Therefore, an electronic device having a foldable flexible display (namely, a foldable electronic device) has received widespread attention. The flexible display may be unfolded when being used, to provide a larger display area. The flexible display may be folded and closed when not being used, to reduce space occupied by the foldable electronic device.

When using the foldable electronic device, the user may usually frequently fold the foldable electronic device. Therefore, there is a need to improve mechanical stability of the foldable electronic device, such as anti-extrusion performance and bending performance. Common methods for improving mechanical stability may introduce other problems, for example, may increase a total weight of the foldable electronic device and affect radio frequency performance of the foldable electronic device.

SUMMARY

This application provides a foldable support plate, a flexible display module, and a foldable electronic device, to improve comprehensive performance of the foldable support plate, the flexible display module, and the foldable electronic device.

According to a first aspect, a foldable support plate is provided. The foldable support plate is configured to be attached to a flexible display. The foldable support plate includes:
  a first support portion, where when the foldable support plate is folded, the first support portion is in a flat state;
  a foldable support portion, where when the foldable support plate is folded, the foldable support portion is in a bent state, and the foldable support portion is provided with a plurality of through grooves; and
  a first transition support portion, where the first transition support portion is connected between the first support portion and the foldable support portion, when the foldable support plate is folded, a bending radian of the first transition support portion is less than a bending radian of the foldable support portion, and the first transition support portion is provided with a plurality of groove structures.

In this application, the foldable support plate is provided with the first transition support portion, so that two support portions of the foldable support plate can be relatively closely attached against each other. In other words, there is relatively small space between the two support portions. When a user places a foldable electronic device in, for example, a pocket or a bag, a small object in the pocket or the bag is relatively difficult to fall into the space between the two support portions. This helps improve an effect of protecting the flexible display.

In addition, the foldable support plate is provided with the transition support portion, and a folding radius R of the foldable support portion can be relatively large. With a relatively large folding radius R, an inward folded side of the flexible display is extruded to a relatively small degree and is not prone to wrinkles, and a plurality of layers of components in the flexible display are relatively difficult to be separated from each other. Consequently, a service life of the flexible display is relatively long. The relatively large folding radius R helps reduce bending stress of the foldable support portion, and further helps improve bending performance and a bending fatigue life of the foldable support portion.

In addition, the groove structures help reduce an external force required to bend the transition support portion and help improve bending performance of the foldable support plate.

With reference to the first aspect, in some implementations of the first aspect, the groove structures are blind grooves or through grooves.

When the foldable support portion is in the bent state, the first transition support portion may be slightly bent, and a bending degree may be relatively small. Disposing the blind grooves at positions with a relatively small bending degree can reduce the external force required to bend the first transition support portion and help enable the first transition support portion to have enough support for the flexible display. Therefore, the bending performance and anti-extrusion performance of the foldable support plate can both be addressed.

With reference to the first aspect, in some implementations of the first aspect, the through groove of the foldable support portion includes a first groove and a second groove that are connected with each other. The first groove and the blind groove of the first transition support portion are located on the same side of the foldable support portion. A depth of the first groove is less than a depth of the second groove.

In this application, an etching speed of the blind groove may be faster than an etching speed of the through groove. Therefore, when etching of the blind groove is completed, etching of the through groove may not be completed. If the depth of the first groove is different from the depth of the second groove, duration of first etching of the through groove can be different from duration of second etching. This helps reduce processing difficulty of the through groove.

With reference to the first aspect, in some implementations of the first aspect, the through groove of the foldable support portion includes the first groove. The first groove forms a first end opening on a first end surface of the foldable support portion. At the first end opening, an included angle between a groove wall of the first groove and the first end surface is an obtuse angle.

In this application, the included angle between the groove wall of the first groove and the first end surface is set to an obtuse angle. This helps reduce a force of the end opening of the through groove to poke an adhesive layer and a filling material around the foldable support plate, and prolong a service life of the foldable electronic device.

With reference to the first aspect, in some implementations of the first aspect, an end opening shape of the through groove includes a first end opening, a second end opening, and a strip opening. The strip opening is connected between the first end opening and the second end opening. A width of the first end opening and a width of the second end opening are both greater than a width of the strip opening. A proportion of a length of the strip opening to a length of the through groove is greater than a preset proportion.

In this application, the end opening of the through groove is set to be dumbbell-shaped. This helps reduce peak stress generated at a position of the through groove. In addition, a relatively small width of the strip opening helps improve an anti-extrusion capability of the foldable support portion of the foldable support plate. Properly adjusting the end opening shape of the through groove helps coordinate the bending performance and anti-extrusion performance of the foldable support plate, and further helps prolong the bending fatigue life of the foldable support plate and the foldable electronic device. For example, the bending fatigue life may exceed 200,000 times.

Because the strip opening may be relatively long, a proportion of a length of a solid region to a length of a through groove A or a through groove B may be relatively small. This helps improve bending performance of the foldable support portion, helps reduce bending stress of the first end opening and the second end opening, and helps reduce stress concentration of the first end opening and the second end opening. When the proportion of the length of the solid region to the length of the through groove is fixed, a relatively small absolute length of the solid region leads to a relatively poor effect of supporting the flexible display by the solid region, that is, is not beneficial to the anti-extrusion performance of the foldable support portion. A relatively large absolute length of the solid region leads to a relatively good effect of supporting the flexible display by the solid region, that is, helps improve the anti-extrusion performance of the foldable support portion. The proportion of the length of the solid region to the length of the through groove may be, for example, less than 0.1.

Optionally, the preset proportion may be, for example, 0.7 to 0.9.

In an example, the width of the strip opening may be approximately 60% to 110% of a thickness of the support plate base, for example, may be approximately 70% to 90°% of the thickness of the support plate base.

In an example, the width of the strip opening may be approximately 0.1-0.15 mm, for example, may be approximately 0.12 mm.

In an example, the width of the first end opening may be approximately 0.16-2.2 mm, for example, may be approximately 0.19-0.2 mm.

With reference to the first aspect, in some implementations of the first aspect, the foldable support plate further includes local plating and a third groove. The local plating and the third groove are disposed opposite to each other on two sides of the foldable support plate.

In this application, the third groove is processed in the foldable support plate. This helps balance internal stress of the support plate base, and further helps improve surface flatness of the support plate base and flatness of the flexible display.

With reference to the first aspect, in some implementations of the first aspect, a proportion of a depth of the third groove to a thickness of the local plating is 0.2 to 0.7.

In this application, a larger thickness of the local plating indicates a larger depth of the third groove.

With reference to the first aspect, in some implementations of the first aspect, a width of the third groove is greater than a width of the local plating.

In this application, the width of the third groove is greater than the width of the local plating, so that a balance degree of the internal stress of the support plate base can be improved. For example, processing the third groove may remove a part of an oxide layer of the foldable support plate and reduce residual tensile stress on the foldable support plate. In addition, processing the third groove further helps counteract protrusion deformation caused by the local plating.

With reference to the first aspect, in some implementations of the first aspect, the width of the local plating is less than 2 mm.

In this application, a larger size of the local plating indicates that the back of the support plate base is more prone to a protrusion, and it is easier for a user to observe a film print on the flexible display in a screen-off state.

With reference to the first aspect, in some implementations of the first aspect, the local plating includes nickel plating, nickel sulfamate plating, and gold plating that are stacked. The nickel sulfamate plating is connected between the nickel plating and the gold plating.

In this application, the nickel plating may be configured to strengthen a bonding force between the support plate base and the nickel sulfamate plating. Internal stress of the nickel sulfamate plating is usually relatively small. This helps improve mechanical stability of the local plating. The gold plating features good electrical conductivity and good abrasion resistance. Because the gold plating has good electrical conductivity, impedance of the local plating is relatively small, and relatively small pressure is required for a spring plate to press against the local plating. Therefore, a deformation degree of the support plate base near the local plating is relatively small. This helps improve the flatness of the flexible display. In addition, reducing the impedance further helps reduce an RSE value of the foldable electronic device. In addition, because the gold plating has good abrasion resistance, fine shaking between the spring plate and the gold plating is not easy to generate powder. This helps improve stability of the local plating.

With reference to the first aspect, in some implementations of the first aspect, the foldable support plate further includes a fourth groove. The fourth groove and the third groove are disposed on two sides of the foldable support plate. The local plating is disposed in the fourth groove.

In this application, the fourth groove is processed in the foldable support plate. This helps remove a part of the oxide layer of the foldable support plate and increase a bonding force between the local plating and the foldable support plate.

With reference to the first aspect, in some implementations of the first aspect, the foldable support plate includes a support plate base. The support plate base is configured to form the first support portion, the foldable support portion, and the first transition support portion. The support plate base includes:

a first base portion and a second base portion that are stacked, where rigidity of the first base portion is higher than rigidity of the second base portion, and a thickness of the first base portion is greater than a thickness of the second base portion.

In this application, if a relatively soft side of the support plate base is pasted to the flexible display, flatness of the flexible display is improved; or if a relatively hard side of the support plate base is pasted to the flexible display, an anti-extrusion capability of the flexible display is improved.

In this application, the first base portion with high yield strength and high toughness and the second base portion with high thermal conductivity or low density are combined through stacking, splicing, lapping, inlaying, or the like, so that requirements for the support plate base, such as lightweight, high thermal conductivity, high modulus, low impedance, high bonding force, and salt spray resistance, can be met in a targeted manner, to help meet diversified requirements for the foldable support plate. In addition, the support plate base provided in this embodiment of this application helps reduce the weight of the foldable support plate. For example, for the foldable electronic device including the 8-inch flexible display, the weight of the foldable support plate may be, for example, approximately 12-13 g.

With reference to the first aspect, in some implementations of the first aspect, the support plate base further includes:

a third base portion, where the third base portion and the second base portion are located on two sides of the first base portion, the rigidity of the first base portion is higher than rigidity of the third base portion, and the thickness of the first base portion is greater than a thickness of the third base portion.

In this application, a relatively soft side of the support plate base is pasted to the flexible display. This helps improve flatness of the flexible display. In addition, the support plate base is easier to achieve both lightweight and high thermal conductivity.

With reference to the first aspect, in some implementations of the first aspect, the foldable support plate includes a support plate base. The support plate base is configured to form the first support portion, the foldable support portion, and the first transition support portion. The support plate base includes:

a first base portion and a second base portion, where the first base portion and the second base portion correspond to different regions of the foldable support plate, the first base portion is configured to form at least the foldable support portion, the second base portion is configured to form at least the first support portion, and rigidity of the first base portion is higher than rigidity of the second base portion.

In this application, a portion corresponding to a bendable region of the foldable support plate is made of a relatively hard material with relatively high strength or rigidity. This helps improve the bending performance of the foldable support plate in a local region. A portion corresponding to a flat region of the foldable support plate is made of a relatively soft material with relatively low strength or rigidity. In other words, a material with high bending performance may not be used in a region that does not need to be bent. This helps take into account other performance (such as lightweight and heat dissipation performance) of the foldable support plate.

With reference to the first aspect, in some implementations of the first aspect, a surface that is of the first base portion and that faces the second base portion is a first side surface. An exposed surface of the first base portion includes a first end surface. The first side surface is provided with a first protrusion and a first groove. The second base portion includes a second groove that matches the first protrusion and a second protrusion that matches the first groove. When the foldable support plate is unfolded, the first side surface is perpendicular to the first end surface.

In this application, the matching of the protrusions and the grooves helps reduce stress concentration of an interface under an external force. A larger contact area of the protrusions and the grooves is more beneficial to increasing the bonding force of the interface.

With reference to the first aspect, in some implementations of the first aspect, a surface that is of the first base portion and that faces the second base portion is a first side surface. An exposed surface of the first base portion is a first end surface. When the foldable support plate is unfolded, an included angle between the first side surface and the first end surface is greater than 0° and less than 90°.

In this application, the included angle between the first side surface and the first end surface is adjusted. This helps increase a bonding force between two adjacent base portions. In addition, the support plate base may be obtained through hot pack rolling. Therefore, flatness of the interface between the first base portion and the second base portion may be relatively high.

With reference to the first aspect, in some implementations of the first aspect, the second base portion includes a base groove. The first base portion is accommodated in the base groove.

In this application, the first base portion is disposed in the groove of the second base portion. This helps improve a bonding force between the first base portion and the second base portion. In addition, the foldable support portion of the foldable support plate can take into account both material properties of the first base portion and material properties of the second base portion.

With reference to the first aspect, in some implementations of the first aspect, surfaces that are of the first base portion and that face the second base portion include a first side surface and a first end surface. When the foldable support plate is unfolded, an included angle between the first side surface and the first end surface is greater than 0° and less than 90°.

In this application, the included angle between the first side surface and the first end surface is adjusted. This helps increase a bonding force between two adjacent base portions. In addition, the support plate base may be obtained through hot pack rolling. Therefore, flatness of the interface between the first base portion and the second base portion may be relatively high.

With reference to the first aspect, in some implementations of the first aspect, the foldable support plate includes a support plate base. The support plate base is configured to form the first support portion, the foldable support portion, and the first transition support portion. The support plate base includes:

a first base portion, where the first base portion is configured to form the first support portion, the foldable support portion, and the first transition support portion, and the first base portion further includes a first recess; and a second base portion, where the second base portion is disposed in the first recess, and the second base portion is configured to form at least the first support portion.

In this application, the second base portion is disposed in the recess of the first base portion. The flat region of the foldable support plate can take into account both material properties of the first base portion and properties of the second base portion.

With reference to the first aspect, in some implementations of the first aspect, surfaces that are of the first base portion and that face the second base portion include a first recess surface and a first side surface. When the foldable support plate is unfolded, an included angle between the first side surface and the first recess surface is greater than 0° and less than 180°.

In this application, the included angle between the first side surface and the first recess surface is adjusted. This helps increase a bonding force between two adjacent base portions. In addition, the support plate base may be obtained through hot pack rolling. Therefore, flatness of the interface between the first base portion and the second base portion may be relatively high.

With reference to the first aspect, in some implementations of the first aspect, the first base portion further includes a second recess. The first recess and the second recess are located at a same end of the first base portion and on two sides of the first base portion. The first recess and the second recess are in opposite recess directions. The support plate base further includes:

a third base portion, where the third base portion is disposed in the second recess, and the third base portion is configured to form at least the first support portion.

In this application, a relatively soft side of the support plate base is pasted to the flexible display. This helps improve flatness of the flexible display. In addition, the flat region of the support plate base is easier to achieve high strength, lightweight, and high thermal conductivity.

With reference to the first aspect, in some implementations of the first aspect, the first base portion and the second base portion are made of one or two of the following materials: titanium, titanium alloy, stainless steel, aluminum alloy, copper alloy, nickel alloy, magnesium alloy, titanium-based amorphous alloy, zirconium-based amorphous alloy, iron-based amorphous alloy, a titanium-copper composite material, a titanium-aluminum composite material, a titanium-steel composite material, nickel-titanium memory alloy, a steel-copper composite material, a steel-aluminum composite material, a copper-titanium-copper composite material, granular titanium-based reinforcing alloy, granular steel-based reinforcing alloy, granular aluminum-based reinforcing alloy, granular copper-based reinforcing alloy, granular nickel-based reinforcing alloy, granular magnesium-based reinforcing alloy, fibrous titanium-based reinforcing alloy, fibrous steel-based reinforcing alloy, fibrous aluminum-based reinforcing alloy, fibrous copper-based reinforcing alloy, fibrous nickel-based reinforcing alloy, and fibrous magnesium-based reinforcing alloy.

In this application, using the aluminum alloy on the basis of the titanium alloy helps further reduce a weight of the foldable support plate. Using the copper alloy on the basis of the titanium alloy helps improve heat dissipation performance of the foldable support plate, and reduce a probability that the flexible display and another component in the foldable electronic device are overheated.

With reference to the first aspect, in some implementations of the first aspect, the foldable support plate further includes:

a third transition support portion, where the third transition support portion is connected between the first transition support portion and the foldable support portion, and when the foldable support plate is folded, the third transition support portion is in the flat state; or the third transition support portion is in the bent state, and a bending radian of the third transition support portion is less than the bending radian of the first transition support portion and the bending radian of the foldable support portion.

In this application, the third transition support portion may play a transition role between a (slightly) outward bent state of the first transition support portion and an inward bent state of the foldable support portion. This helps provide enough support for the flexible display.

With reference to the first aspect, in some implementations of the first aspect, the foldable support plate further includes:

a second support portion, where the second support portion and the first support portion are located on two sides of the foldable support portion, when the foldable support plate is folded, the second support portion is in the flat state, and the second support portion and the first support portion are disposed in parallel.

In this application, a region that is of the foldable electronic device and that is relatively away from a foldable region may have a relatively small thickness, to lay a foundation for reducing a thickness of the foldable electronic device.

According to a second aspect, a foldable support plate is provided. The foldable support plate is configured to be attached to a flexible display. The foldable support plate includes:

a first support portion and a second support portion, where when the foldable support plate is folded, both the first support portion and the second support portion are in a flat state; and a foldable support portion, where the foldable support portion is connected between the first support portion and the second support portion, and when the foldable support plate is folded, the foldable support portion is in a bent state.

The first support portion is provided with local plating and a third groove. The local plating and the third groove are disposed opposite to each other on two sides of the foldable support plate.

With reference to the second aspect, in some implementations of the second aspect, a proportion of a depth of the third groove to a thickness of the local plating is 0.2 to 0.7.

With reference to the second aspect, in some implementations of the second aspect, a width of the third groove is greater than a width of the local plating.

With reference to the second aspect, in some implementations of the second aspect, the width of the local plating is less than 2 mm.

With reference to the second aspect, in some implementations of the second aspect, the local plating includes nickel plating, nickel sulfamate plating, and gold plating that are stacked. The nickel sulfamate plating is connected between the nickel plating and the gold plating.

According to a third aspect, a foldable support plate is provided. The foldable support plate is configured to be attached to a flexible display. The foldable support plate includes:

a first support portion, where when the foldable support plate is folded, the first support portion is in a flat state;

a foldable support portion, where when the foldable support plate is folded, the foldable support portion is in a bent state; and a plurality of through grooves, where the through grooves are disposed in the foldable support portion, the through grooves each include a first groove, the first groove forms a first end opening on a first end surface of the foldable support portion, and at the first end opening, an included angle between a groove wall of the first groove and the first end surface is an obtuse angle.

According to a fourth aspect, a foldable support plate is provided. The foldable support plate is configured to be attached to a flexible display. The foldable support plate includes:
- a first support portion, where when the foldable support plate is folded, the first support portion is in a flat state.
- a foldable support portion, where when the foldable support plate is folded, the foldable support portion is in a bent state; and
- a plurality of through grooves, where the through grooves are disposed in the foldable support portion, an end opening shape of the through groove includes a first end opening, a second end opening, and a strip opening, the strip opening is connected between the first end opening and the second end opening, a width of the first end opening and a width of the second end opening are both greater than a width of the strip opening, and a proportion of a length of the strip opening to a length of the through groove is greater than a preset proportion.

According to a fifth aspect, a foldable support plate is provided. The foldable support plate is configured to be attached to a flexible display. The foldable support plate includes:
- a support plate base, where the support plate base is configured to form a first support portion and a foldable support portion of the foldable support plate, and when the foldable support plate is folded, the first support portion is in a flat state, and the foldable support portion is in a bent state; and the support plate base includes:
  - a first base portion, where the first base portion is configured to form at least the foldable support portion; and
  - a second base portion, where the second base portion is configured to form at least the first support portion, and rigidity of the second base portion is lower than rigidity of the first base portion.

With reference to the fifth aspect, in some implementations of the fifth aspect, the first base portion and the second base portion are stacked. The first base portion is further configured to form the first support portion. The second base portion is further configured to form the foldable support portion. A thickness of the first base portion is greater than a thickness of the second base portion.

With reference to the fifth aspect, in some implementations of the fifth aspect, the support plate base further includes:
- a third base portion, where the third base portion and the second base portion are located on two sides of the first base portion, the rigidity of the first base portion is higher than rigidity of the third base portion, and the thickness of the first base portion is greater than a thickness of the third base portion.

With reference to the fifth aspect, in some implementations of the fifth aspect, the first base portion and the second base portion correspond to different regions of the foldable support plate.

With reference to the fifth aspect, in some implementations of the fifth aspect, a surface that is of the first base portion and that faces the second base portion is a first side surface. An exposed surface of the first base portion includes a first end surface. The first side surface is provided with a first protrusion and a first groove. The second base portion includes a second groove that matches the first protrusion and a second protrusion that matches the first groove. When the foldable support plate is unfolded, the first side surface is perpendicular to the first end surface.

With reference to the fifth aspect, in some implementations of the fifth aspect, a surface that is of the first base portion and that faces the second base portion is a first side surface. An exposed surface of the first base portion is a first end surface. When the foldable support plate is unfolded, an included angle between the first side surface and the first end surface is greater than 0° and less than 90°.

With reference to the fifth aspect, in some implementations of the fifth aspect, the second base portion includes a base groove. The first base portion is accommodated in the base groove.

With reference to the fifth aspect, in some implementations of the fifth aspect, surfaces that are of the first base portion and that face the second base portion include a first side surface and a first end surface. When the foldable support plate is unfolded, an included angle between the first side surface and the first end surface is greater than 0° and less than 90°.

With reference to the fifth aspect, in some implementations of the fifth aspect, the first base portion is further configured to form the first support portion. The first base portion further includes a first recess. The second base portion is disposed in the first recess.

With reference to the fifth aspect, in some implementations of the fifth aspect, surfaces that are of the first base portion and that face the second base portion include a first recess surface and a first side surface. When the foldable support plate is unfolded, an included angle between the first side surface and the first recess surface is greater than 0° and less than 1800.

With reference to the fifth aspect, in some implementations of the fifth aspect, the first base portion further includes a second recess. The first recess and the second recess are located at a same end of the first base portion and on two sides of the first base portion. The first recess and the second recess are in opposite recess directions. The support plate base further includes:
- a third base portion, where the third base portion is disposed in the second recess, and the third base portion is configured to form at least the first support portion.

With reference to the fifth aspect, in some implementations of the fifth aspect, the first base portion and the second base portion are made of one or two of the following materials: titanium, titanium alloy, stainless steel, aluminum alloy, copper alloy, nickel alloy, magnesium alloy, titanium-based amorphous alloy, zirconium-based amorphous alloy, iron-based amorphous alloy, a titanium-copper composite material, a titanium-aluminum composite material, a titanium-steel composite material, nickel-titanium memory alloy, a steel-copper composite material, a steel-aluminum composite material, a copper-titanium-copper composite material, granular titanium-based reinforcing alloy, granular steel-based reinforcing alloy, granular aluminum-based reinforcing alloy, granular copper-based reinforcing alloy, granular nickel-based reinforcing alloy, granular magnesium-based reinforcing alloy, fibrous titanium-based reinforcing alloy, fibrous steel-based reinforcing alloy, fibrous aluminum-based reinforcing alloy, fibrous copper-based reinforcing alloy, fibrous nickel-based reinforcing alloy, and fibrous magnesium-based reinforcing alloy.

According to a sixth aspect, a flexible display module is provided, including a flexible display and the foldable support plate according to any one of the possible implementations of the first aspect to the fifth aspect. The flexible display is attached to the foldable support plate.

According to a seventh aspect, a foldable electronic device is provided, including a flexible display and the foldable support plate according to any one of the possible implementations of the first aspect to the fifth aspect. The flexible display is attached to the foldable support plate.

DESCRIPTION OF EMBODIMENTS

The following describes the technical solutions of this application with reference to the accompanying drawings.

Figure 1:
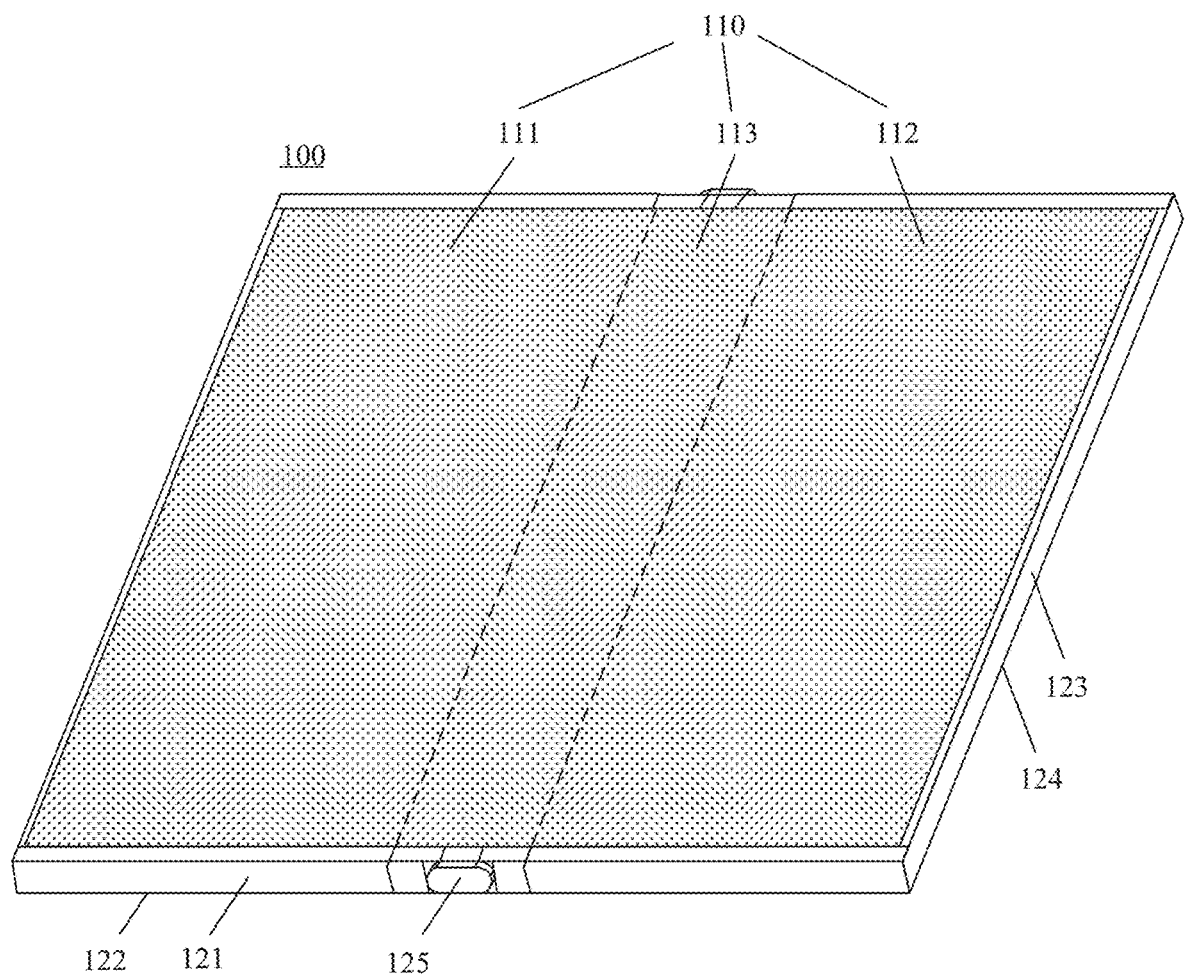
FIG. 1 is a schematic diagram of a structure of a foldable electronic device according to an embodiment of this application.

FIG. 1 is a schematic diagram of a structure of a foldable electronic device 100 according to an embodiment of this application. The foldable electronic device 100 may be an electronic device having a folding function, such as a mobile phone, a tablet computer, a watch, an e-reader, a notebook computer, or a wearable device. In the embodiment shown in FIG. 1, a foldable mobile phone is used as an example for description.

With reference to FIG. 1, the foldable electronic device 100 may include a flexible display 110, a first side frame 121, a first cover 122, a second side frame 123, a second cover 124, and a hinge mechanism 125. The first side frame 121, the first cover 122, the second side frame 123, and the second cover 124 may form a housing of the flexible display 110.

A pattern filled with an electric array in FIG. 1 may schematically represent the flexible display 110. The flexible display 110 may feature strong flexibility and bendability, and may provide a user with a new interaction manner based on bendability. For example, a display panel of the flexible display 110 may be any one of a flexible liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flexible light-emitting diode, FLED), a quantum dot light-emitting diode (quantum dot light emitting diode, QLED), and the like. This is not limited in this embodiment of this application.

The flexible display 110 may include a first display portion 111 corresponding to the first cover 122, a second display portion 112 corresponding to the second cover 124, and a foldable display portion 113 corresponding to the hinge mechanism 125. The foldable display portion 113 may be connected between the first display portion 111 and the second display portion 112.

The first side frame 121 may surround a periphery of the first cover 122 and a periphery of the first display portion 111. The first display portion 111 may be parallel to and spaced apart from the first cover 122. The first display portion 111 and the first cover 122 may be located on two sides of the first side frame 121. Space between the first display portion 111 and the first cover 122 may be used to dispose a component of the foldable electronic device 100, such as an antenna or a circuit board component.

The second side frame 123 may surround a periphery of the second cover 124 and a periphery of the second display portion 112. The second display portion 112 may be parallel to and spaced apart from the second cover 124. The second display portion 112 and the second cover 124 may be located on two sides of the second side frame 123. Space between the second display portion 112 and the second cover 124 may be used to dispose a component of the foldable electronic device 100, such as an antenna or a circuit board component.

In an embodiment provided in this application, the cover and the side frame may be two parts of the housing of the foldable electronic device 100. The cover and the side frame may be connected. A manner of the connection may not be an assembly manner such as clamping, adhesion, welding, riveting, or clearance fitting. The connection between the cover and the side frame is usually difficult to break. In another embodiment provided in this application, the cover and the side frame may be two different components. The housing of the foldable electronic device 100 may be formed by assembling the cover and the side frame.

The hinge mechanism 125 may be connected between the first cover 122 and the second cover 124. The foldable display portion 113 of the flexible display 110 may be fastened to the hinge mechanism 125. Under an action of the hinge mechanism 125, the first cover 122 and the second cover 124 may be close to or away from each other. Correspondingly, the first display portion 111 of the flexible display 110 and the second display portion 112 of the flexible display 110 may be close to or away from each other, so that the flexible display 110 may be folded or unfolded.

In an example, the hinge mechanism 125 may include, for example, a spindle component, a first hinge component, and a second hinge component. The first hinge component may be fastened to the first cover 122. The second hinge component may be fastened to the second cover 124. The first hinge component and the second hinge component may rotate relative to the spindle component. Mutual movement between the first hinge component and the second hinge component may drive mutual movement between the first cover 122 and the second cover 124, to implement an opening and closing function of the foldable electronic device 100.

The foldable electronic device 100 shown in FIG. 1 is currently unfolded. In the unfolded state, an angle between the first cover 122 and the second cover 124 may be approximately 180°. The flexible display 110 may be in the unfolded state shown in FIG. 1.

Figure 2:
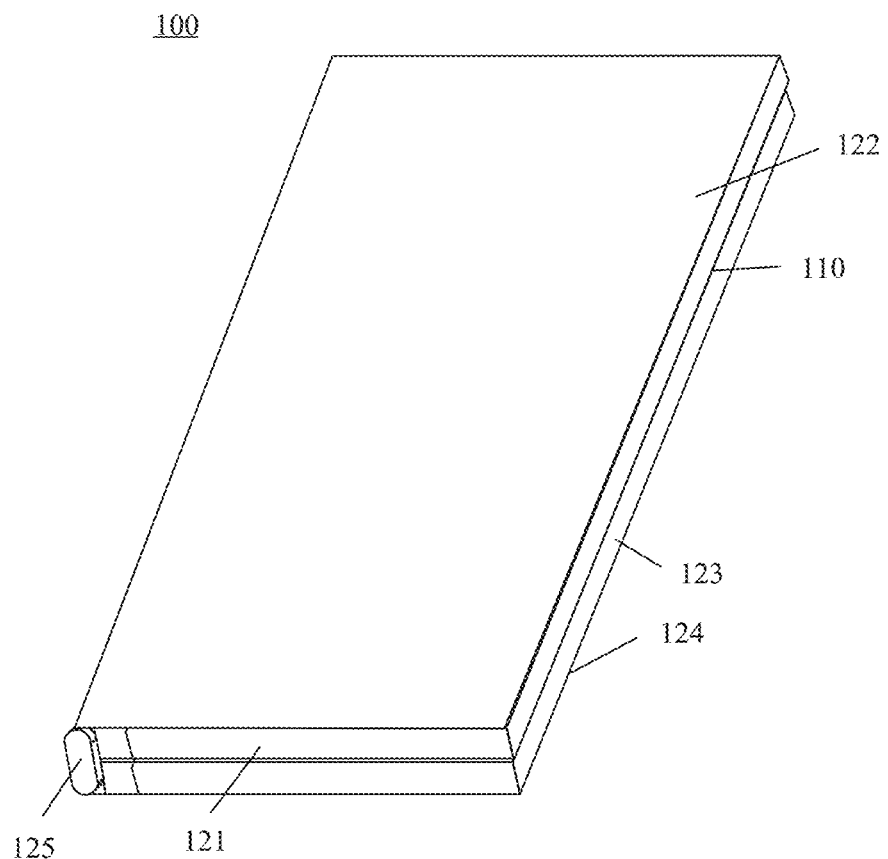
FIG. 2 is a schematic diagram of a structure of a foldable electronic device that is folded inward.
Figure 3:
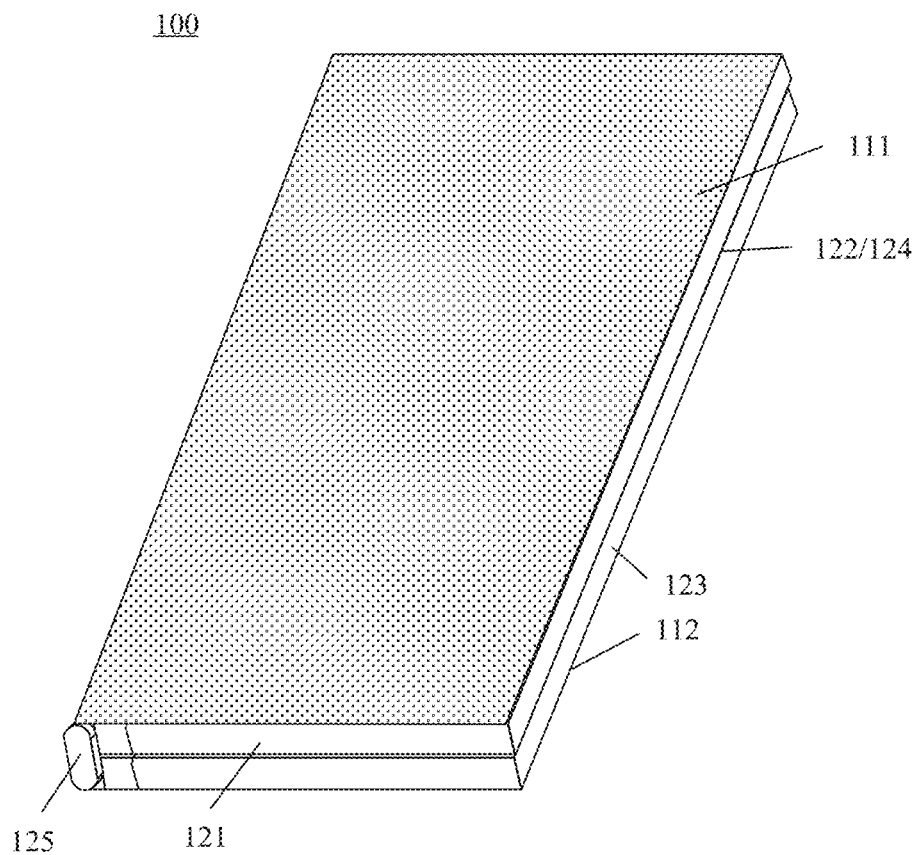
FIG. 3 is a schematic diagram of a structure of a foldable electronic device that is folded outward.

FIG. 2 and FIG. 3 show two possible folded states of the foldable electronic device 100. FIG. 2 shows an inward folded state of the foldable electronic device 100. The inward folded state shown in FIG. 2 may be, for example, a left-right inward folded state or an up-down inward folded state. FIG. 3 shows an outward folded state of the foldable electronic device 100. The outward folded state shown in FIG. 3 may be, for example, a left-right outward folded state or an up-down outward folded state. With reference to FIG. 1 to FIG. 3, the following describes the two possible folded states of the foldable electronic device 100.

In this application, that the foldable electronic device 100 is folded may mean that the foldable electronic device 100 is currently bent and a bending degree of the foldable electronic device 100 is maximal. In this case, the first cover 122 may be parallel to, be spaced apart from, and face the second cover 124. A spacing distance between the first cover 122 and the second cover 124 is minimal. Similarly, the first display portion 111 may be parallel to, be spaced apart from, and face the second display portion 112. A spacing height between the first display portion 111 and the second display portion 112 is minimal. In this case, the first display portion 111 and the second display portion 112 may be considered to be located on different planes.

With reference to FIG. 1 and FIG. 2, when the foldable electronic device 100 is in the inward folded state, the first cover 122 and the second cover 124 may be close to each other, and the first display portion 111 and the second display portion 112 may be close to each other. The first cover 122, the second cover 124, and the hinge mechanism 125 may form a display accommodation region used to accommodate the flexible display 110. In other words, the flexible display 110 may be accommodated in space between the first cover 122 and the second cover 124.

With reference to FIG. 1 and FIG. 3, when the foldable electronic device 100 is in the outward folded state, the first cover 122 and the second cover 124 may be close to each other, and the first display portion 111 and the second display portion 112 may be close to each other. The first display portion 111, the second display portion 112, and the foldable display portion 123 may form a housing accommodation region used to accommodate the first cover 122, the second cover 124, and the hinge mechanism 125. In other words, the first cover 122, the second cover 124, and the hinge mechanism 125 may be accommodated in space between the first display portion 111 and the second display portion 112.

Figure 4:
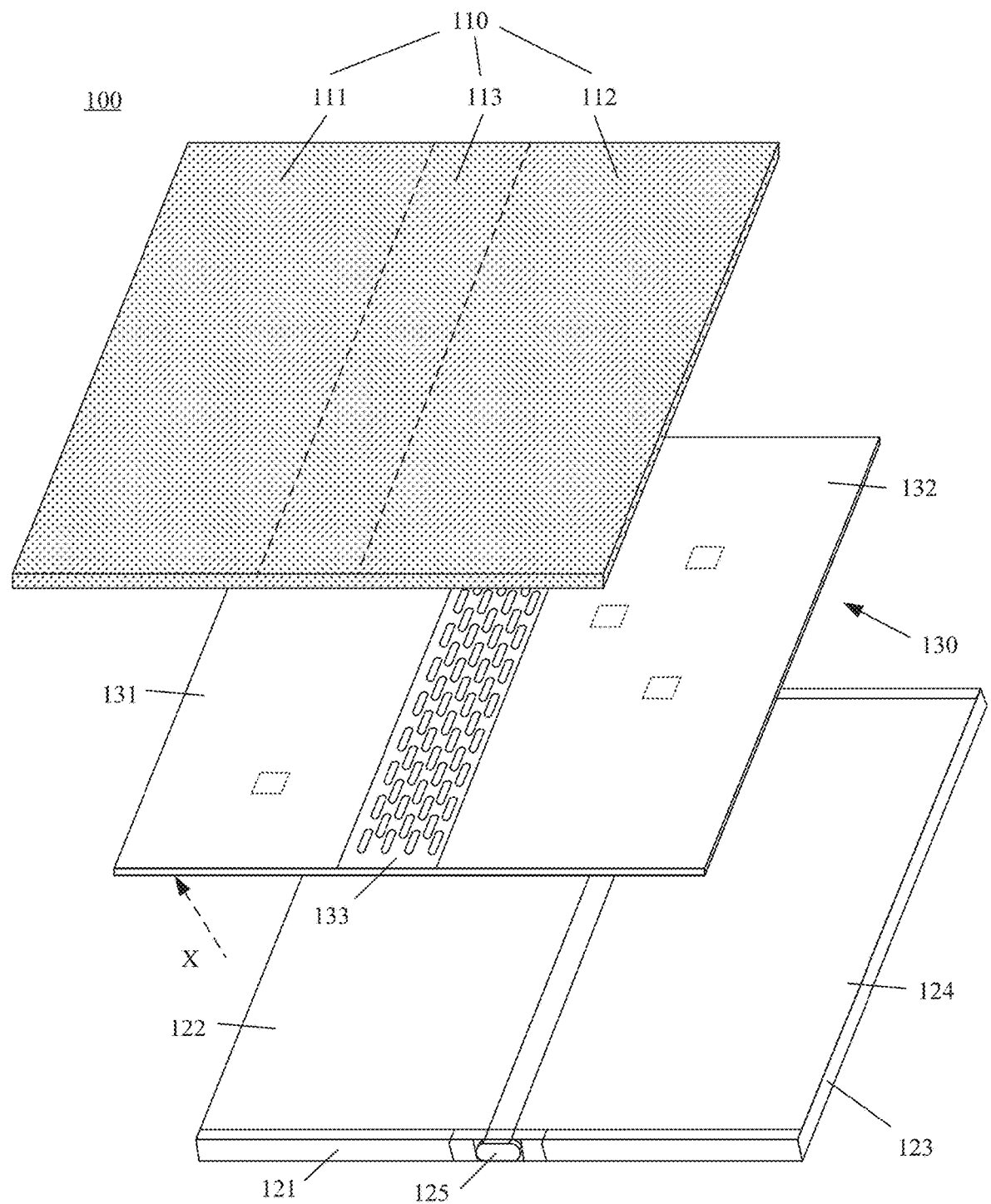
FIG. 4 is an exploded view of a foldable electronic device according to an embodiment of this application.

FIG. 4 is an exploded view of the foldable electronic device 100 shown in FIG. 1. As shown in FIG. 4, the foldable electronic device 100 may include a foldable support plate 130. The foldable support plate 130 may be, for example, a stainless steel sheet. A thickness of the foldable support plate 130 may be, for example, 0.15 mm. The foldable support plate 130 may be pasted to the flexible display 110, to form a flexible display module 200 of the foldable electronic device 100. The foldable support plate 130 may be accommodated in space between the housing of the foldable electronic device 100 and the flexible display 110. The foldable support plate 130 may have specific strength and rigidity, and bending performance of the foldable support plate 130 may be relatively good. The foldable support plate 130 may provide support for the flexible display 110. This helps ensure overall flatness of the flexible display 110, and further helps ensure anti-extrusion performance of the foldable electronic device 100. If the support is not enough, the flexible display 110 may be layered.

The foldable support plate 130 may include a first support portion 131, a second support portion 132, and a foldable support portion 133. The first support portion 131 may be correspondingly pasted to the first display portion 111 of the flexible display 110. The first support portion 131 may be located between the first display portion 111 and the first cover 122. The second support portion 132 may be correspondingly pasted to the second display portion 112 of the flexible display 110. The second support portion 132 may be located between the second display portion 112 and the second cover 124. The foldable support portion 133 may be correspondingly pasted to the foldable display portion 113 of the flexible display 110. The foldable support portion 133 may be located between the foldable display portion 113 and the hinge mechanism 125.

When the flexible display 110 normally works, an electronic component (for example, a light-emitting diode or a semiconductor) in the flexible display 110 accumulates charges. If excessive charges are accumulated on the flexible display 110, normal use of the flexible display 110 may be affected. The foldable support plate 130 may be electrically connected to the flexible display 110, so that the foldable support plate 130 may be configured to transfer excess charges on the flexible display 110, to help improve radio frequency performance of the foldable electronic device 100 (for example, reduce radiated spurious emission (radiated spurious emission, RSE) of the foldable electronic device 100). In an example, the foldable support plate 130 and the flexible display 110 may be pasted together, for example, through a conductive adhesive layer (such as conductive foam or conductive double-sided mesh adhesive). A thickness of the conductive adhesive layer may be, for example, approximately 0.05 mm.

Figure 5:
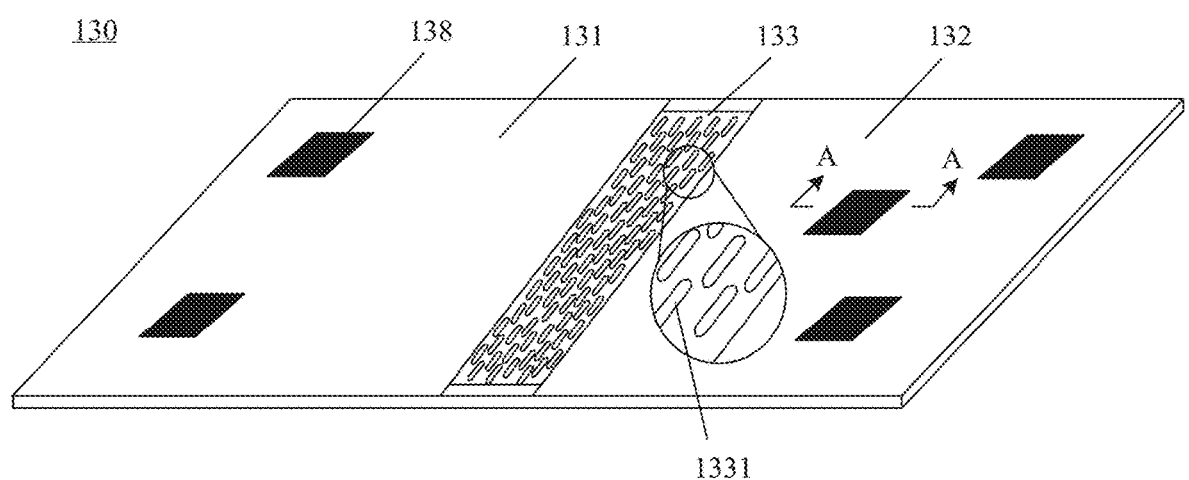
FIG. 5 is a schematic diagram of a structure of a foldable support plate according to an embodiment of this application.

With reference to FIG. 4 and FIG. 5, the following describes in detail a structure and a function of the foldable support plate 130. A schematic diagram of a structure of the foldable support plate 130 shown in FIG. 5 may be obtained by observing the foldable support plate 130 in an X direction shown by a dashed line in FIG. 4.

Figure 6:
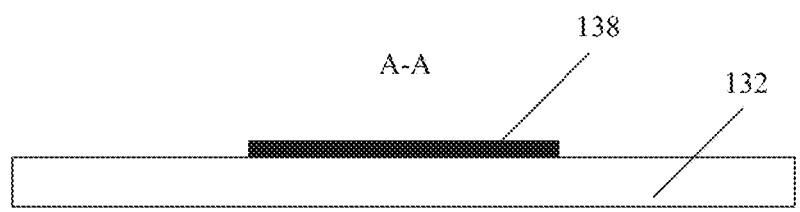
FIG. 6 is a schematic diagram of a structure of local plating according to an embodiment of this application.

The foldable support plate 130 may include one or more local plating 138. The local plating 138 may be, for example, nickel plating. The local plating 138 may be obtained, for example, through electroplating. The local plating 138 may serve as a pin of the foldable support plate 130. The local plating 138 may be, for example, disposed on the first support portion 131 or the second support portion 132. FIG. 6 is a view of A-A in FIG. 5. As shown in FIG. 6, the local plating 138 may be, for example, disposed on the second support portion 132. With reference to FIG. 4, it can be learned that the local plating 138 may face or be close to the housing of the foldable electronic device 100, and be disposed on a side of the first support portion 131 or the second support portion 132. In other words, the local plating 138 may be back or away from the flexible display 110, and be disposed on the side of the first support portion 131 or the second support portion 132. It can be learned from the foregoing description that the local plating 138 may be electrically connected to the flexible display 110 through the first support portion 131 or the second support portion 132.

A side that is of the local plating 138 and that is back or away from the foldable support plate 130 may be grounded. For example, a ground line and an electrical connector (for example, a spring plate) may be disposed on a middle frame of the foldable electronic device 100. The electrical connector and the ground line may be conducted. The local plating 138 may be electrically connected to the ground line through the electrical connector. For another example, an electrical connector (for example, a spring plate) may be disposed on a side frame of the foldable electronic device 100. The side frame and a hand holding the foldable electronic device 100 may be conducted. The local plating 138 may be electrically connected to the side frame through the electrical connector. In this way, the excess charges on the flexible display 110 can be conducted to the ground through the local plating 138.

The foldable support plate 130 may include a plurality of through grooves 1331 that are not connected to each other. The through grooves 1331 may be disposed in the foldable support portion 133 of the foldable support plate 130. The through grooves 1331 may penetrate the foldable support portion 133. For example, the through grooves 1331 may be obtained through chemical etching. In an example shown in FIG. 5, a first through groove and a second through groove in the foldable support plate 130 may be, for example, parallel and spaced apart. When the foldable support plate 130 is in the unfolded state, two adjacent through grooves may be spaced apart. Optionally, with reference to FIG. 4 and FIG. 5, in a width direction or a length direction of the through groove, a partial or entire region of the first through groove may be projected on the second through groove, and the first through groove and the second through groove may be two adjacent through grooves. The through grooves 1331 are disposed in the foldable support portion 133 of the foldable support plate 130, to help reduce an external force required to bend the foldable support portion 133.

Figure 7:
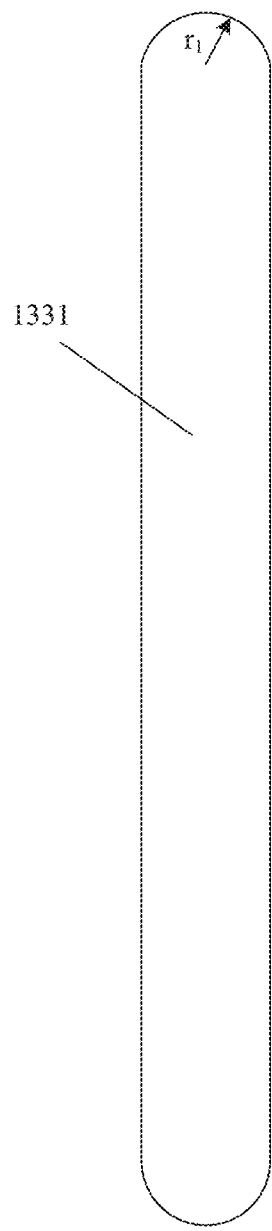
FIG. 7 is a schematic diagram of a structure of a through groove according to an embodiment of this application.

In the example shown in FIG. 5, an end opening of the through groove 1331 may be racetrack-shaped. As shown in FIG. 7, the racetrack-shaped end opening may include two semicircles and line segments connected between the two semicircles. The line segments may be tangent to the two semicircles. Openings of the two semicircles may be disposed face to face. In an example, a radius $r_1$ of the semicircle may be, for example, 0.1-0.2 mm. The end opening of the through groove 1331 is racetrack-shaped. This helps reduce stress concentration near the through groove 1331 when the foldable electronic device 100 is bent, and further helps delay damage to the through groove 1331.

Figure 8:
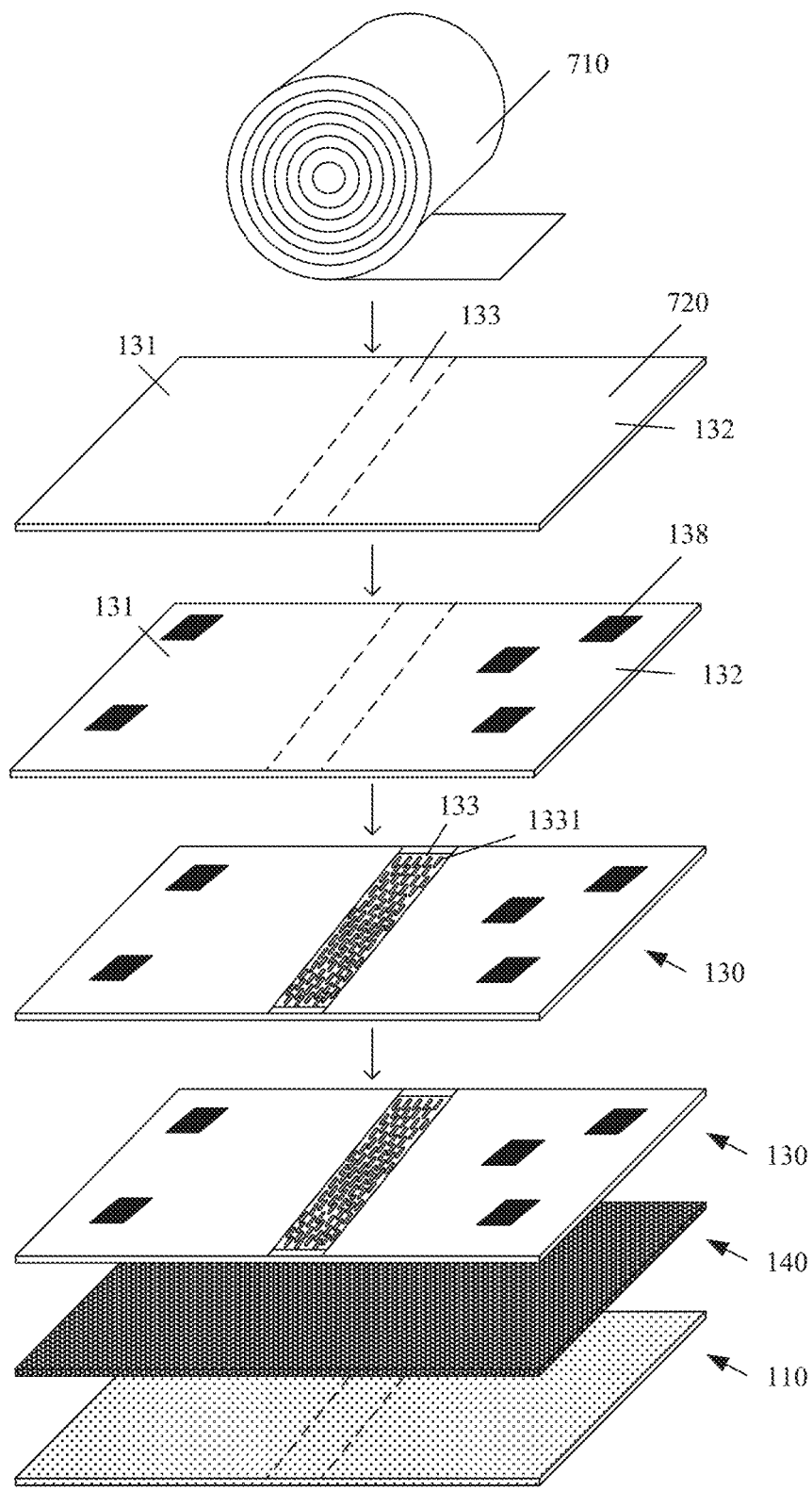
FIG. 8 is a schematic flowchart of a method for processing a foldable support plate according to an embodiment of this application.

With reference to FIG. 8, the following describes a possible process of processing the flexible display module 200. The flexible display module 200 may include the flexible display 110 and the foldable support plate 130 shown in FIG. 4, and a conductive adhesive layer 140.

First, a stainless steel sheet 720 may be obtained by slicing a stainless steel roll 710. The stainless steel sheet 720 may include the first support portion 131, the second support portion 132, and the foldable support portion 133 shown in FIG. 4 and FIG. 5. Then, the one or more local plating 138 is disposed on the first support portion 131 and/or the second support portion 132 of the stainless steel sheet 720, and the plurality of through grooves 1331 are processed in the foldable support portion 133 of the stainless steel sheet 720, to obtain the foldable support plate 130 shown in FIG. 4 and FIG. 5. A processing sequence of the local plating 138 and the through grooves 1331 may not be limited in this embodiment of this application. Next, a side that is of the foldable support plate 130 and that is away from the local plating 138 is pasted to the flexible display 110 through the conductive adhesive layer 140, to finally obtain the flexible display module 200 shown in FIG. 9 or FIG. 10.

Figure 9:
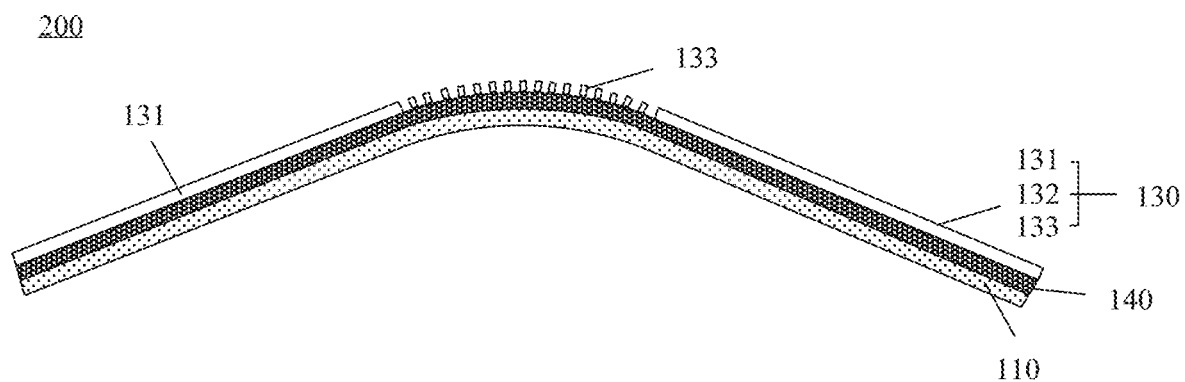
FIG. 9 is a schematic diagram of a structure of a foldable support plate that is folded inward.
Figure 10:
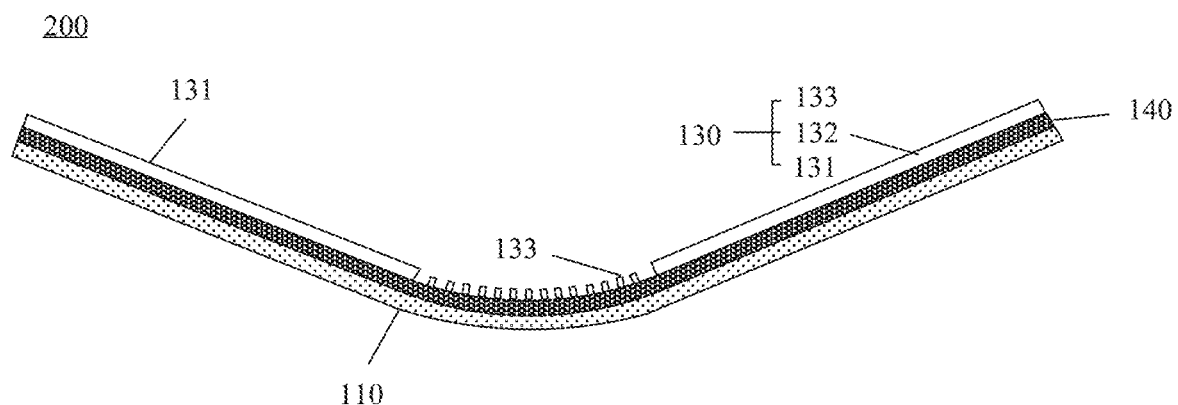
FIG. 10 is a schematic diagram of a structure of a foldable support plate that is folded outward.

FIG. 9 and FIG. 10 show two possible folded states of the flexible display module 200. FIG. 9 shows the flexible display module 200 that is folded inward, and FIG. 10 shows the flexible display module 200 that is folded outward.

A density of a stainless steel material may be approximately 7.9 g/cm³. With reference to examples shown in FIG. 4 to FIG. 10, in the foldable electronic device 100 including the 8-inch flexible display 110, a weight of the foldable support plate 130 may exceed 23 g. A relatively heavy weight of the foldable support plate 130 may result in a relatively heavy total weight of the foldable electronic device 100. In addition, remanence of the stainless steel material may be relatively high, and a variation range of a real remanence state of the stainless steel material may be large. This is not beneficial to normal operation of a magnetically sensitive component in the foldable electronic device 100.

In addition, local nickel plating is disposed on the stainless steel material. This can increase impedance of the foldable support plate 130, to affect radio frequency performance of the foldable electronic device 100. For example, a small quantity of charges on the flexible display 110 are transferred.

Figure 11:
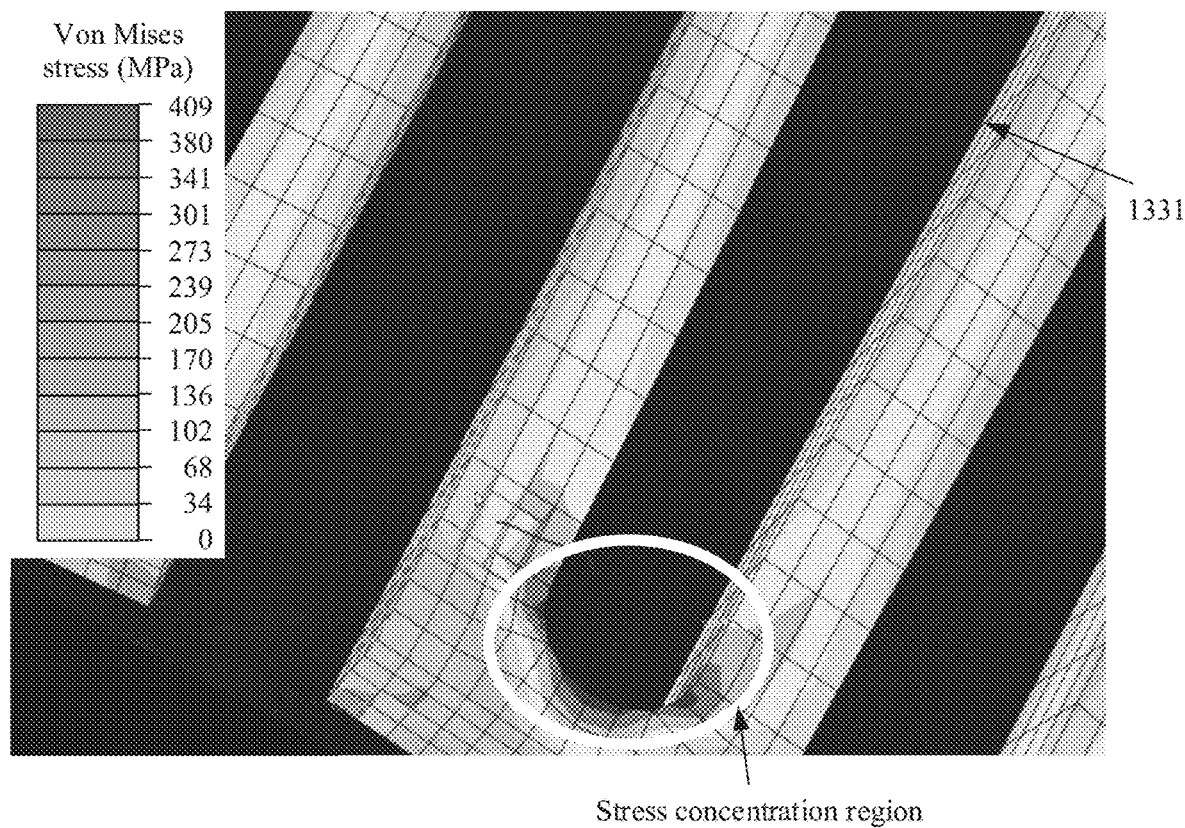
FIG. 11 is a stress nephogram of a through groove.

In addition, as shown in FIG. 11, when the foldable support plate 130 is folded, stress concentration may still occur at two ends of the racetrack-shaped through groove 1331. Bending performance of the foldable electronic device 100 is relatively poor.

Figure 12:
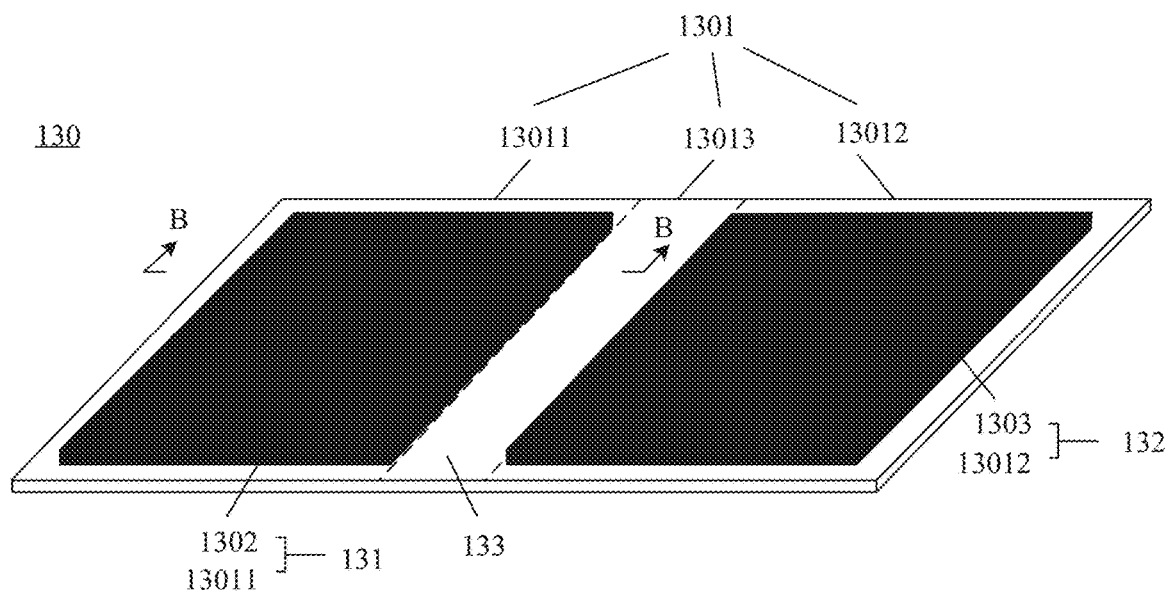
FIG. 12 is an exploded view of another foldable electronic device according to an embodiment of this application.

FIG. 12 is a schematic diagram of a structure of another foldable support plate 130. The foldable support plate 130 may include a first support plate 1301, a second support plate 1302, and a third support plate 1303. A material of the first support plate 1301 may be, for example, stainless steel. A thickness of the first support plate 1301 may be, for example, approximately 0.03 mm.

Figure 13:
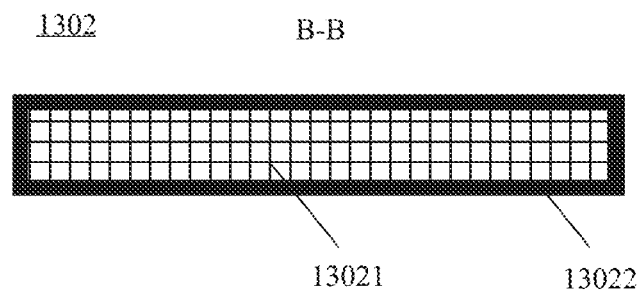
FIG. 13 is a schematic diagram of a structure of a second support plate according to an embodiment of this application.

FIG. 13 is a view of B-B in FIG. 12. As shown in FIG. 13, a material of the second support plate 1302 may include, for example, a copper sheet 13021 and plating 13022 that is wrapped around a periphery of the copper sheet 13021. A material of the plating 13022 may include, for example, nickel. The plating 13022 can protect the copper sheet 13021. The third support plate 1303 may have a structure similar to that of the second support plate 1302. Thicknesses of the second support plate 1302 and the third support plate 1303 may be, for example, approximately 0.2 mm.

The first support plate 1301 may include a first portion 13011, a second portion 13012, and a foldable portion 13013. With reference to FIG. 4 and FIG. 12, the second support plate 1302 may be attached to the first portion 13011, and is located on a side that is of the first portion 13011 and that is away from the flexible display 110. The first portion 13011 and the second support plate 1302 may correspond to the first support portion 131 of the foldable support plate 130. With reference to FIG. 4 and FIG. 12, the third support plate 1303 may be attached to the second portion 13012, and is located on a side that is of the second portion 13012 and that is away from the flexible display 110. The second portion 13012 and the third support plate 1303 may correspond to the second support portion 132 of the foldable support plate 130. The foldable portion 13013 may correspond to the foldable support portion 133 of the foldable support plate 130. In the example shown in FIG. 12, the foldable portion 13013 may provide support for the foldable display portion 113 of the flexible display 110.

The first support plate 1301 and the first portion 13011 may not be conducted. Similarly, the first support plate 1301 and the second portion 13012 may not be conducted. For example, both a bonding material between the first support plate 1301 and the first portion 13011 and a bonding material between the first support plate 1301 and the second portion 13012 may be insulation materials.

Figure 14:
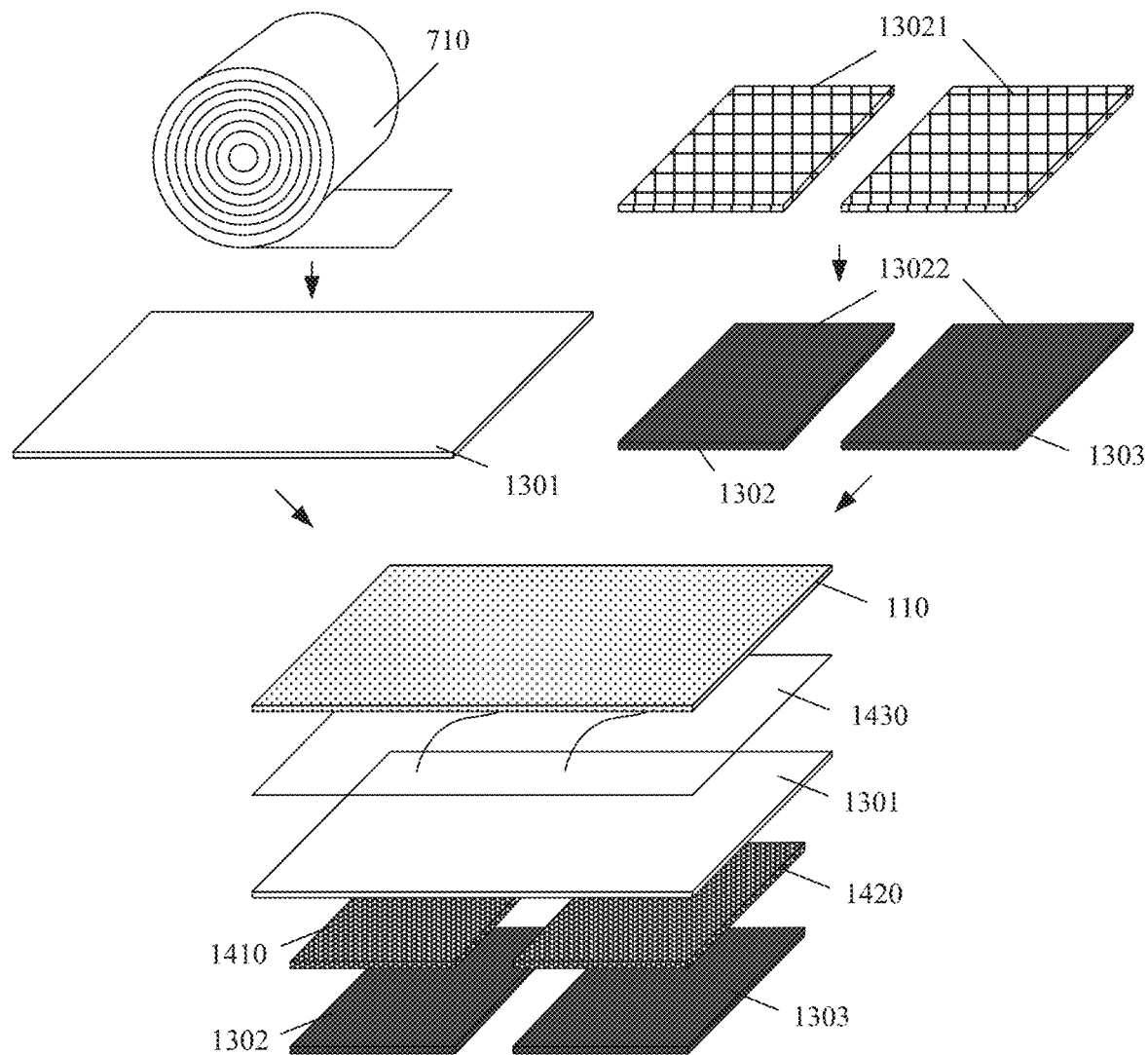
FIG. 14 is a schematic flowchart of a method for processing a foldable support plate according to an embodiment of this application.

With reference to FIG. 14, the following describes a possible process of processing the flexible display module 200. The flexible display module 200 may include the flexible display 110 shown in FIG. 4, the foldable support plate 130 shown in FIG. 12, a first adhesive layer 1410, a second adhesive layer 1420, and a third adhesive layer 1430. Thicknesses of the first adhesive layer 1410, the second adhesive layer 1420, and the third adhesive layer 1430 may be, for example, approximately 0.05 mm. In an example, the first adhesive layer 1410, the second adhesive layer 1420, and the third adhesive layer 1430 may all be insulation materials. Optionally, the first adhesive layer 1410 and the second adhesive layer 1420 may be mesh adhesive. Optionally, the third adhesive layer 1430 may be optically clear adhesive (optically clear adhesive, OCA).

First, the stainless steel roll 710 may be sliced to obtain the first support plate 1301, and the plating 13022 is electroplated on the periphery of the copper sheet 13021, to obtain the second support plate 1302 and the third support plate 1303. A processing sequence of the first support plate 1301, the second support plate 1302, and the third support plate 1303 may not be limited in this embodiment of this application. Then, with reference to FIG. 12, the second support plate 1302 may be attached to the first portion 13011 of the first support plate 1301 through the first adhesive layer 1410, the third support plate 1303 may be attached to the second portion 13012 of the first support plate 1301 through the second adhesive layer 1420, and the flexible display 110 may be attached to the first support plate 1301 through the third adhesive layer 1430, to obtain the flexible display module 200 shown in FIG. 15 or FIG. 16. The second support plate 1302 and the third support plate 1303 may be attached to one side of the first support plate 1301. The flexible display 110 is attached to the other side of the first support plate 1301.

Figure 15:
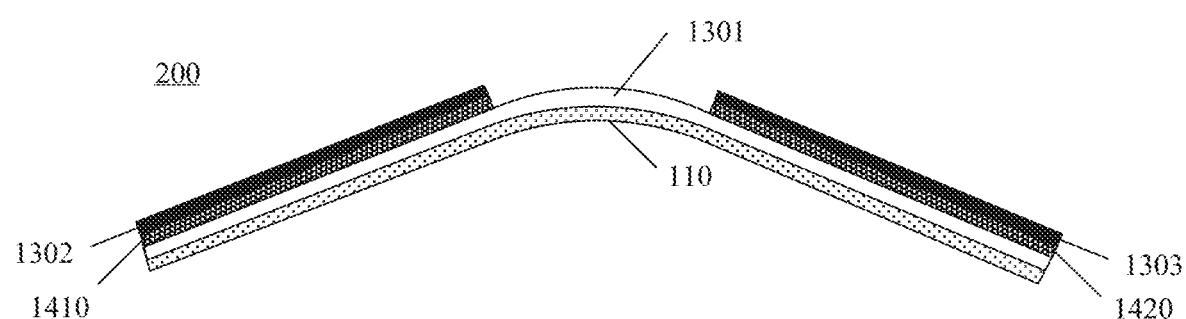
FIG. 15 is a schematic diagram of a structure of a foldable support plate that is folded inward.
Figure 16:
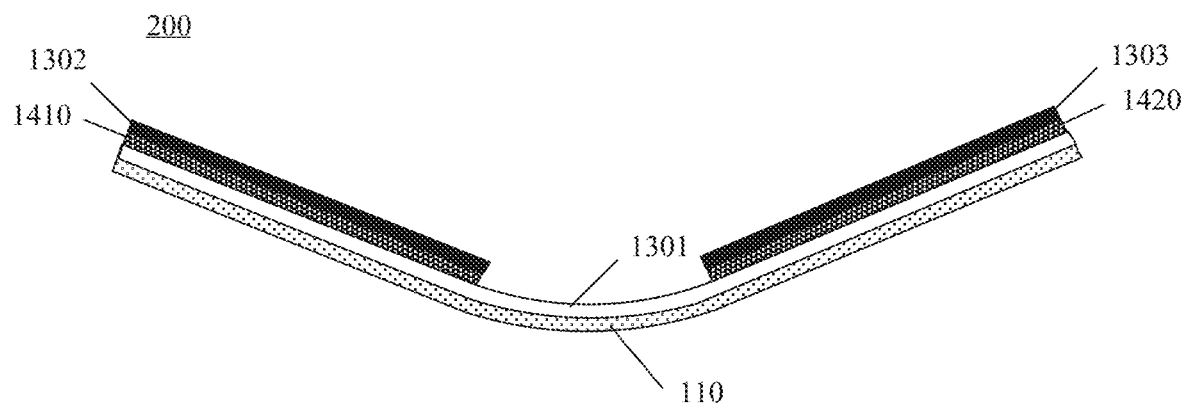
FIG. 16 is a schematic diagram of a structure of a foldable support plate that is folded outward.

FIG. 15 and FIG. 16 show two possible folded states of the flexible display module 200. FIG. 15 shows the flexible display module 200 that is folded inward, and FIG. 16 shows the flexible display module 200 that is folded outward.

The density of the stainless steel material may be approximately 7.9 $g/cm^3$. A density of a copper material may be approximately 8.95 $g/cm^3$. With reference to examples shown in FIG. 12 to FIG. 16, in the foldable electronic device 100 including the 8-inch flexible display 110, the weight of the foldable support plate 130 may exceed 30 g. A relatively heavy weight of the foldable support plate 130 may result in a relatively heavy total weight of the foldable electronic device 100.

In addition, the foldable display portion 113 of the flexible display 110 depends on the first support plate 1301, and the first support plate 1301 has a relatively small thickness. Therefore, the foldable electronic device 100 may have relatively poor anti-extrusion performance, anti-impact performance, bending fatigue life, and the like.

In addition, the second support plate 1302 and the third support plate 1303 may use the copper sheet 13021, and the copper sheet 13021 is relatively easy to oxidize. Electroplating the plating 13022 on the copper sheet 13021 has problems of relatively high costs and a relatively complex process.

In addition, when the foldable electronic device 100 is folded, the second support plate 1302 and the third support plate 1303 need to be prevented from being in contact with the first support plate 1301, to reduce a probability of conduction between the second support plate 1302 and the first support plate 1301 and a probability of conduction between the third support plate 1303 and the first support plate 1301, and stabilize or ensure a disconnection between the first support plate 1301, the second support plate 1302, and the third support plate 1303. Therefore, ink needs to be printed at an edge position that is of the second support plate 1302 and that is close to the first support plate 1301 and an edge position that is of the third support plate 1303 and that is close to the first support plate 1301. This may increase process complexity of the foldable support plate 130, reduce a yield of the foldable support plate 130, and increase costs of the foldable support plate 130.

Embodiments of this application provide a new foldable support plate 130, flexible display module 200, and foldable electronic device 100, so that the foldable support plate 130 can have a relatively light weight, relatively high mechanical stability, relatively good radio frequency performance, and the like, to help improve comprehensive performance of the foldable electronic device 100.

Figure 17:
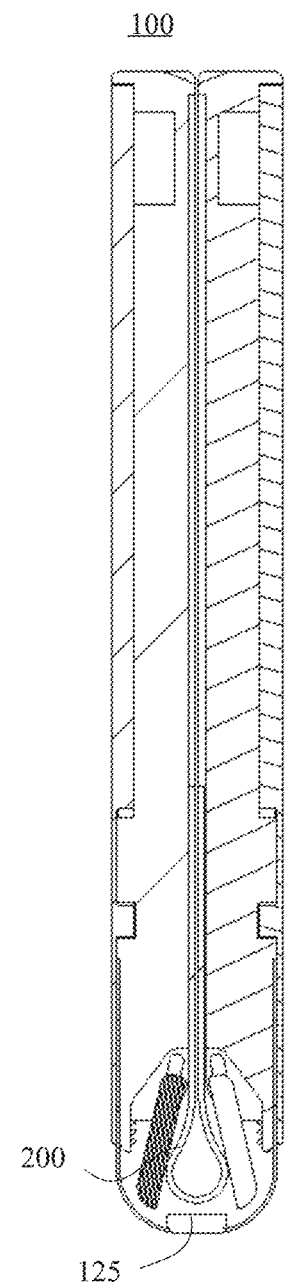
FIG. 17 is a schematic diagram of a structure of a foldable electronic device according to an embodiment of this application.
Figure 18:
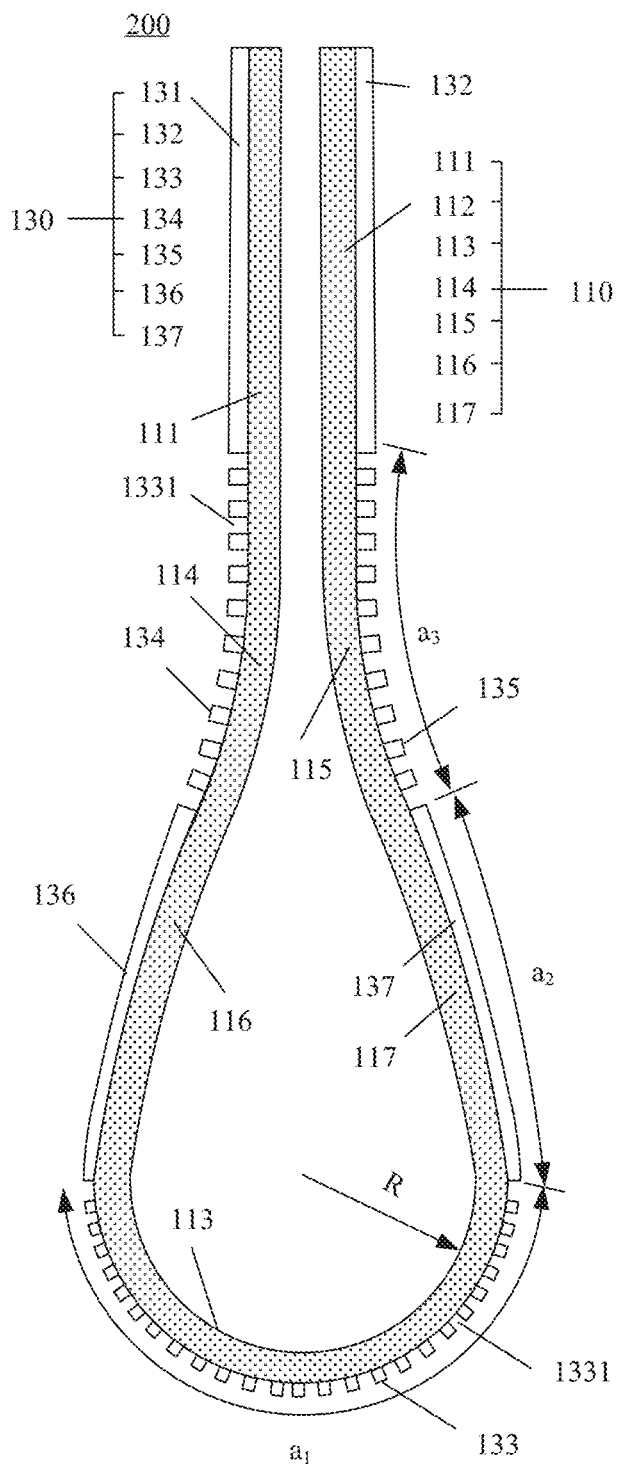
FIG. 18 is a schematic diagram of a structure of a flexible display module according to an embodiment of this application.
Figure 19:
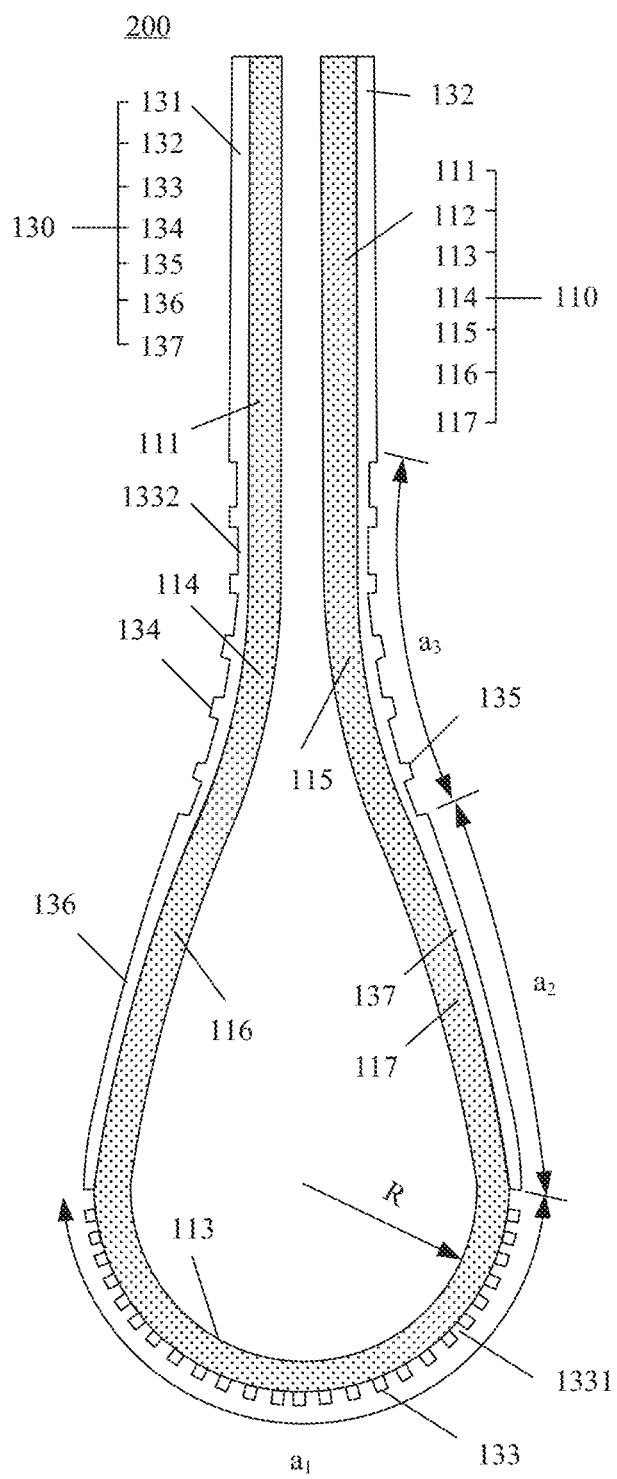
FIG. 19 is a schematic diagram of a structure of a flexible display module according to an embodiment of this application.

FIG. 17 is a schematic diagram of a structure of a foldable electronic device 100 according to an embodiment of this application. The foldable electronic device 100 may include a flexible display module 200 and a hinge mechanism 125. In an example shown in FIG. 17, the hinge mechanism 125 may drive the flexible display module 200 to be folded inward. When the flexible display module 200 is in an inward folded state shown in FIG. 17, the flexible display module 200 may roughly form a water droplet-shaped gap in a region close to the hinge mechanism 125. With reference to FIG. 18 and FIG. 19, the following describes a flexible display module 200 according to an embodiment of this application.

FIG. 18 and FIG. 19 are partial enlarged views of the flexible display module 200 in FIG. 17. The flexible display module 200 may include a flexible display 110 and a foldable support plate 130. As shown in FIG. 18 and FIG. 19, the flexible display module 200 is currently in the inward folded state.

The flexible display 110 may include a first display portion 111, a first transition display portion 114, a foldable display portion 113, a second transition display portion 115, and a second display portion 112 that are sequentially connected. The first transition display portion 114 may be connected between the first display portion 111 and the foldable display portion 113. The second transition display portion 115 may be connected between the second display portion 112 and the foldable display portion 113.

The foldable support plate 130 may include a first support portion 131, a first transition support portion 134, a foldable support portion 133, a second transition support portion 135, and a second support portion 132 that are sequentially connected. The first transition support portion 134 may be connected between the first support portion 131 and the foldable support portion 133. The second transition support portion 135 may be connected between the second support portion 132 and the foldable support portion 133.

The first support portion 131 may be correspondingly pasted to the first display portion 111, to provide mechanical support for the first display portion 11. The second support portion 132 may be correspondingly pasted to the second display portion 112, to provide mechanical support for the second display portion 112. The first transition support portion 134 may be correspondingly pasted to the first transition display portion 114, to provide mechanical support for the first transition display portion 114. The second transition support portion 135 may be correspondingly pasted to the second transition display portion 115, to provide mechanical support for the second transition display portion 115. The foldable support portion 133 may be correspondingly pasted to the foldable display portion 113, to provide mechanical support for the foldable display portion 113.

In an example, when the flexible display 110 is unfolded, the first display portion 111, the first transition display portion 114, the foldable display portion 113, the second transition display portion 115, and the second display portion 112 may all be in a flat state. Correspondingly, when the flexible display 110 is in the unfolded state, the foldable support plate 130 may be in the unfolded state, and the first support portion 131, the first transition support portion 134, the foldable support portion 133, the second transition support portion 135, and the second support portion 132 may all be in the flat state. That A is in the flat state may mean that any two different positions of A may be considered to be located on a same plane.

As shown in FIG. 18 and FIG. 19, when the flexible display 110 is folded, the foldable display portion 113 may be in a bent state. Correspondingly, the foldable support portion 133 may be in the bent state.

As shown in FIG. 18 and FIG. 19, when the flexible display 110 is folded, both the first display portion 111 and the second display portion 112 may be in the flat state. Correspondingly, both the first support portion 131 and the second support portion 132 may be in the flat state.

As shown in FIG. 18 and FIG. 19, when the flexible display 110 is folded, both the first transition display portion 114 and the second transition display portion 115 may be in a (slightly) bent state (a bending radian in the (slightly) bent state may be less than a bending radian is folded). A bending radian of the first transition display portion 114 may be less than a bending radian of the foldable display portion 113. A bending radian of the second transition display portion 115 may be less than the bending radian of the foldable display portion 113. The first transition display portion 114 may play a transition role between the flat state of the first display portion 111 and the bent state of the foldable display portion 113. The second transition display portion 115 may play a transition role between the flat state of the second display portion 112 and the bent state of the foldable display portion 113.

Correspondingly, when the flexible display 110 is folded, both the first transition support portion 134 and the second transition support portion 135 may be in the (slightly) bent state. A bending radian of the first transition support portion 134 may be less than a bending radian of the foldable support portion 133. A bending radian of the second transition support portion 135 may be less than the bending radian of the foldable support portion 133. The first transition support portion 134 may play a transition role between the flat state of the first support portion 131 and the bent state of the foldable support portion 133. The second transition support portion 135 may play a transition role between the flat state of the second support portion 132 and the bent state of the foldable support portion 133.

In an example, when the foldable support plate 130 is folded shown in FIG. 18 and FIG. 19, a bending radius of the foldable support portion 133 may be R. A length at of the foldable support portion 133 may be, for example, $2\pi R \times 0.5$ to $2\pi R \times 0.8$. A length as of the first transition support portion 134 or the second transition support portion 135 may be, for example, $R \times 1.2$ to $R \times 1.5$.

Optionally, as shown in FIG. 18 and FIG. 19, a third transition support portion 136 may be further disposed between the first transition support portion 134 and the foldable support portion 133. Correspondingly, a third transition display portion 116 may be further disposed between the first transition display portion 114 and the foldable display portion 113. The third transition support portion 136 may be correspondingly pasted to the third transition display portion 116, to provide mechanical support for the third transition display portion 116. A width $a_2$ of the third transition support portion 136 may be, for example, R×1.2 to R×1.8.

When the flexible display 110 is folded, a bending radian of the third transition support portion 136 may be less than the bending radian of the first transition support portion 134 and the bending radian of the foldable support portion 133. For example, when the flexible display 110 is folded, the first transition support portion 134 may be in an outward bent state, and the foldable support portion 133 may be in an inward bent state. The third transition support portion 136 may be in the flat state. The third transition support portion 136 may play a transition role between a (slightly) outward bent state of the first transition support portion 134 and the inward bent state of the foldable support portion 133.

Similarly, a fourth transition support portion 137 may be further disposed between the second transition support portion 135 and the foldable support portion 133. Correspondingly, a fourth transition display portion 117 may be further disposed between the second transition display portion 115 and the foldable display portion 113. The fourth transition support portion 137 may be correspondingly pasted to the fourth transition display portion 117, to provide mechanical support for the fourth transition display portion 117. A width of the fourth transition support portion 137 may be, for example, R×1.2 to R×1.8.

When the flexible display 110 is folded, a bending radian of the fourth transition support portion 137 may be less than the bending radian of the second transition support portion 135 and the bending radian of the foldable support portion 133. For example, when the flexible display 110 is folded, the second transition support portion 135 may be in the outward bent state, and the foldable support portion 133 may be in the inward bent state. The fourth transition support portion 137 may be in the flat state. The fourth transition support portion 137 may play a transition role between the (slightly) outward bent state of the second transition support portion 135 and the inward bent state of the foldable support portion 133.

The foldable support plate 130 is provided with the first transition support portion 134 and the second transition support portion 135, so that the first support portion 131 and the second support portion 132 can be relatively closely attached together. In other words, there is relatively small space between the first support portion 131 and the second support portion 132. For example, the second support portion 132 and the first support portion 131 may be disposed in parallel. When a user places the foldable electronic device 100 in, for example, a pocket or a bag, a small object in the pocket or the bag is relatively difficult to fall into the space between the first support portion 131 and the second support portion 132. This helps improve an effect of protecting the flexible display 110. In addition, a region that is of the foldable electronic device 100 and that is relatively away from a foldable region may have a relatively small thickness, to lay a foundation for reducing a thickness of the foldable electronic device 100.

In addition, the foldable support plate 130 is provided with the first transition support portion 134 and the second transition support portion 135, and a folding radius R of the foldable support portion 133 may be relatively large. The first transition support portion 134 and the second transition support portion 135 are both provided with blind grooves 1332. This helps improve bending flexibility of the first transition support portion 134 and the second transition support portion 135. When the first support portion 131 is closely attached to the second support portion 132, if the transition support portions shown in FIG. 19 are not disposed on the foldable support plate 130, the folding radius R of the foldable support portion 133 is relatively small. If the folding radius R is relatively small, an inward folded side of the flexible display 110 is extruded to a relatively large degree and is prone to wrinkles, and a plurality of layers of components in the flexible display 110 are easy to be separated from each other. Consequently, a service life of the flexible display 110 is relatively short. In addition, if the folding radius R is relatively small, bending stress of the foldable support portion 133 is relatively large, and bending performance of the foldable support portion 133 may be reduced. If the folding radius R is relatively large, the inward folded side of the flexible display 110 is extruded to a relatively small degree and is not prone to wrinkles, and the plurality of layers of components in the flexible display 110 are relatively difficult to be separated from each other. Consequently, the service life of the flexible display 110 is relatively long. In addition, the relatively large folding radius R helps reduce the bending stress of the foldable support portion 133, and further helps improve the bending performance and a bending fatigue life of the foldable support portion 133.

With reference to FIG. 19 to FIG. 29, the following describes a foldable support plate 130 according to an embodiment of this application.

Figure 20:
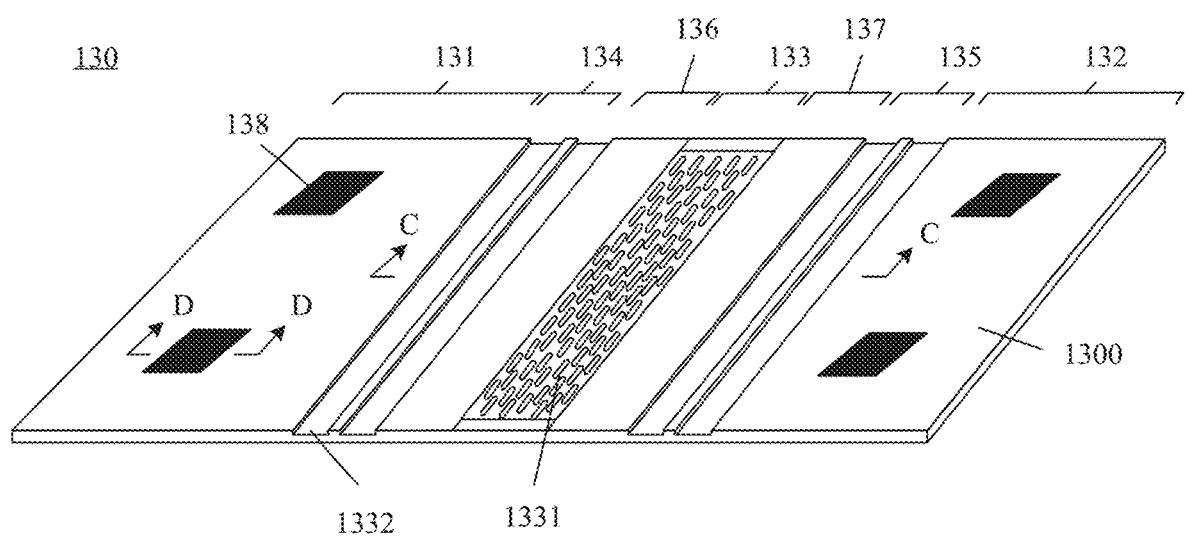
FIG. 20 is a schematic diagram of a structure of a foldable support plate according to an embodiment of this application.

As shown in FIG. 20, the foldable support plate 130 may include a support plate base 1300. A thickness of the support plate base 1300 may be less than 0.3 mm, for example, may be 0.1-0.2 mm, such as 0.15 mm.

In an example, a material of the support plate base 1300 may include but is not limited to at least one of the following materials: titanium, titanium alloy (for example, commercially pure titanium and a titanium alloy 4 (TA4) with a density of approximately 4.5 g/cm$^3$), stainless steel, aluminum alloy, copper alloy, nickel alloy, magnesium alloy, amorphous (for example, titanium-based amorphous, zirconium-based amorphous, and iron-based amorphous) alloy, a titanium-copper composite material, a titanium-aluminum composite material, a titanium-steel composite material, nickel-titanium (Ti—Ni) memory alloy, a steel-copper composite material, a steel-aluminum composite material, and a copper-titanium-copper composite material.

Optionally, the support plate base 1300 may further include a reinforcing material. The reinforcing material may be, for example, granular or fibrous. A metal including the reinforcing material may be referred to as a reinforcing metal. The support plate base 1300 may further include but is not limited to at least one of the following reinforcing materials: silicon carbide particles, silicon carbide whiskers, titanium carbide particles, titanium carbide whiskers, carbon fibers, and the like.

For example, titanium alloy including a reinforcing material may be referred to as titanium-based reinforcing alloy. Titanium alloy including a granular reinforcing material may be referred to as granular titanium-based reinforcing alloy. Titanium alloy including a fibrous reinforcing material may be referred to as fibrous titanium-based reinforcing alloy.

For another example, steel alloy including a reinforcing material may be referred to as steel-based reinforcing alloy. Steel alloy including a granular reinforcing material may be referred to as granular steel-based reinforcing alloy. Steel alloy including a fibrous reinforcing material may be referred to as fibrous steel-based reinforcing alloy.

For another example, aluminum alloy including a reinforcing material may be referred to as aluminum-based reinforcing alloy. Aluminum alloy including a granular reinforcing material may be referred to as granular aluminum-based reinforcing alloy. Aluminum alloy including a fibrous reinforcing material may be referred to as fibrous aluminum-based reinforcing alloy.

For another example, copper alloy including a reinforcing material may be referred to as copper-based reinforcing alloy. Copper alloy including a granular reinforcing material may be referred to as granular copper-based reinforcing alloy. Copper alloy including a fibrous reinforcing material may be referred to as fibrous copper-based reinforcing alloy.

For another example, nickel alloy including a reinforcing material may be referred to as nickel-based reinforcing alloy. Nickel alloy including a granular reinforcing material may be referred to as granular nickel-based reinforcing alloy. Nickel alloy including a fibrous reinforcing material may be referred to as fibrous nickel-based reinforcing alloy.

For another example, magnesium alloy including a reinforcing material may be referred to as magnesium-based reinforcing alloy. Magnesium alloy including a granular reinforcing material may be referred to as granular magnesium-based reinforcing alloy. Magnesium alloy including a fibrous reinforcing material may be referred to as fibrous magnesium-based reinforcing alloy.

Figure 21:
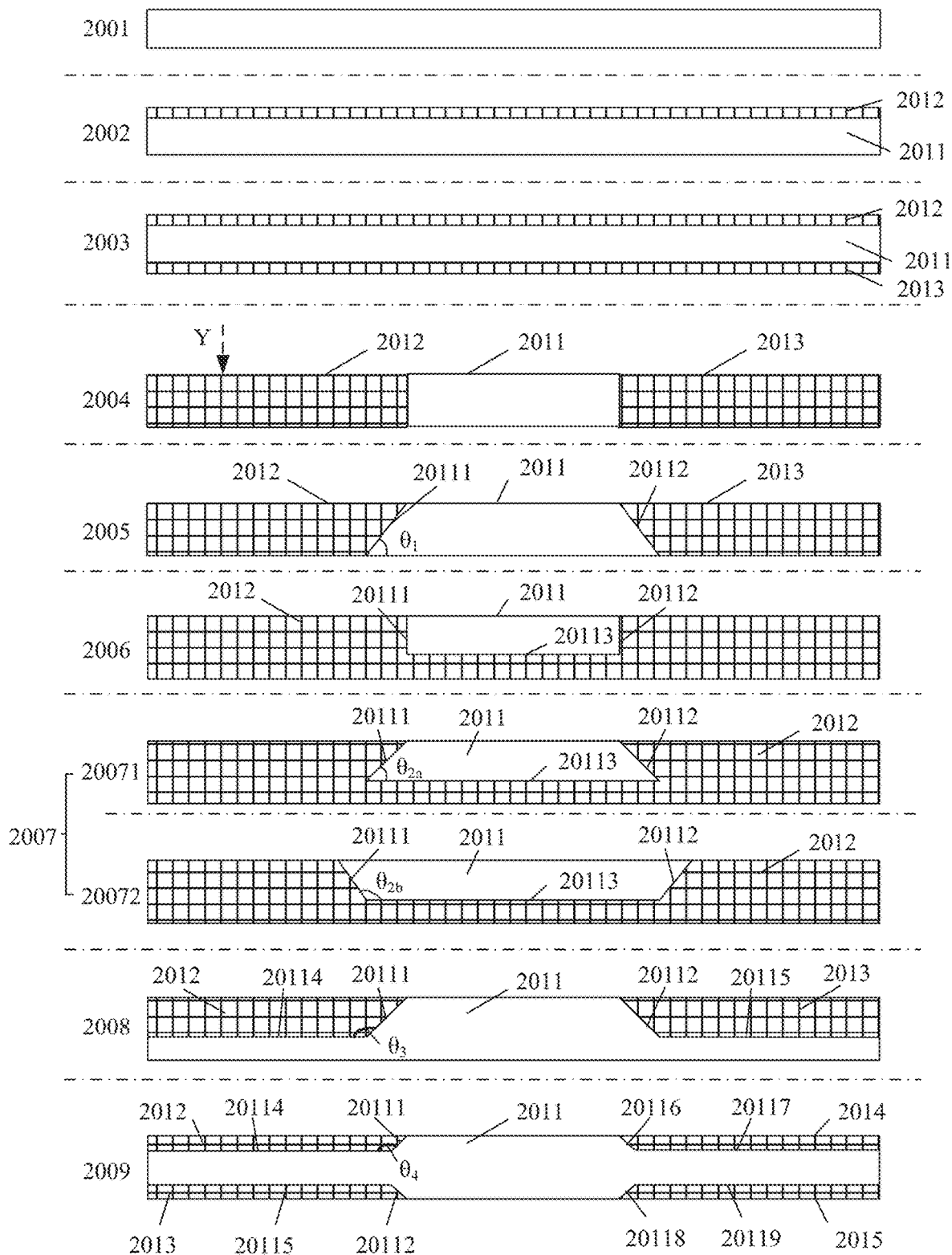
FIG. 21 is a schematic diagram of a structure of a plurality of support plate bases according to an embodiment of this application.
Figure 22:
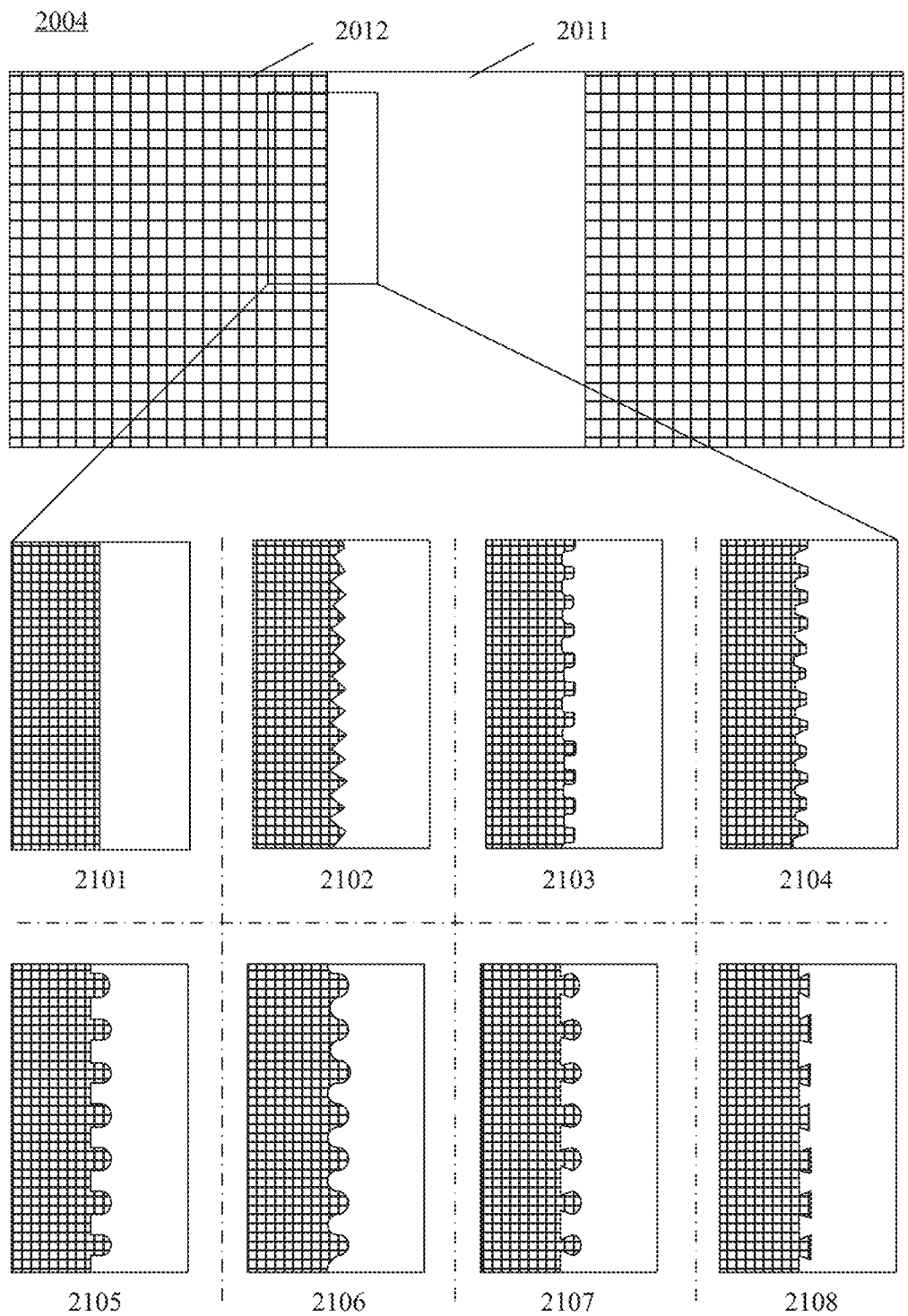
FIG. 22 is a schematic diagram of a structure of a support plate base according to an embodiment of this application.

With reference to FIG. 21 and FIG. 22, the following describes a plurality of support plate bases 1300 provided in this application.

As shown in 2001 in FIG. 21, the support plate base 1300 may be prepared by using a single-phase material. For example, the support plate base 1300 may be made of any one of the following materials: titanium, titanium alloy, stainless steel, aluminum alloy, copper alloy, nickel alloy, magnesium alloy, amorphous (for example, titanium-based amorphous, zirconium-based amorphous, and iron-based amorphous) alloy, a titanium-copper composite material, a titanium-aluminum composite material, a titanium-steel composite material, nickel-titanium (Ti—Ni) memory alloy, a steel-copper composite material, a steel-aluminum composite material, a copper-titanium-copper composite material, titanium-based reinforcing alloy, steel-based reinforcing alloy, aluminum-based reinforcing alloy, copper-based reinforcing alloy, nickel-based reinforcing alloy, magnesium-based reinforcing alloy, and the like. With reference to FIG. 20, it can be learned that in an example, the first support portion 131, the first transition support portion 134, the third transition support portion 136, the foldable support portion 133, the fourth transition support portion 137, the second transition support portion 135, and the second support portion 132 of the foldable support plate 130 may correspond to seven regions of the single-phase support plate base 1300.

In another example, the support plate base 1300 may include a multiphase material.

As shown in 2002 and 2003 in FIG. 21, the support plate base 1300 may include a first base portion 2011 and a second base portion 2012 that are stacked. With reference to FIG. 20, it can be learned that in an example, the first support portion 131, the first transition support portion 134, the third transition support portion 136, the foldable support portion 133, the fourth transition support portion 137, the second transition support portion 135, and the second support portion 132 of the foldable support plate 130 may correspond to seven regions of the first base portion 2011 and seven regions of the second base portion 2012. The second base portion 2012 may be, for example, disposed on the first base portion 2011 through hot pack rolling, electroplating, or the like.

A material of the first base portion 2011 may be different from a material of the second base portion 2012. The first base portion 2011 and the second base portion 2012 may be, for example, made of any two of the following materials: titanium, titanium alloy, stainless steel, aluminum alloy, copper alloy, nickel alloy, magnesium alloy, amorphous (for example, titanium-based amorphous, zirconium-based amorphous, and iron-based amorphous) alloy, a titanium-copper composite material, a titanium-aluminum composite material, a titanium-steel composite material, nickel-titanium (Ti—Ni) memory alloy, a steel-copper composite material, a steel-aluminum composite material, a copper-titanium-copper composite material, titanium-based reinforcing alloy, steel-based reinforcing alloy, aluminum-based reinforcing alloy, copper-based reinforcing alloy, nickel-based reinforcing alloy, and magnesium-based reinforcing alloy.

In the flexible display module 200, an interface between the first base portion 2011 and the second base portion 2012 may be parallel to the flexible display 110. That the interface is parallel to the flexible display 110 may mean that a target plane perpendicular to the interface may intersect the flexible display 110 to obtain a target line segment, and an included angle between a tangent plane of the flexible display 110 on the target line segment and the target plane may be approximately 90°. In other words, both a shape of the first base portion 2011 and a shape of the second base portion 2012 may correspond to a shape of the flexible display 110. For example, both the shape of the first base portion 2011 and the shape of the second base portion 2012 may be obtained by offsetting the shape of the flexible display 110.

In a possible example, strength or rigidity of the first base portion 2011 may be higher than strength or rigidity of the second base portion 2012, and a thickness of the first base portion 2011 may be greater than a thickness of the second base portion 2012. In other words, the first base portion 2011 may dominate mechanical properties of the foldable support plate 130, and the second base portion 2012 may affect the mechanical properties of the foldable support plate 130 on a basis of the first base portion 2011. In this case, two end surfaces of the foldable support plate 130 may have different mechanical properties, such as strength, rigidity, and hardness. For example, the material of the first base portion 2011 is titanium and titanium alloy, and the material of the second base portion 2012 is aluminum alloy or copper alloy. Using the aluminum alloy on the basis of the titanium and titanium alloy helps further reduce a weight of the foldable support plate 130. Using the copper alloy on the basis of the titanium and titanium alloy helps improve heat dissipation performance of the foldable support plate 130, and reduce a probability that the flexible display 110 and another component in the foldable electronic device 100 are overheated.

As shown in 2002 in FIG. 21, in an example, the flexible display 110 is attached to a side of the second base portion 2012 of the support plate base 1300. The second base portion 2012 may be located between the first base portion 2011 and the flexible display 110. In other words, the second base portion 2012 may be closer to the flexible display 110 than the first base portion 2011. A relatively soft side of the support plate base 1300 is pasted to the flexible display 110. This helps improve flatness of the flexible display 110.

As shown in 2002 in FIG. 21, in another example, the flexible display 110 is attached to a side of the first base portion 2011 of the support plate base 1300. The first base portion 2011 may be located between the second base portion 2012 and the flexible display 110. In other words, the first base portion 2011 may be closer to the flexible display 110 than the second base portion 2012. A relatively hard side of the support plate base 1300 is pasted to the flexible display 110. This is beneficial to an anti-extrusion capability of the flexible display 110.

As shown in 2003 in FIG. 21, the support plate base 1300 may include a first base portion 2011, a second base portion 2012, and a third base portion 2013 that are stacked. The first base portion 2011 may be located between the second base portion 2012 and the third base portion 2013. With reference to FIG. 20, it can be learned that in an example, the first support portion 131, the first transition support portion 134, the third transition support portion 136, the foldable support portion 133, the fourth transition support portion 137, the second transition support portion 135, and the second support portion 132 of the foldable support plate 130 may correspond to seven regions of the first base portion 2011, seven regions of the second base portion 2012, and seven regions of the third base portion 2013. The support plate base 1300 shown in 2003 may be, for example, obtained through hot pack rolling or electroplating.

A material of the first base portion 2011 is different from a material of the second base portion 2012. The material of the second base portion 2012 may be the same as or different from a material of the third base portion 2013. Material properties of the second base portion 2012 may be similar to or slightly different from material properties of the third base portion 2013. The first base portion 2011, the second base portion 2012, and the third base portion 2013 may be, for example, made of any two or three of the following materials: titanium, titanium alloy, stainless steel, aluminum alloy, copper alloy, nickel alloy, magnesium alloy, amorphous (for example, titanium-based amorphous, zirconium-based amorphous, and iron-based amorphous) alloy, a titanium-copper composite material, a titanium-aluminum composite material, a titanium-steel composite material, nickel-titanium (Ti—Ni) memory alloy, a steel-copper composite material, a steel-aluminum composite material, a copper-titanium-copper composite material, titanium-based reinforcing alloy, steel-based reinforcing alloy, aluminum-based reinforcing alloy, copper-based reinforcing alloy, nickel-based reinforcing alloy, and magnesium-based reinforcing alloy.

In the flexible display module 200, an interface between the first base portion 2011 and the third base portion 2013 may be parallel to the flexible display 110. For example, a shape of the first base portion 2011, a shape of the second base portion 2012, and a shape of the third base portion 2013 may all be obtained by offsetting a shape of the flexible display 110.

In a possible example, strength or rigidity of the first base portion 2011 may be higher than strength or rigidity of the second base portion 2012 and strength or rigidity of the third base portion 2013. A thickness of the first base portion 2011 may be greater than a thickness of the second base portion 2012 and a thickness of the third base portion 2013. In other words, the first base portion 2011 may dominate mechanical properties of the foldable support plate 130, and both the second base portion 2012 and the third base portion 2013 may affect the mechanical properties of the foldable support plate 130 on a basis of the first base portion 2011. For example, the material of the first base portion 2011 is titanium and titanium alloy, and both the material of the second base portion 2012 and the material of the third base portion 2013 are aluminum alloy or copper alloy.

As shown in 2004 in FIG. 21, the support plate base 1300 may include a first base portion 2011, a second base portion 2012, and a third base portion 2013. The first base portion 2011 may be located between the second base portion 2012 and the third base portion 2013. In an example, two adjacent base portions (for example, the first base portion 2011 and the second base portion 2012, or the first base portion 2011 and the third base portion 2013) may be pasted together through glue, a solid adhesive film, or the like. In another example, two adjacent base portions may be fastened together through welding. In another example, two adjacent base portions may be connected, for example, through hot pack rolling.

With reference to the flexible display module 200 shown in FIG. 18 or FIG. 19, both an interface between the first base portion 2011 and the second base portion 2012 and an interface between the first base portion 2011 and the third base portion 2013 may be perpendicular to the flexible display 110. That the interface is perpendicular to the flexible display 110 may mean that a target plane on which the interface is located may intersect the flexible display 110 to obtain a target line segment, and an included angle between a tangent plane of the flexible display 110 on the target line segment and the target plane may be approximately 90°.

The first base portion 2011, the second base portion 2012, and the third base portion 2013 may each correspond to a region of the foldable support plate 130. In an example shown in 2004, this embodiment of this application is not intended to limit specific regions of the foldable support plate 130 corresponding to the first base portion 2011, the second base portion 2012, and the third base portion 2013.

In an example, the first base portion 2011 may correspond to the first transition support portion 134, the second transition support portion 135, the third transition support portion 136, the fourth transition support portion 137, and the foldable support portion 133 of the foldable support plate 130, the second base portion 2012 may correspond to the first support portion 131 of the foldable support plate 130, and the third base portion 2013 may correspond to the second support portion 132 of the foldable support plate 130.

In another example, the first base portion 2011 may correspond to the foldable support portion 133, the third transition support portion 136, and the fourth transition support portion 137 of the foldable support plate 130. The second base portion 2012 may correspond to the first support portion 131 and the first transition support portion 134 of the foldable support plate 130, and the third base portion 2013 may correspond to the second support portion 132 and the second transition support portion 135 of the foldable support plate 130.

In another example, the first base portion 2011 may correspond to the foldable support portion 133 of the foldable support plate 130, the second base portion 2012 may correspond to the first transition support portion 134, the third transition support portion 136, and the first support portion 131 of the foldable support plate 130, and the third base portion 2013 may correspond to the second transition support portion 135, the fourth transition support portion 137, and the second support portion 132 of the foldable support plate 130.

A material of the first base portion 2011 is different from a material of the second base portion 2012. The material of the second base portion 2012 may be the same as or different from a material of the third base portion 2013. Material properties of the second base portion 2012 may be similar to or slightly different from material properties of the third base portion 2013.

Strength or rigidity of the first base portion 2011 may be higher than strength or rigidity of the second base portion 2012. For example, the material of the first base portion 2011 is titanium and titanium alloy, and the material of the second base portion 2012 is aluminum alloy or copper alloy. In other words, a portion corresponding to a bendable region (which may include the foldable support portion 133, and may further include partial or entire regions of the first transition support portion 134 and the second transition support portion 135) of the foldable support plate 130 is made of a relatively hard material with relatively high strength or rigidity. This helps improve the bending performance of the foldable support plate 130 in a local region. A portion corresponding to a flat region (which may include the first support portion 131 and the second support portion 132) of the foldable support plate 130 is made of a relatively soft material with relatively low strength or rigidity. In other words, a material with high bending performance may not be used in a region that does not need to be bent. This helps take into account other performance (such as lightweight and heat dissipation performance) of the foldable support plate 130.

In FIG. 21, 2005 is an example slightly different from 2004. In comparison with 2004 in FIG. 21, a surface that is of the first base portion 2011 and that faces the second base portion 2012 is a first side surface 20111. When the support plate base 1300 is in the unfolded state, an included angle $\theta_1$ between the first side surface 20111 and a first end surface of the first base portion 2011 (the first end surface of the first base portion 2011 may be an upper surface or a lower surface of the first base portion 2011) may be as follows: $0°<\theta_1<90°$. For example, $\theta_1$ may be 30°, 45°, or 60°. The first end surface may be an exposed surface of the first base portion 2011.

Similarly, a surface that is of the first base portion 2011 and that faces the third base portion 2013 is a second side surface 20112. When the support plate base 1300 is in the unfolded state, an included angle between the second side surface 20112 and the first end surface of the first base portion 2011 may be greater than 0° and less than 90°.

The example shown in 2005 is beneficial to increasing a bonding force between two adjacent base portions. The support plate base 1300 shown in 2005 may be, for example, obtained through hot pack rolling.

As shown in 2006 and 2007 in FIG. 21, the support plate base 1300 may include a first base portion 2011 and a second base portion 2012. The second base portion 2012 may include a base groove used to accommodate the first base portion 2011. The first base portion 2011 may be accommodated in the base groove of the second base portion 2012. The second base portion 2012 may be wrapped around a first end surface 20113, a first side surface 20111, and a second side surface 20112 of the first base portion 2011. In other words, the first end surface 20113, the first side surface 20111, and the second side surface 20112 of the first base portion 2011 all face the second base portion 2012. The first end surface 20113 may be connected between the first side surface 20111 and the second side surface 20112. The first end surface may be an exposed surface of the first base portion 2011. The support plate base 1300 shown in 2006 and 2007 may be, for example, obtained through hot pack rolling.

In an example, the first base portion 2011 and a region that is of the second base portion 2012 and that faces the first end surface 20113 may correspond to the first transition support portion 134, the second transition support portion 135, the third transition support portion 136, the fourth transition support portion 137, and the foldable support portion 133 of the foldable support plate 130, and a remaining region of the second base portion 2012 may correspond to the first support portion 131 and the second support portion 132 of the foldable support plate 130.

In another example, the first base portion 2011 and a region that is of the second base portion 2012 and that faces the first end surface 20113 may correspond to the foldable support portion 133, the third transition support portion 136, and the fourth transition support portion 137 of the foldable support plate 130. A remaining region of the second base portion 2012 may correspond to the first support portion 131, the first transition support portion 134, the second support portion 132, and the second transition support portion 135 of the foldable support plate 130.

In another example, the first base portion 2011 and a region that is of the second base portion 2012 and that faces the first end surface 20113 may correspond to the foldable support portion 133 of the foldable support plate 130, and a remaining region of the second base portion 2012 may correspond to the first transition support portion 134, the first support portion 131, the second transition support portion 135, the second support portion 132, the third transition support portion 136, and the fourth transition support portion 137 of the foldable support plate 130.

A material of the first base portion 2011 may be different from a material of the second base portion 2012. In an example, strength or rigidity of the first base portion 2011 may be higher than strength or rigidity of the second base portion 2012. For example, the material of the first base portion 2011 is titanium and titanium alloy, and the material of the second base portion 2012 is aluminum alloy or copper alloy.

In an example shown in 2006, when the support plate base 1300 is in the unfolded state, an included angle between the first side surface 20111 and the first end surface 20113 may be 90°. In examples shown in 2007, when the support plate base 1300 is in the unfolded state, an included angle $\theta_{2a}$ between the first side surface 20111 and the first end surface 20113 may be as follows: $0°<\theta_{2a}<90°$ (as shown in 20071 in FIG. 21); or an included angle $\theta_{2b}$ between the first side surface 20111 and the first end surface 20113 may be as follows: $90°<\theta_{2b}<180°$ (as shown in 20072 in FIG. 21).

An area of an interface between the first base portion 2011 and the second base portion 2012 in the examples shown in 2006 and 2007 is larger than that in the example shown in 2005. This helps increase the bonding force between two adjacent base portions. In comparison with the example shown in 2006, in the examples shown in 2007, the area of the interface between the first base portion 2011 and the second base portion 2012 is further increased, the second base portion 2012 has a dovetail structure, and an opening of the second base portion 2012 may be used to lock the first base portion 2011. This helps further increase the bonding force between two adjacent base portions.

In addition, in the example shown in 2004, a pasting process is relatively simple. There may be a height difference between two end surfaces of the first base portion 2011 and the second base portion 2012 on a same side. This may affect the flatness of the flexible display 110. In the examples shown in 2005, 2006, and 2007, the support plate base 1300 obtained through hot pack rolling may have relatively high flatness.

As shown in 2008 in FIG. 21, the support plate base 1300 may include a first base portion 2011, a second base portion 2012, and a third base portion 2013. The first base portion 2011 may include a first recess and a second recess. The first recess and the second recess are located at two ends of the first base portion 2011, and are disposed on a same end surface of the first base portion 2011. The second base portion 2012 may be disposed in the first recess, and the third base portion 2013 may be disposed in the second recess. The support plate base 1300 shown in 2008 may be, for example, obtained through hot pack rolling.

Surfaces that are of the first base portion 2011 and that face the second base portion 2012 include a first recess surface 20114 and a first side surface 20111. Surfaces that are of the first base portion 2011 and that face the third base portion 2013 include a second recess surface 20115 and a second side surface 20112. In an example shown in 2008, when the support plate base 1300 is in the unfolded state, an included angle $\theta_3$ between the first side surface 20111 and the first recess surface 20114 may be as follows: $0°<\theta3<180°$. Similarly, when the support plate base 1300 is in the unfolded state, an included angle between the second side surface 20112 and the second recess surface 20115 may be greater than 0° and less than 180°.

In an example, the second base portion 2012 and a region that is of the first base portion 2011 and that faces the second base portion 2012 may correspond to the first support portion 131 of the foldable support plate 130, and the third base portion 2013 and a region that is of the first base portion 2011 and that faces the third base portion 2013 may correspond to the second support portion 132 of the foldable support plate 130. A remaining region of the first base portion 2011 may correspond to the first transition support portion 134, the second transition support portion 135, the third transition support portion 136, the fourth transition support portion 137, and the foldable support portion 133 of the foldable support plate 130.

In another example, the second base portion 2012 and a region that is of the first base portion 2011 and that faces the second base portion 2012 may correspond to the first support portion 131 and the first transition support portion 134 of the foldable support plate 130, and the third base portion 2013 and a region that is of the first base portion 2011 and that faces the third base portion 2013 may correspond to the second support portion 132 and the second transition support portion 135 of the foldable support plate 130. The remaining region of the first base portion 2011 may correspond to the foldable support portion 133, the third transition support portion 136, and the fourth transition support portion 137 of the foldable support plate 130.

In another example, the second base portion 2012 and a region that is of the first base portion 2011 and that faces the second base portion 2012 may correspond to the first transition support portion 134, the first support portion 131, and the third transition support portion 136 of the foldable support plate 130, and the third base portion 2013 and a region that is of the first base portion 2011 and that faces the third base portion 2013 may correspond to the second transition support portion 135, the second support portion 132, and the fourth transition support portion 137 of the foldable support plate 130. A remaining region of the first base portion 2011 may correspond to the foldable support portion 133 of the foldable support plate 130.

A material of the first base portion 2011 is different from a material of the second base portion 2012. The material of the second base portion 2012 may be the same as or different from a material of the third base portion 2013. Material properties of the second base portion 2012 may be similar to or slightly different from material properties of the third base portion 2013.

As shown in 2008 in FIG. 21, in an example, the second base portion 2012 and the third base portion 2013 may be located on a side that is of the first base portion 2011 and that faces or is close to the flexible display 110. In other words, the second base portion and the third base portion 2013 may be relatively close to the flexible display 110.

As shown in 2008 in FIG. 21, in another example, the second base portion 2012 and the third base portion 2013 may be located on a side that is of the first base portion 2011 and that is back or away from the flexible display 110. In other words, the second base portion and the third base portion 2013 may be relatively away from the flexible display 110.

A contact area of two adjacent base portions in the example shown in 2008 is larger than that in the examples shown in 2006 and 2007. This helps increase the bonding force between the two adjacent base portions.

As shown in 2009 in FIG. 21, the support plate base 1300 may include a first base portion 2011, a second base portion 2012, a fourth base portion 2014, a third base portion 2013, and a fifth base portion 2015.

The first base portion 2011 may include a first recess, a second recess, a third recess, and a fourth recess. The first recess and the third recess are located at two ends of the first base portion 2011, and are connected to a first end surface of the first base portion 2011. The second recess and the fourth recess are located at the two ends of the first base portion 2011, and are connected to a second end surface of the first base portion 2011. The first end surface and the second end surface are respectively located on upper and lower sides of the first base portion 2011. The first recess and the second recess may be located at a first end of the first base portion 2011 and on two sides of the first base portion 2011. Recess directions of the first recess and the second recess are different. The third recess and the fourth recess may be located at a second end of the first base portion 2011 and on two sides of the first base portion 2011. Recess directions of the third recess and the fourth recess are different.

The second base portion 2012 may be disposed in the first recess, the third base portion 2013 may be disposed in the second recess, the fourth base portion 2014 may be disposed in the third recess, and the fifth base portion 2015 may be disposed in the fourth recess. The support plate base 1300 shown in 2009 may be, for example, obtained through hot pack rolling. The second base portion 2012 and the third base portion 2013 may respectively face the upper and lower sides of the first base portion 2011. The second base portion 2012 and the third base portion 2013 may be located at the first end of the first base portion 2011. The fourth base portion 2014 and the fifth base portion 2015 may respectively face the upper and lower sides of the first base portion 2011. The fourth base portion 2014 and the fifth base portion 2015 may be located at the second end of the first base portion 2011.

Surfaces that are of the first base portion 2011 and that face the second base portion 2012 include a first recess surface 20114 and a first side surface 20111. Surfaces that are of the first base portion 2011 and that face the third base portion 2013 include a second recess surface 20117 and a third side surface 20116. Surfaces that are of the first base portion 2011 and that face the fourth base portion 2014 include a third recess surface 20115 and a second side surface 20112. Surfaces that are of the first base portion 2011 and that face the fifth base portion 2015 include a fourth recess surface 20119 and a fourth side surface 20118.

In an example shown in 2009, when the support plate base 1300 is in the unfolded state, an included angle $\theta_4$ between the first side surface 20111 and the first recess surface 20114 may be as follows: $0°<\theta_4<180°$. Similarly, when the support plate base 1300 is in the unfolded state, an included angle between the second side surface 20112 and the third recess surface 20115 may be greater than 0° and less than 180°, an included angle between the third side surface 20116 and the second recess surface 20117 may be greater than 0° and less than 180°, and an included angle between the fourth side surface 20118 and the fourth recess surface 20119 may be greater than 0° and less than 180°.

In an example, a region that is of the first base portion 2011 and that faces the second base portion 2012, the second base portion 2012, a region that is of the first base portion 2011 and that faces the third base portion 2013, and the third base portion 2013 may correspond to the first support portion 131 of the foldable support plate 130. A region that is of the first base portion 2011 and that faces the fourth base portion 2014, the fourth base portion 2014, a region that is of the first base portion 2011 and that faces the fifth base portion 2015, and the fifth base portion 2015 may correspond to the second support portion 132 of the foldable support plate 130. A remaining region of the first base portion 2011 may correspond to the first transition support portion 134, the second transition support portion 135, the third transition support portion 136, the fourth transition support portion 137, and the foldable support portion 133 of the foldable support plate 130.

In another example, a region that is of the first base portion 2011 and that faces the second base portion 2012, the second base portion 2012, a region that is of the first base portion 2011 and that faces the third base portion 2013, and the third base portion 2013 may correspond to the first support portion 131 and the first transition support portion 134 of the foldable support plate 130. A region that is of the first base portion 2011 and that faces the fourth base portion 2014, the fourth base portion 2014, a region that is of the first base portion 2011 and that faces the fifth base portion 2015, and the fifth base portion 2015 may correspond to the second support portion 132 and the second transition support portion 135 of the foldable support plate 130. The remaining region of the first base portion 2011 may correspond to the foldable support portion 133, the third transition support portion 136, and the fourth transition support portion 137 of the foldable support plate 130.

In still another example, a region that is of the first base portion 2011 and that faces the second base portion 2012, the second base portion 2012, a region that is of the first base portion 2011 and that faces the third base portion 2013, and the third base portion 2013 may correspond to the first transition support portion 134, the third transition support portion 136, and the first support portion 131 of the foldable support plate 130. A region that is of the first base portion 2011 and that faces the fourth base portion 2014, the fourth base portion 2014, a region that is of the first base portion 2011 and that faces the fifth base portion 2015, and the fifth base portion 2015 may correspond to the second transition support portion 135, the fourth transition support portion 137, and the second support portion 132 of the foldable support plate 130. A remaining region of the first base portion 2011 may correspond to the foldable support portion 133 of the foldable support plate 130.

A material of the first base portion 2011 is different from a material of the second base portion 2012. The material of the second base portion 2012, a material of the third base portion 2013, a material of the fourth base portion 2014, and a material of the fifth base portion 2015 may be the same or may be different. Material properties of the second base portion 2012, material properties of the fourth base portion 2014, material properties of the third base portion 2013, and material properties of the fifth base portion 2015 may be similar or slightly different. In a possible example, strength or rigidity of the first base portion 2011 may be higher than strength or rigidity of the second base portion 2012, the third base portion 2013, the fourth base portion 2014, and the fifth base portion 2015. For example, the material of the first base portion 2011 is titanium and titanium alloy, and the materials of the second base portion 2012, the third base portion 2013, the fourth base portion 2014, and the fifth base portion 2015 are all aluminum alloy or copper alloy.

A view of the support plate base 1300 shown in FIG. 22 may be obtained by observing 2004 in a Y direction shown in FIG. 21. With reference to FIG. 21 and FIG. 22, the following describes several possible interfaces between two adjacent base portions. For ease of description, the following uses the interface between the first base portion 2011 and the second base portion 2012 as an example for description. The interface between the first base portion 2011 and the third base portion 2013 may have similar shape features.

As shown in 2101 in FIG. 22, an interface between two adjacent base portions may be, for example, a plane. In an example shown in 2101, the plane may be a surface whose roughness is ignored. In other words, unevenness introduced by surface roughness can be ignored. A bonding force of the interface shown in 2101 in FIG. 22 mainly depends on a bonding agent (such as solder, glue, or a solid adhesive film) between the two adjacent base portions.

As shown in 2102 to 2108 in FIG. 22, a surface that is of the first base portion 2011 and that faces the second base portion 2012 may include a plurality of first interface protrusions and a plurality of first interface grooves. A surface that is of the second base portion 2012 and that faces the first base portion 2011 may include a plurality of second protrusions and a plurality of second grooves. The first interface protrusions may match the second grooves, and the first interface grooves may match the second protrusions. In comparison with the interface shown in 2101 in FIG. 22, a matching relationship between the protrusions and the grooves helps improve the bonding force of the interface between the two adjacent base portions. The protrusions and the grooves may be, for example, obtained through chemical etching.

As shown in 2102 in FIG. 22, the first interface protrusions and the second protrusions may be tapered protrusions, and the first interface grooves and the second grooves may be tapered grooves.

As shown in 2103 in FIG. 22, the first interface protrusions and the second protrusions may be square protrusions, and the first interface grooves and the second grooves may be square grooves.

As shown in 2104 in FIG. 22, the first interface protrusions and the second protrusions may be trapezoidal protrusions, and the first interface grooves and the second grooves may be trapezoidal grooves.

As shown in 2105 in FIG. 22, the first interface protrusions may be arc-shaped protrusions, the second protrusions may be square protrusions, the first interface grooves may be square grooves, and the second grooves may be arc-shaped grooves.

As shown in 2106 in FIG. 22, the first interface protrusions and the second protrusions may be arc-shaped protrusions, and the first interface grooves and the second grooves may be arc-shaped grooves.

As shown in 2107 in FIG. 22, the first interface protrusions may be arc-shaped protrusions, the second protrusions may be dovetail-shaped protrusions, the first interface grooves may be dovetail-shaped grooves, and the second grooves may be arc-shaped grooves.

As shown in 2108 in FIG. 22, the first interface protrusions and the second protrusions may be dovetail-shaped protrusions, and the first interface grooves and the second grooves may be dovetail-shaped grooves.

The matching of the arc-shaped protrusions and the arc-shaped grooves helps reduce stress concentration of the interface under an external force. A larger contact area of the protrusions and the grooves is more beneficial to increasing the bonding force of the interface. For example, a bonding force of an interface including dovetail-shaped protrusions and dovetail-shaped grooves may be slightly greater than a bonding force of an interface including square protrusions and square grooves. The bonding force of the interface including square protrusions and square grooves may be slightly greater than a bonding force of an interface including tapered protrusions and tapered grooves.

The first base portion 2011 with high yield strength and high toughness and the second base portion 2012 with high thermal conductivity or low density are combined through stacking, splicing, lapping, inlaying, or the like, so that requirements for the support plate base 1300, such as lightweight, high thermal conductivity, high modulus, low impedance, high bonding force, and salt spray resistance, can be met in a targeted manner, to help meet diversified requirements for the foldable support plate 130. In addition, the support plate base 1300 provided in this embodiment of this application helps reduce the weight of the foldable support plate 130. For example, for the foldable electronic device 100 including the 8-inch flexible display 110, the weight of the foldable support plate 130 may be, for example, approximately 12-13 g.

As shown in FIG. 18 and FIG. 19, the foldable support plate 130 may include groove structures. The groove structures may be, for example, through grooves 1331 or blind grooves 1332. In the example shown in FIG. 18, the foldable support portion 133, the first transition support portion 134, and the second transition support portion 135 of the foldable support plate 130 each may be provided with a plurality of through grooves 1331. In the examples shown in FIG. 19 and FIG. 20, the foldable support portion 133 of the foldable support plate 130 may be provided with a plurality of through grooves 1331, and the first transition support portion 134 and the second transition support portion 135 each may be provided with a plurality of blind grooves 1332. When the foldable support plate 130 is relatively thick, disposing the groove structures helps improve the bending performance of the foldable support plate 130, so that the foldable support plate 130 can provide relatively good support performance for the flexible display 110 and have a relatively long bending fatigue life.

As shown in FIG. 20, the foldable support plate 130 may include a plurality of through grooves 1331 and a plurality of blind grooves 1332. The through grooves 1331 may be disposed in the foldable support portion 133 of the foldable support plate 130. The blind grooves 1332 may be disposed in the first transition support portion 134 or the second transition support portion 135 of the foldable support plate 130. When the foldable support portion 133 is in the bent state, a bending degree of the foldable support portion 133 is relatively large. Therefore, disposing the through grooves 1331 helps reduce the bending stress of the foldable support portion 133. When the foldable support portion 133 is in the bent state, the first transition support portion 134 and the second transition support portion 135 are slightly bent, and a bending degree is relatively small. The blind grooves 1332 are disposed at positions with a relatively small bending degree, so that both the bending performance and support performance of the flexible display module 200 can be taken into account. That the foldable support portion 133 is in the bent state may mean that the foldable support portion 133 is folded, the first support portion 131 is parallel to, is spaced apart from, and faces the second support portion 132, and a spacing distance between the first support portion 131 and the second support portion 132 is minimal. Different groove structures are disposed in a plurality of regions of the foldable support plate 130. This helps flexibly adjust bending performance and anti-extrusion performance of the plurality of regions of the foldable support plate 130. FIG. 23A to FIG. 23D are views of C-C in FIG. 20. As shown in FIG. 23A to FIG. 23D, the through groove 1331 may penetrate the support plate base 1300 of the foldable support plate 130. The blind groove 1332 may not penetrate the support plate base 1300 of the foldable support plate 130. A depth of the blind groove 1332 may be less than the thickness of the support plate base 1300. A width $L_4$ of the blind groove 1332 may be greater than a maximum width of the through groove 1331.

The through groove 1331 and the blind groove 1332 may be, for example, obtained through chemical etching. Because the width of the blind groove 1332 is relatively large, an etching speed of the blind groove 1332 is relatively fast. When the blind groove 1332 is etched to a specified depth (for example, half the thickness of the support plate base 1300), the through groove 1331 has not been etched through. Therefore, the other side of the support plate base 1300 needs to be further etched to form the through groove 1331.

For example, first etching is performed on a region in which the through groove 1331 is located to obtain a to-be-processed blind groove, and second etching is performed on the to-be-processed blind groove on the other side of the region in which the through groove 1331 is located to obtain the through groove 1331. A depth of the to-be-processed blind groove is not necessarily half the thickness of the support plate base 1300.

FIG. 23A to FIG. 23D show several possible cross-sectional structures of the through groove 1331. The through groove 1331 may include a first groove 13311 and a second groove 13312. The first groove 13311 may communicate with the second groove 13312. With reference to the foregoing description, it can be learned that the first groove 13311 may be formed, for example, through the first etching, and the second groove 13312 may be formed, for example, through the second etching. As shown in FIG. 23A to FIG. 23D, the thickness of the support plate base 1300 may be, for example, T. A depth of the first groove 13311 may be, for example, $T_{1X}$, such as $T_{1a}$ to $T_{1d}$ in FIG. 23A to FIG. 23D. A depth of the second groove 13312 may be, for example, $T_{2X}$, such as $T_{2a}$ to $T_{2d}$ in FIG. 23A to FIG. 23D. $T=T_{1X}+T_{2X}$.

The first groove 13311 and the blind groove 1332 may be located on a same side of the support plate base 1300. A first end opening 13313 of the through groove 1331 may be formed on a side that is of the first groove 13311 and that is away from the second groove 13312. A second end opening 13314 of the through groove 1331 may be formed on a side that is of the second groove 13312 and that is away from the first groove 13311. The first end opening 13313 and an opening of the blind groove 1332 may be located on a same side of the support plate base 1300. In other words, an opening direction of the first end opening 13313 may be the same as an opening direction of the blind groove 1332.

A width of a boundary between the first groove 13311 and the second groove 13312 may be $W_1$. In an example, a width of the first end opening 13313 may be greater than the width $W_1$ of the boundary. A difference between the width of the first end opening 13313 and the width $W_1$ of the boundary may be $W_{2X}$, such as $W_{2a}$ to $W_{2d}$ in FIG. 23A to FIG. 23D. Similarly, a width of the second end opening 13314 may be greater than the width $W_1$ of the boundary. A difference between the width of the second end opening 13314 and the width $W_1$ of the boundary may be $W_{3X}$, such as $W_{3a}$ to $W_{3d}$ in FIG. 23A to FIG. 23D.

Figure 23A:
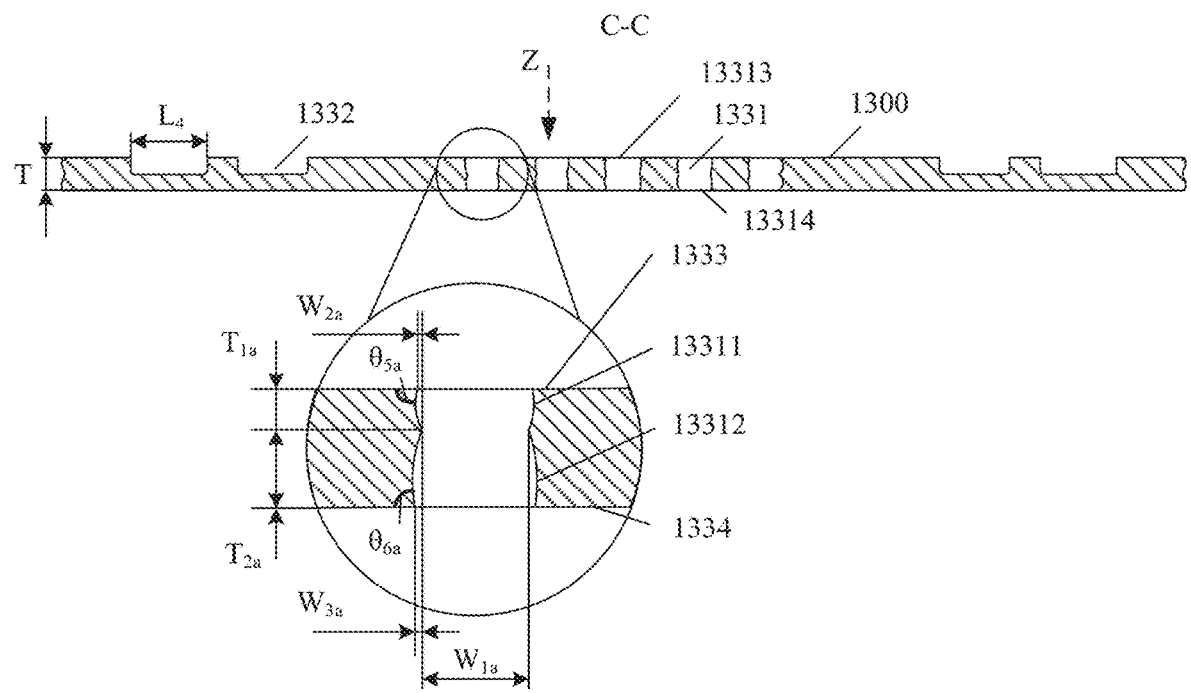
FIG. 23A is a schematic diagram of a structure of a through groove and a blind groove according to an embodiment of this application.
Figure 23B:
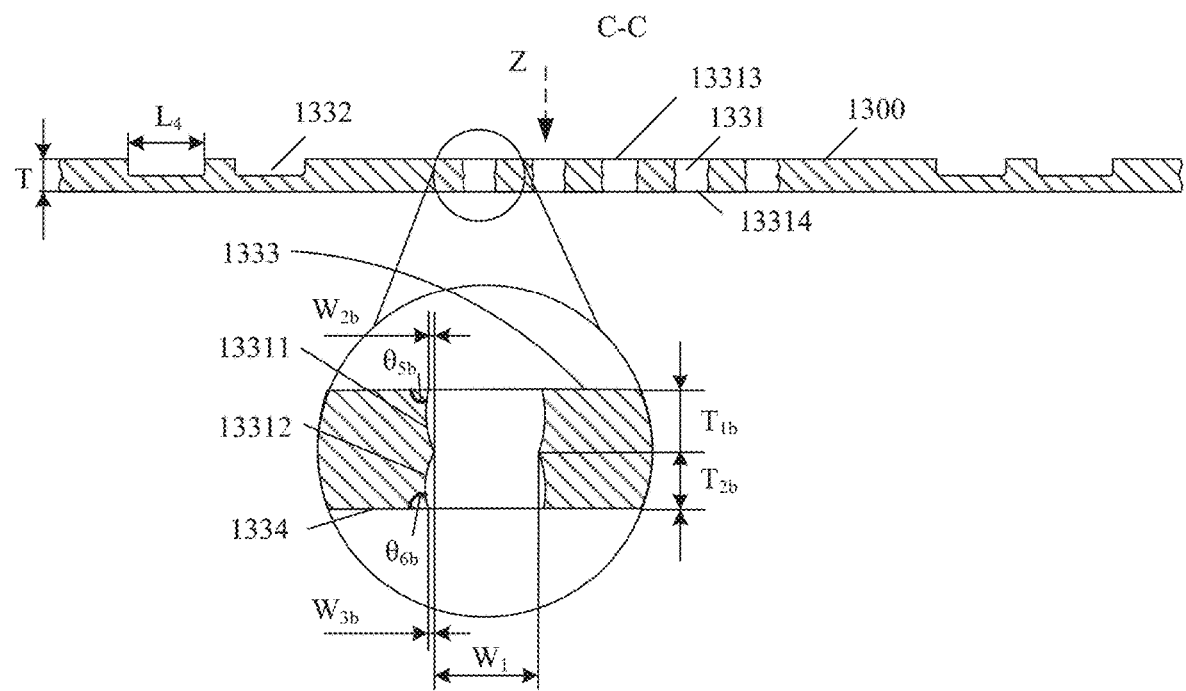
FIG. 23B is a schematic diagram of a structure of a through groove and a blind groove according to an embodiment of this application.
Figure 23C:
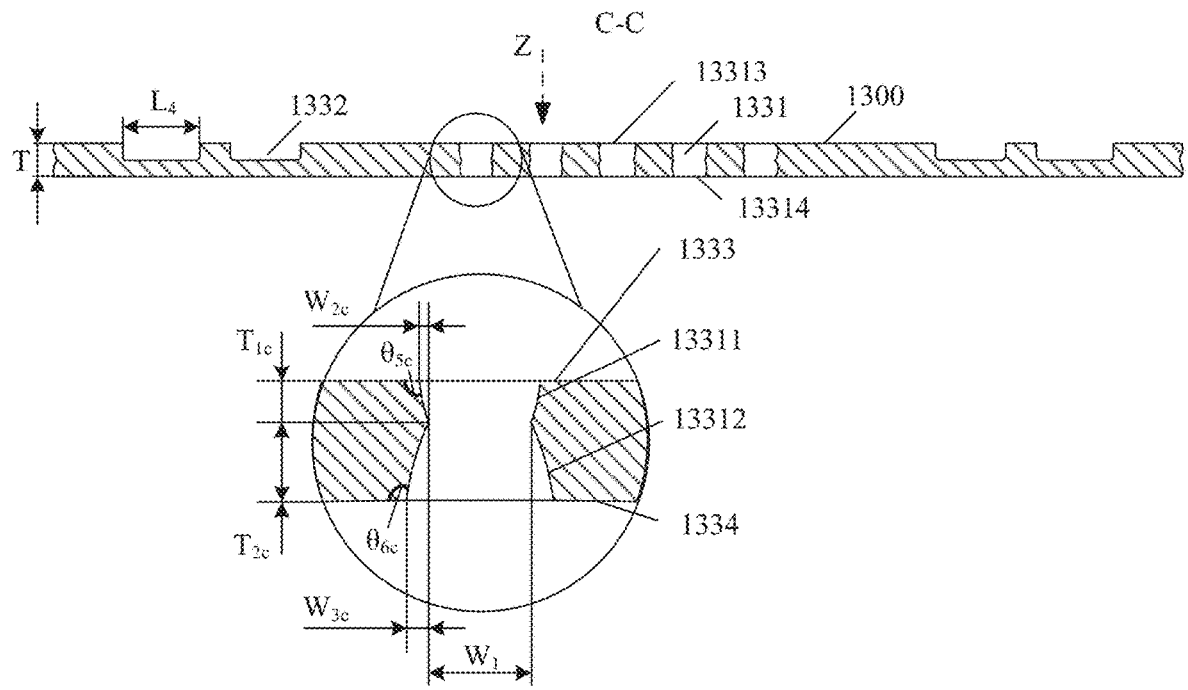
FIG. 23C is a schematic diagram of a structure of a through groove and a blind groove according to an embodiment of this application.

As shown in FIG. 23A and FIG. 23C, $W_{2X}$ may be less than $W_{3X}$. A difference between $W_{3X}$ and $W_{2X}$ may be greater than a preset width difference (for example, 0-0.1 mm). $W_{2X}$ may be, for example, less than or equal to 0.05 T. $W_{3X}$ may be, for example, 0.05 T to 0.2 T. In addition, a depth $T_{1X}$ of the first groove 13311 may be less than a depth $T_{2X}$ of the second groove 13312. A difference between $T_{1X}$ and $T_{2X}$ may be greater than a preset depth difference (for example, 0-0.02 mm).

Figure 23D:
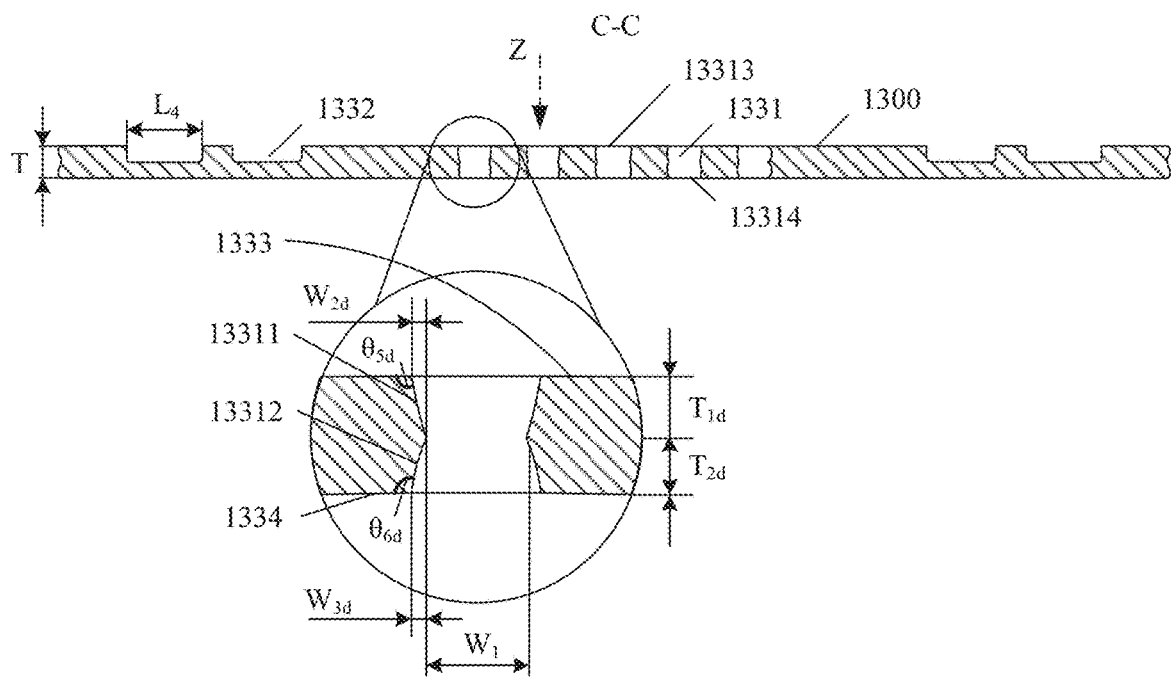
FIG. 23D is a schematic diagram of a structure of a through groove and a blind groove according to an embodiment of this application.

As shown in FIG. 23B and FIG. 23D, $W_{2X}$ may be equal to or approximately equal to $W_{3X}$. An absolute value of the difference between $W_{3X}$ and $W_{2X}$ may be less than the preset width difference. $W_{2X}$ may be, for example, 0.05 T to 0.2 T. $W_{3X}$ may be, for example, 0.05 T to 0.2 T. In addition, the depth Tix of the first groove 13311 may be equal to or approximately equal to the depth $T_{2X}$ of the second groove 13312. An absolute value of the difference between $T_{1X}$ and $T_{2X}$ may be less than the preset depth difference.

$\theta_{5a}$ to $\theta_{5d}$ in FIG. 23A to FIG. 23D are included angles $\theta_{5X}$ between a groove wall of the first groove 13311 and a first end surface 1333 of the support plate base 1300 at the first end opening 13313. The first end surface 1333 may be an end surface on which the first end opening 13313 is located. The first end surface 1333 may represent a tangible interface of the support plate base 1300. $\theta_{6a}$ to $\theta_{6d}$ in FIG. 23A to FIG. 23D are included angles $\theta_{6X}$ between a groove wall of the second groove 13312 and a second end surface 1334 of the support plate base 1300 at the second end opening 13314. The second end surface 1334 may be an end surface on which the second end opening 13314 is located. The second end surface 1334 may represent a tangible interface of the support plate base 1300.

As shown in FIG. 23A and FIG. 23B, $\theta_{5a}$ and $\theta_{5b}$ may be acute angles, and $\theta_{6a}$ and $\theta_{6b}$ may be acute angles. In other words, $\theta_{5X}$ may be greater than 0° and less than 90°, and $\theta_{6X}$ may be greater than 0° and less than 90°.

As shown in FIG. 23C and FIG. 23D, $\theta_{5c}$ and $\theta_{5d}$ may be obtuse angles, and $\theta_{6c}$ and $\theta_{6d}$ may be obtuse angles. In other words, $\theta_{5x}$ may be greater than 90° and less than 180°, and $\theta_{6X}$ may be greater than 900 and less than 180°.

An included angle (such as $\theta_{5X}$ or $\theta_{6X}$ described above) between an inner wall of the through groove 1331 and an end surface of the support plate base at the end opening can be adjusted by adjusting a side etching width (such as $W_{2X}$ or $W_{3X}$ described above) of the through groove 1331 is adjusted. In an example, a penetrated groove structure may be first etched in the support plate base 1300, and then a side wall of the groove structure is etched two or more times, to adjust a side wall structure of the through groove 1331. The side etching width of the through groove 1331 may be adjusted by adjusting etching parameters, such as an etching time, an etching speed, and an etching reagent ratio.

If the side etching width of the through groove 1331 is relatively large (for example, a ratio $W_{2X}/T_{1X}$ or a ratio $W_{3X}/T_{2X}$ is relatively large), the included angle between the inner wall of the through groove 1331 and the end surface of the support plate base at the end opening may be adjusted to an obtuse angle. If the side etching width of the through groove 1331 is relatively small (for example, the ratio $W_{2X}/T_{1X}$ or the ratio $W_{3X}/T_{2X}$ is relatively small), the included angle between the inner wall of the through groove 1331 and the end surface of the support plate base at the end opening may be adjusted to an acute angle.

Figure 23E:
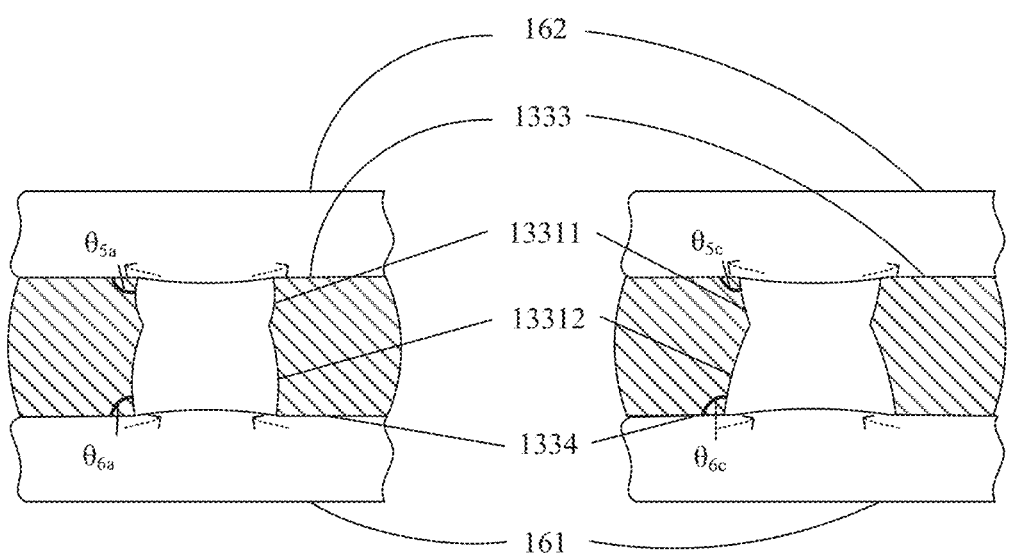
FIG. 23E is a schematic diagram of a structure of a through groove according to an embodiment of this application.

With reference to FIG. 23A and FIG. 23C, FIG. 23E shows impact of the included angles $\theta_{5X}$ and $\theta_{6X}$ on the life of the foldable support plate 130. In an example, one side of the foldable support portion 133 is attached to the flexible display 110 through an adhesive layer 161. A filling material 162, such as polyurethane (polyurethane, PU) Mylar, may be disposed on the other side of the foldable support portion 133. Space between the foldable support portion 133 and another component (for example, a door plate of the hinge mechanism 125) may be filled with the filling material 162. The filling material 162 may be, for example, configured to prevent dust from the hinge mechanism 125 from being in contact with the foldable support plate 130. The adhesive layer 161 and the filling material 162 may partially extend into the through groove 1331. When the foldable support portion 133 changes from the flat state to the bent state, the adhesive layer 161 may be shrunk inward, and the filling material 162 may be pulled outward. In other words, the adhesive layer 161 extending into the through groove 1331 tends to deform and flow into the through groove 1331 (as shown by dashed arrows in FIG. 23E), and the filling material 162 tends to deform and flow out of the through groove 1331 (as shown by dashed arrows in FIG. 23E). When the foldable support portion 133 changes from the bent state to the flat state, the adhesive layer 161 may be pulled outward, and the filling material 162 may be shrunk inward. In other words, the adhesive layer 161 extending into the through groove 1331 tends to deform and flow out of the through groove 1331, and the filling material 162 extending into the through groove 1331 tends to deform and flow into the through groove 1331. After a plurality of times of folding, the end opening of the through groove 1331 may tend to cut the adhesive layer 161 and the filling material 162. $\theta_{5X}$ and $\theta_{6X}$ are set to obtuse angles, to help reduce a force of the end opening of the through groove 1331 to poke the adhesive layer 161 and the filling material 162, and further help prolong a service life of the foldable electronic device 100.

Figure 24:
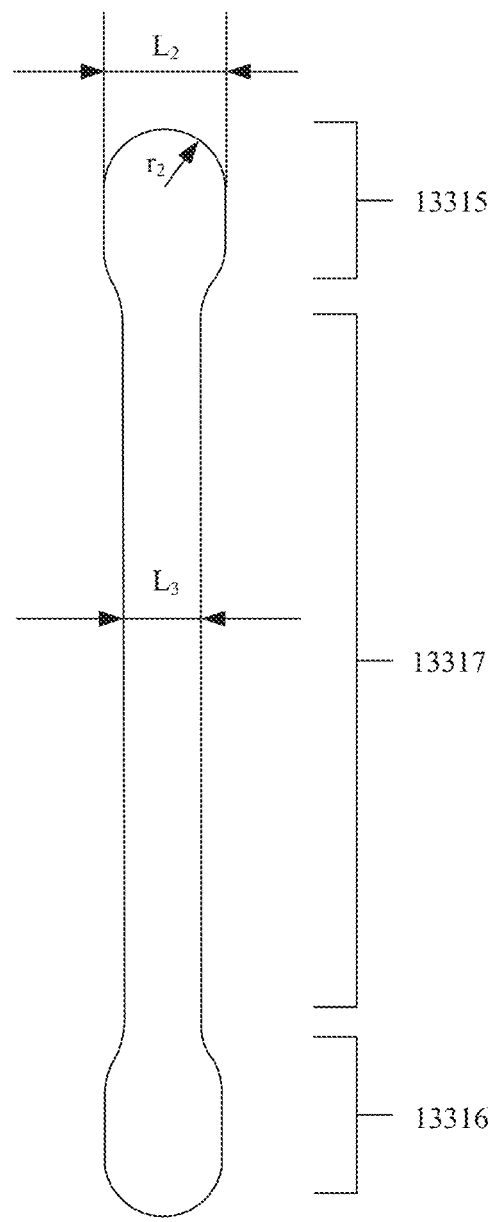
FIG. 24 is a schematic diagram of a structure of a through groove according to an embodiment of this application.

A schematic diagram of a structure of an end opening of the through groove shown in FIG. 24 may be obtained by observing the support plate base 1300 in a Z direction shown by a dashed line in FIG. 23A to FIG. 23D. The end opening of the through groove shown in FIG. 24 may be the first end opening 13313 or the second end opening 13314 of the through groove 1331.

As shown in FIG. 24, the end opening of the through groove may be dumbbell-shaped. An end opening shape of the through groove 1331 may include a first end opening 13315, a second end opening 13316, and a strip opening 13317 connected between a first end and a second end.

As shown in FIG. 24, a width $L_2$ of the first end opening 13315 may be greater than a width $L_3$ of the strip opening 13317. The width $L_2$ of the first end opening 13315 and the width $L_3$ of the strip opening 13317 may be greater than a preset width. For example, $L_2$ may be approximately 0.12 mm, and $L_3$ may be approximately 0.19-0.2 mm. The preset width may be, for example, greater than 0 mm and less than 0.07 mm. In this embodiment of this application, an extension direction of the strip opening 13317 or the end opening of the through groove may correspond to a length direction of the opening, and a width direction of the opening may correspond to a direction perpendicular to the length direction of the opening. The width of the opening may be a size of the opening in the width direction. Optionally, the first end opening 13315 may be transitionally connected to the strip opening 13317 through an arc or a fillet.

Similarly, a width of the second end opening 13316 may be greater than the width $L_3$ of the strip opening 13317. Optionally, the second end opening 13316 may be transitionally connected to the strip opening 13317 through an arc.

As shown in FIG. 24, there is a first arc on a side that is of the first end opening 13315 and that is away from the strip opening 13317. A diameter $2 \times r_2$ of the first arc may be greater than the width $L_3$ of the strip opening 13317. Similarly, there is a second arc on a side that is of the second end opening 13316 and that is away from the strip opening 13317. A diameter of the second arc may be greater than the width $L_3$ of the strip opening 13317.

Figure 25:
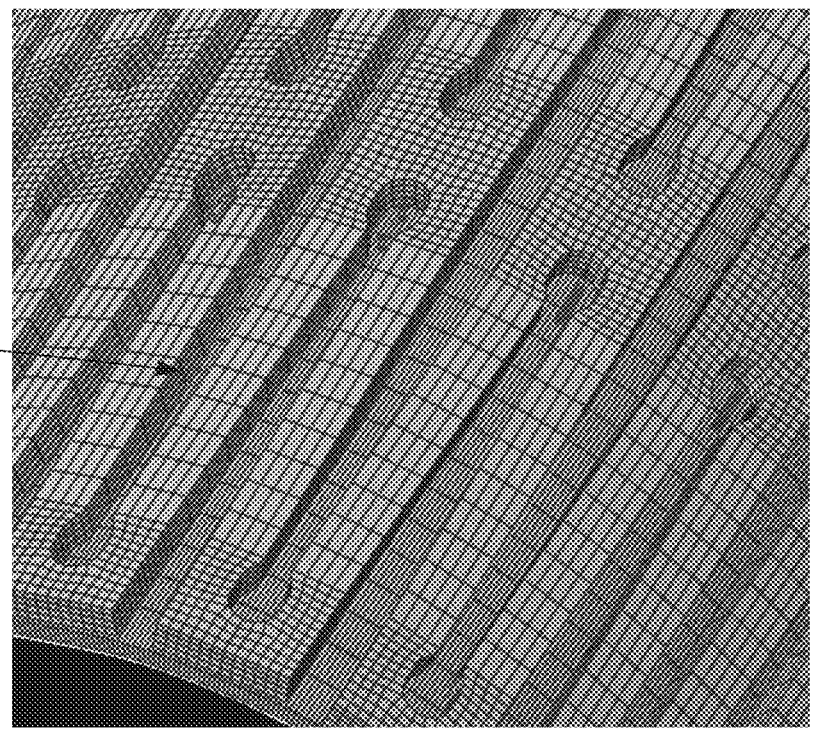
FIG. 25 is a stress nephogram of a through groove.

A relatively large width of the end opening helps reduce an external force required to bend the foldable support portion 133. In addition, when the width of the end opening is relatively large, a region in which bending stress can be shared is relatively large. This helps reduce a stress concentration trend. For example, in an example in which the width of the end opening is 0.19 mm, bending yield stress of the foldable support portion 133 may be reduced by 130 MPa in comparison with an example in which the width of the end opening is 0.12 mm. FIG. 25 is a bending stress nephogram of the dumbbell-shaped through groove 1331. It can be learned that grayscale distribution of the nephogram is uniform. There is no obvious stress concentration region. In other words, peak bending stress applied to the foldable support portion 133 is relatively small.

As shown in FIG. 24, the width $L_3$ of the strip opening 13317 may be less than a thickness T of the support plate base 1300 shown in FIG. 23A to FIG. 23D. The width $L_3$ of the strip opening 13317 may be, for example, approximately 70% to 90% of the thickness of the support plate base 1300. For example, $L_3$ may be approximately 80% of the thickness of the support plate base 1300.

A relatively small width of the strip opening 13317 helps improve an anti-extrusion capability of the foldable support portion 133 of the foldable support plate 130. For example, in an example in which the width of the strip opening 13317 is 0.12 mm, anti-extrusion performance of the foldable support portion 133 may be improved by 1.5 kg in comparison with an example in which the width of the strip opening 13317 is 0.2 mm. To improve the anti-extrusion capability of the foldable support portion 133, a proportion of a length of the strip opening 13317 to a length of the end opening shape of the through groove 1331 may be greater than a preset proportion, for example, 0.6 to 0.99. Optionally, the preset proportion may be, for example, 0.7 to 0.95. In other words, a proportion of a length of the first end opening 13315 or the second end opening 13316 in a total length of the end opening of the through groove may be 0.005 to 0.2, for example, 0.025 to 0.15, such as 0.1.

Two adjacent through grooves 1331A and 1331B are defined below. A first end of the through groove 1331A faces a first end of the through groove 1331B. A second end of the through groove 1331A is back from a second end of the through groove 1331B. A region between the first end of the through groove 1331A and the second end of the through groove 1331B is defined as a solid region. Because the strip opening 13317 may be relatively long, a proportion of a length of the solid region to a length of the through groove 1331A or the through groove 1331B may be relatively small. This helps improve bending performance of the foldable support portion 133, helps reduce bending stress of the first end opening 13315 and the second end opening 13316, and helps reduce stress concentration of the first end opening 13315 and the second end opening 13316. When the proportion of the length of the solid region to the length of the through groove 1331 is fixed, a relatively small absolute length of the solid region leads to a relatively poor effect of supporting the flexible display 110 by the solid region, that is, is not beneficial to the anti-extrusion performance of the foldable support portion 133. A relatively large absolute length of the solid region leads to a relatively good effect of supporting the flexible display 110 by the solid region, that is, helps improve the anti-extrusion performance of the foldable support portion 133. The proportion of the length of the solid region to the length of the through groove 1331 may be, for example, less than 0.1.

Properly adjusting the end opening shape of the through groove helps coordinate the bending performance and anti-extrusion performance of the foldable support plate 130, and further helps prolong the bending fatigue life of the foldable support plate 130 and the foldable electronic device 100. For example, the bending fatigue life may exceed 200,000 times.

Figure 26:
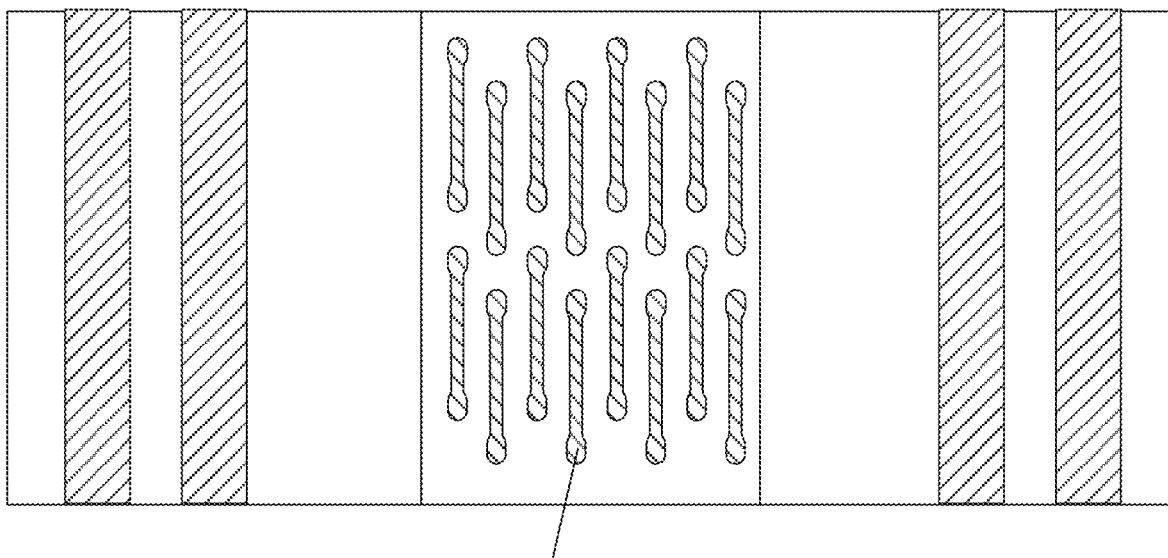
FIG. 26 is an arrangement diagram of through grooves and blind grooves according to an embodiment of this application.
Figure 27:
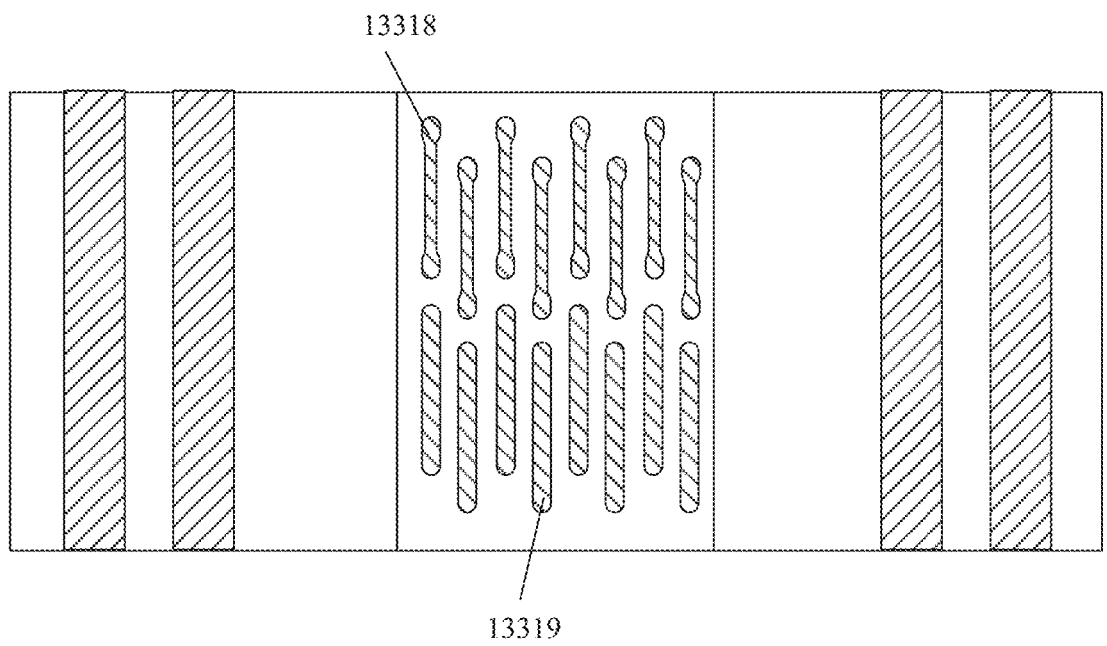
FIG. 27 is another arrangement diagram of through grooves and blind grooves according to an embodiment of this application.
Figure 28:
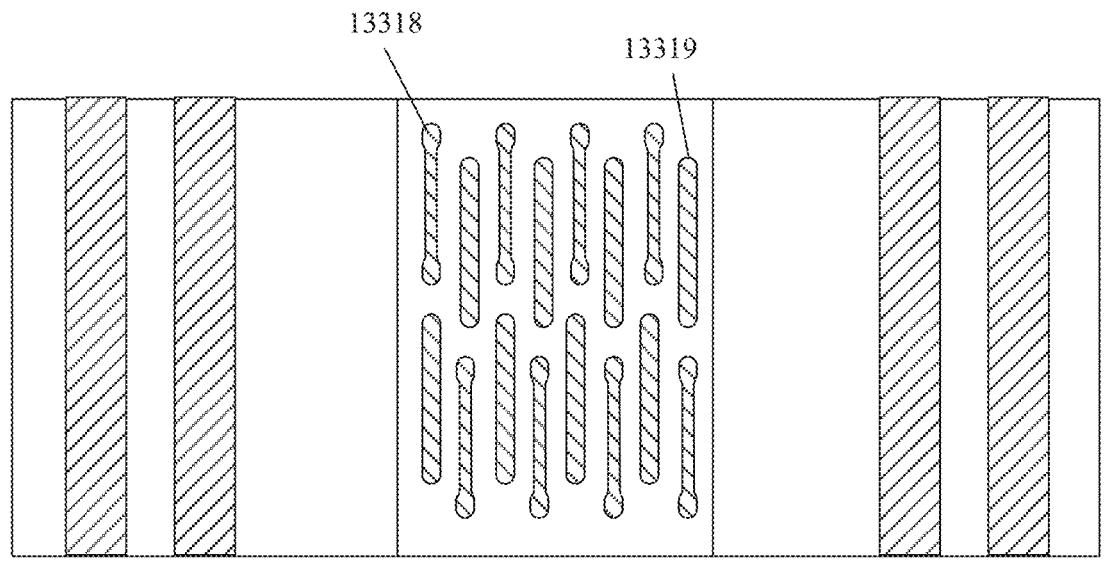
FIG. 28 is still another arrangement diagram of through grooves and blind grooves according to an embodiment of this application.

FIG. 26 to FIG. 28 show arrangement manners of the plurality of through grooves 1331 in the foldable support plate 130. It should be understood that a specific arrangement manner of the plurality of through grooves 1331 is not intended to be limited in this embodiment of this application.

In examples shown in FIG. 26 to FIG. 28, the plurality of through grooves 1331 may include a plurality of first-type through grooves 13318 (namely, dumbbell-shaped through grooves 1331) shown in FIG. 24. The plurality of first-type through grooves 13318 may be parallel to and spaced apart from each other. Optionally, two adjacent through grooves 1331 in a width direction of the through grooves 1331 may be staggered. Optionally, two adjacent through grooves 1331 in a length direction of the through grooves 1331 may be collinear and aligned.

In the examples shown in FIG. 27 and FIG. 28, the plurality of through grooves 1331 may further include second-type through grooves 13319 with a different shape from the first-type through grooves 13318. The second-type through grooves 13319 may be, for example, racetrack-shaped through grooves 1331. The plurality of first-type through grooves 13318 and the plurality of second-type through grooves 13319 may be parallel to and spaced apart from each other. Optionally, as shown in FIG. 27 and FIG. 27, two adjacent through grooves 1331 in the length direction of the through grooves 1331 may be a first-type through groove 13318 and a second-type through groove 13319. Optionally, as shown in FIG. 27, shapes of two adjacent through grooves 1331 in the width direction of the through grooves 1331 may be the same. Optionally, as shown in FIG. 28, shapes of two adjacent through grooves 1331 in the width direction of the through grooves 1331 may be different.

Figure 29:
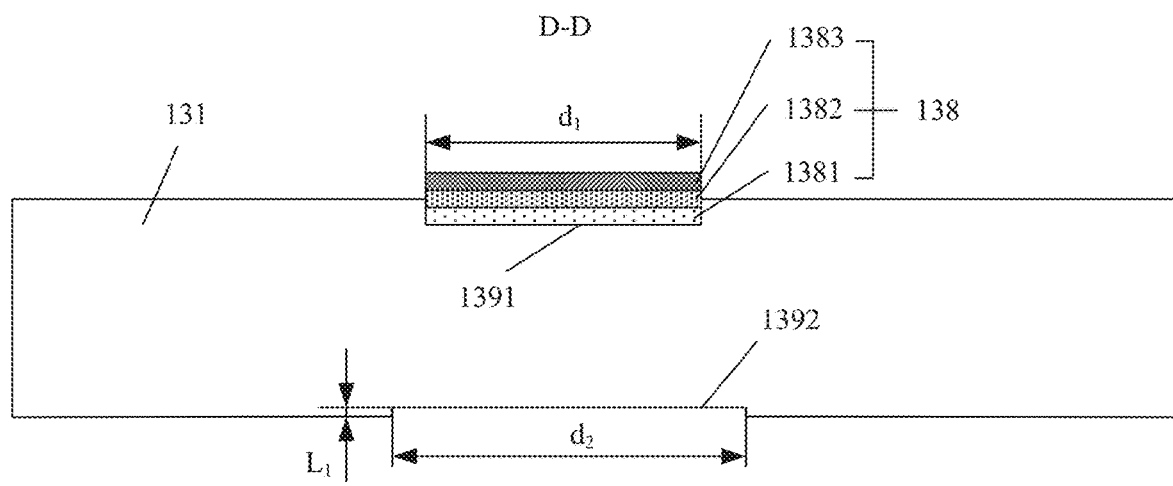
FIG. 29 is a schematic diagram of a structure of local plating according to an embodiment of this application.

With reference to FIG. 20 and FIG. 29, the foldable support plate 130 may include one or more local plating 138. The local plating 138 may serve as a pin of the foldable support plate 130. A shape of the local plating 138 may be, for example, a circle, a square, a rectangle, a polygon, or an ellipse. A specific shape of the local plating 138 is not intended to be limited in this embodiment of this application.

The local plating 138 may be, for example, disposed on the first support portion 131 or the second support portion 132. With reference to the examples shown in FIG. 19 and FIG. 20, the local plating 138 and the flexible display 110 may be located on two sides of the support plate base 1300. In other words, in the foldable electronic device 100, the local plating 138 may face or be close to a housing of the foldable electronic device 100, that is, be back or away from the flexible display 110 and disposed on a side of the first support portion 131 or the second support portion 132.

In the plurality of examples 2001 to 2009 shown in FIG. 21, the support plate base 1300 may be made of a single-phase material or a multiphase material. In an example, with reference to 2002 and 2008 shown in FIG. 21, the local plating 138 may be disposed on the first base portion 2011 of the support plate base 1300. In another example, with reference to 2002, 2003, 2004, 2005, 2006, 2007, 2008, and 2009 shown in FIG. 21, the local plating 138 may be disposed on the second base portion 2012 of the support plate base 1300. In still another example, with reference to 2003, 2004, 2005, 2008, and 2009 shown in FIG. 21, the local plating 138 may be disposed on the third base portion 2013 of the support plate base 1300.

FIG. 29 is a view of D-D in FIG. 20. As shown in FIG. 29, in an example, the local plating 138 includes, for example, nickel plating 1381, nickel sulfamate plating 1382, and gold plating 1383 that are stacked. The nickel sulfamate plating 1382 may be connected between the nickel plating 1381 and the gold plating 1383. The nickel plating 1381, the nickel sulfamate plating 1382, and the gold plating 1383 may be obtained, for example, through electroplating. The local plating 138 may be composite plating. In another example, the gold plating 1383 may be replaced by another plating, for example, rhodium-ruthenium plating or silver plating. A width $d_1$ of the local plating 138 may be, for example, less than 2 mm. For example, $d_1$<0.16 mm. A larger size of the local plating 138 indicates that the back of the support plate base 1300 is more prone to a protrusion, and it is easier for a user to observe a film print on the flexible display in a screen-off state.

Optionally, as shown in FIG. 29, the support plate base 1300 may further include a third groove 1392. The third groove 1392 and the local plating 138 may be disposed opposite to each other on two sides of the support plate base 1300.

Optionally, the support plate base 1300 may further include a fourth groove 1391. The local plating 138 may be disposed in the fourth groove 1391. The fourth groove 1391 and the third groove 1392 may be respectively located on an upper surface and a lower surface of the support plate base 1300. A width $d_2$ of the third groove 1392 may be, for example, greater than a width $d_1$ of the fourth groove 1391.

The fourth groove 1391 and the third groove 1392 may be disposed opposite to each other. It is assumed that the fourth groove 1391 is located on a first surface of the support plate base 1300, and the third groove 1392 is located on a second surface of the support plate base 1300. A projection region of the fourth groove 1391 on the first surface may be a first projection region. A projection region of an electroplated groove on the first surface may be a second projection region. An overlap proportion of the first projection region and the second projection region is greater than a preset overlap proportion. The preset overlap proportion may be, for example, 50% to 100%.

When the support plate base 1300 is in the unfolded state, a depth $L_1$ of the third groove 1392 may be, for example, less than 0.01 mm, such as less than 0.005 mm. Therefore, when the support plate base 1300 is folded, it is more difficult for the second surface to have a protrusion, or a height of the protrusion is smaller. For example, the height of the protrusion may be less than 0.01 mm.

Figure 30:
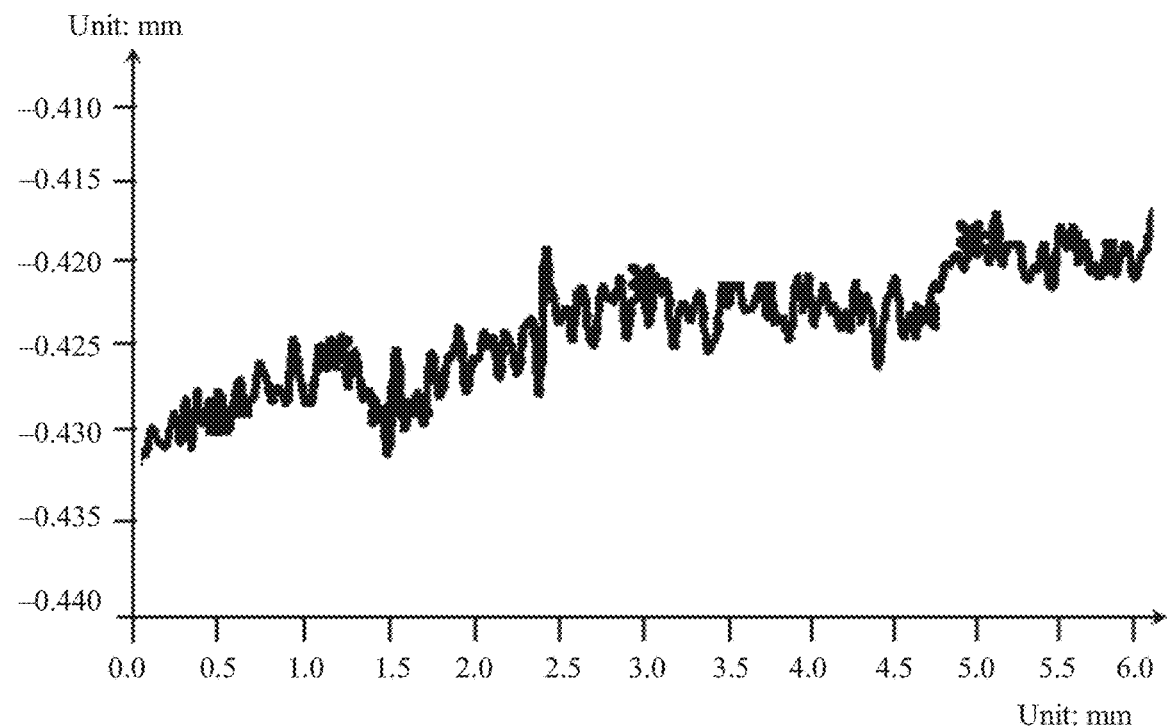
FIG. 30 is a schematic diagram of a surface profile of a support plate base according to an embodiment of this application.

As shown in the profile diagram in FIG. 30, when the local plating 138 is disposed on the support plate base 1300 or an oxide layer is removed only from a position at which the local plating 138 is disposed, an additional stress change may be introduced. Consequently, the second surface of the support plate base 1300 may have a protrusion at the position corresponding to the local plating 138. The protrusion affects the flatness of the flexible display 110. Before the oxide layer is removed, tensile stress introduced by the oxide layer on the first surface and the second surface of the support plate base 1300 counteracts each other. After the oxide layer is removed from the position at which the local plating 138 is disposed on the first surface, the second surface of the support plate base 1300 has relatively large tensile stress. Therefore, a protrusion may occur at the position at which the local plating 138 is disposed on the second surface of the support plate base 1300. In addition, the local plating 138 on the first surface may introduce pull stress, to increase a protrusion degree at the position corresponding to the local plating 138 on the second surface. Therefore, the third groove 1392 may be disposed on the second surface. Processing the third groove 1392 may remove a part of the oxide layer from the second surface and reduce residual tensile stress on the second surface. In addition, processing the third groove 1392 further helps counteract protrusion deformation caused by the local plating 138.

The depth $L_1$ of the third groove 1392 may be related to a thickness of the local plating 138. A larger thickness of the local plating 138 indicates a larger depth $L_1$ of the third groove 1392. In an example, a proportion of the depth $L_1$ of the third groove 1392 to the thickness of the local plating 138 may be, for example, 0.2 to 0.7, such as 0.25 to 0.5. For example, the thickness of the local plating 138 is 5 μm, and the depth $L_1$ of the third groove 1392 is 2 μm. For another example, the thickness of the local plating 138 is 10 μm, and the depth $L_1$ of the third groove 1392 is 3-4 μm.

Figure 31:
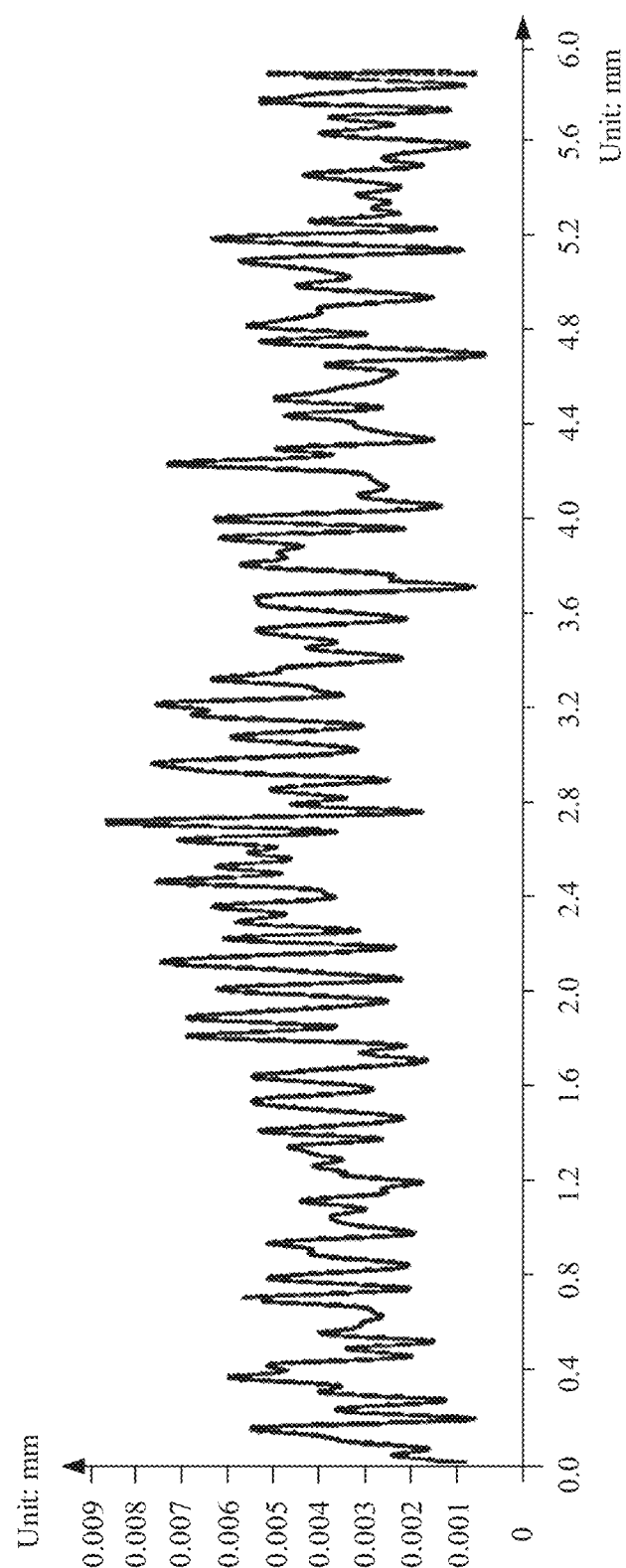
FIG. 31 is a schematic diagram of a surface profile of a support plate base according to an embodiment of this application.

FIG. 30 shows protrusion data when the third groove 1392 is not processed on the second surface. The height of the protrusion may be up to 0.008-0.012 mm. In the screen-off state, the user may observe the protrusion on the second surface through the flexible display 110. FIG. 31 shows protrusion data when the third groove 1392 is processed on the second surface. The height of the protrusion may be up to 0.003-0.007 mm.

In addition, the depth $L_1$ of the third groove 1392 may be slightly smaller than the maximum protrusion height shown in FIG. 30. Because the protrusion is a gradient protrusion and a material is uniformly removed during etching, the depth $L_1$ of the third groove 1392 may be slightly smaller than the maximum protrusion height shown in FIG. 30 to avoid processing a sharp angle or a tapered groove on the second surface.

In conclusion, the third groove 1392 is processed on the second surface. This helps balance internal stress of the support plate base 1300, and further helps improve flatness of the second surface and flatness of the flexible display 110.

The following describes a process for processing the local plating 138 provided in this embodiment of this application.

First, pressure preservation and annealing are performed on the sliced support plate base 1300.

For example, before the slicing process, a support plate raw material may be processed through a process such as hot rolling or cold rolling. Internal stress of the support plate raw material may be relatively large. The internal stress of the support plate base 1300 can be reduced through annealing.

Then, a region in which the local plating 138 does not need to be disposed is coated with ink, and exposed and developed.

In other words, the region in which the local plating 138 does not need to be disposed is covered. The ink may be, for example, epoxy resin.

Then, the support plate base 1300 is etched to form the fourth groove 1391 and the third groove 1392.

For example, after the annealing process, an oxide layer is easily formed on a surface of the support plate base 1300. If the local plating 138 is directly disposed on the oxide layer, a bonding force between the local plating 138 and the support plate base 1300 may be reduced. Oxide on the surface of the support plate base 1300 may be removed through the etching process. The process of removing the oxide may also be referred to as a surface activation process.

To improve surface roughness of the support plate base 1300, surface activation may be performed on the support plate base 1300 for a plurality of times. For example, in a first surface activation process, mixed acid containing hydrofluoric acid HF may be used to roughly remove materials on the first surface and the second surface and form the third groove 1392 shown in FIG. 29 on the second surface. In a second surface activation process, mixed acid containing nitric acid HNO3 may be used to remove the material on the first surface with medium precision. The material on the first surface is continuously removed through degreasing and electrolysis. The material on the first surface is further removed through low-concentration hydrofluoric acid HF, and the fourth groove 1391 shown in FIG. 29 is formed on the second surface.

Then, the nickel plating 1381 is electroplated in the fourth groove 1391, the nickel sulfamate plating 1382 is electroplated on a surface that is of the nickel plating 1381 and that is away from the support plate base 1300, and the gold plating 1383 is electroplated on a surface that is of the nickel sulfamate plating 1382 and that is away from the support plate base 1300.

The nickel plating 1381 may be configured to strengthen a bonding force between the support plate base 1300 and the nickel sulfamate plating 1382. Internal stress of the nickel sulfamate plating 1382 is usually relatively small. This helps improve mechanical stability of the local plating 138. The gold plating 1383 features good electrical conductivity and good abrasion resistance. Because the gold plating 1383 has good electrical conductivity, impedance of the local plating 138 is relatively small (for example, may be reduced to 0.1-0.2 ohm), and relatively small pressure is required for a spring plate to press against the local plating 138. Therefore, a deformation degree of the support plate base 1300 near the local plating 138 is relatively small. This helps improve the flatness of the flexible display 110. In addition, reducing the impedance further helps reduce an RSE value of the foldable electronic device 100. In addition, because the gold plating 1383 has good abrasion resistance, fine shaking between the spring plate and the gold plating 1383 is not easy to generate powder. This helps improve stability of the local plating 138.

Then, the ink on the surface of the support plate base 1300 is removed, and the support plate base 1300 is baked at a medium temperature in a vacuum.

The baking at the medium temperature in the vacuum helps increase a covalent bonding force between the support plate base 1300 and the local plating 138. For example, the bonding force between the local plating 138 and the support plate base 1300 is at least 4 B. In other words, in a plating adhesion test, a proportion of the composite plating shown in 28 being torn off is less than 5%.

As described above, the foldable support plate 130 shown in FIG. 20 may be obtained. Then, with reference to the example shown in FIG. 8, the foldable support plate 130 and the flexible display 110 may be pasted together through polyurethane (polyurethane. PU) foam to obtain the flexible display module 200 shown in FIG. 19. Then, the flexible display module 200 shown in FIG. 19 is assembled with the housing of the foldable electronic device 100 to obtain the foldable electronic device 100 shown in FIG. 1 to FIG. 3.

Figure 32:
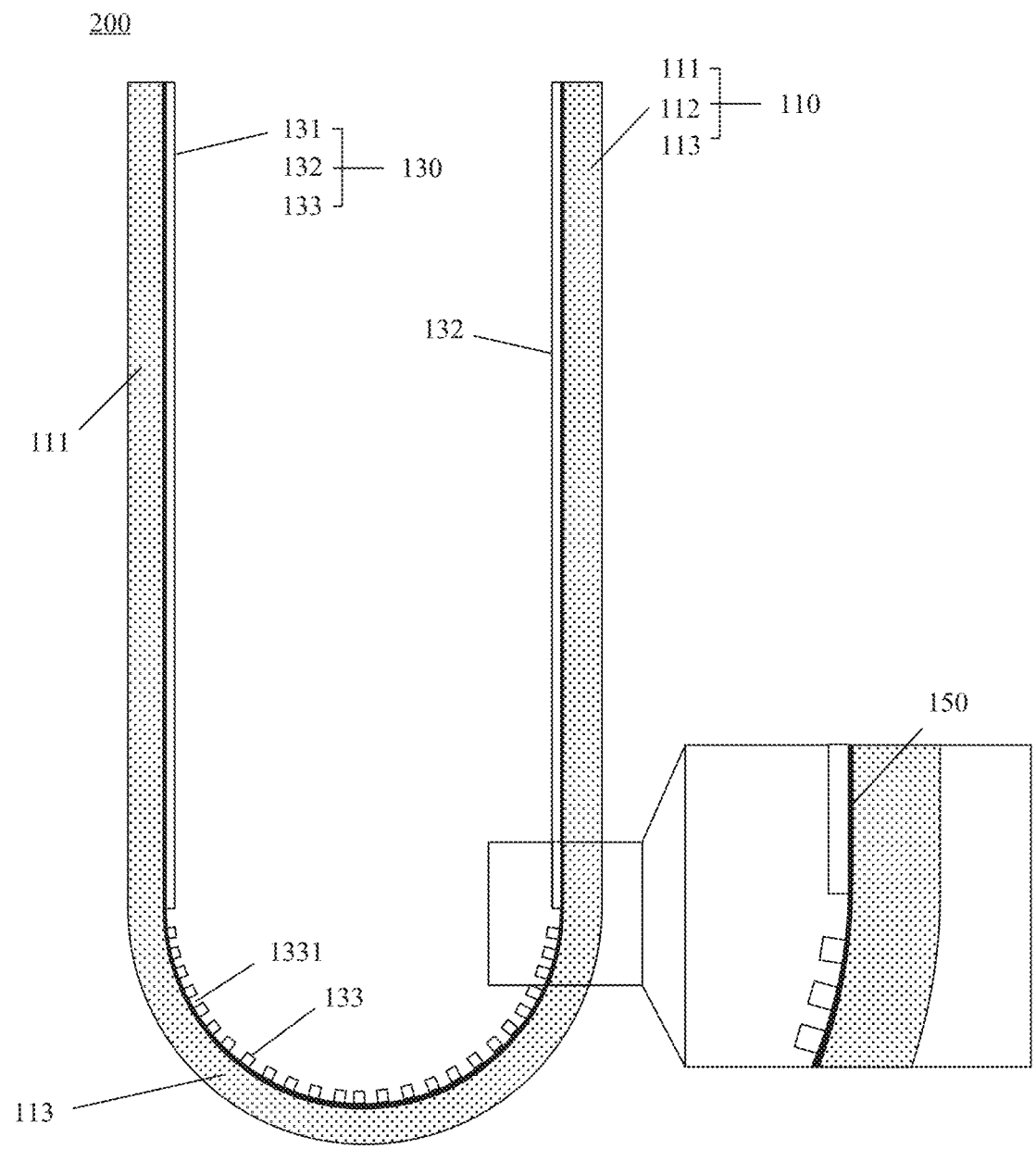
FIG. 32 is a schematic diagram of a structure of another flexible display module according to an embodiment of this application.

FIG. 32 is a schematic diagram of a structure of another flexible display module 200 according to an embodiment of this application. Different from the flexible display module 200 shown in FIG. 19, the flexible display module 200 shown in FIG. 32 may be in an outward folded state.

The flexible display module 200 may include a flexible display 110 and a foldable support plate 130. The flexible display 110 may include a first display portion 111, a second display portion 112, and a foldable display portion 113. The foldable display portion 113 may be connected between the first display portion 111 and the second display portion 112. The foldable support plate 130 may include a first support portion 131, a second support portion 132, and a foldable support portion 133. The foldable support portion 133 may be connected between the first support portion 131 and the second support portion 132. Through an adhesive layer (for example, foam or mesh adhesive), the first support portion 131 may be pasted to the first display portion 111, the second support portion 132 may be pasted to the second display portion 112, and the foldable support portion 133 may be pasted to the foldable display portion 113.

In an example, the flexible display module 200 may further include a metal layer 150. The metal layer 150 may be located between the flexible display 110 and the foldable support plate 130. For example, the metal layer 150 may be attached to the first support portion 131, the second support portion 132, and the foldable support portion 133 of the foldable support plate 130. The flexible display 110 may be pasted to the metal layer 150 through an adhesive layer. For another example, the metal layer 150 may be attached to the first display portion 111, the second display portion 112, and the foldable display portion 113 of the flexible display 110. The foldable support plate 130 may be pasted to the metal layer 150 through an adhesive layer.

A thickness of the metal layer 150 is, for example, 0.01-0.08 mm, such as 0.02-0.05 mm. A material of the metal layer 150 may have relatively high strength. The material of the metal layer 150 may be, for example, high-strength stainless steel (for example, sus301-EH), high-strength titanium and titanium alloy (for example, TA4/TC4), or high-strength nickel-titanium (Ni—Ti) memory alloy.

Similar to the examples shown in FIG. 19 to FIG. 31, the foldable support plate 130 shown in FIG. 32 may include the support plate base 1300 shown in FIG. 20 to FIG. 22, the through grooves 1331 shown in FIG. 19 and FIG. 23A to FIG. 28, and the local plating 138 shown in FIG. 29 to FIG. 31. The support plate base 1300 may correspond to the first support portion 131, the second support portion 132, and the foldable support portion 133 of the foldable support plate 130. The through grooves 1331 may be disposed in the foldable support portion 133. The local plating 138 may be disposed on the first support portion 131 and the second support portion 132. For specific descriptions of the foldable support plate 130, reference may be made to the examples shown in FIG. 19 to FIG. 31. Details are not described herein again.

In embodiments of this application, a plurality of design solutions for the foldable support plate 130 help improve the mechanical performance, electrical connection performance, and radio frequency performance of the foldable support plate 130, improve the flatness of the flexible display 110, reduce the weight of the foldable electronic device 100, and prolong the service life of the foldable electronic device 100. In other words, when the weight of the foldable electronic device 100 is reduced, the solutions provided in embodiments of this application further help improve the comprehensive performance of the foldable electronic device 100.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A foldable support plate, wherein the foldable support plate is attachable to a flexible display, and the foldable support plate comprises:
    a first support portion, wherein when the foldable support plate is folded, the first support portion is in a flat state;
    a foldable support portion, wherein the foldable support portion is in a bent state when the foldable support plate is folded, and the foldable support portion is provided with a plurality of through grooves;
    a first transition support portion, wherein the first transition support portion is connected between the first support portion and the foldable support portion, a bending radian of the first transition support portion is less than a bending radian of the foldable support portion when the foldable support plate is folded, and the first transition support portion is provided with a plurality of groove structures; and
    a local plating disposed on one side of the foldable support plate.

2. The foldable support plate of claim 1, wherein the plurality of groove structures are blind grooves or through grooves.

3. The foldable support plate of claim 2, wherein the through grooves comprise a first groove and a second groove connected with each other, and a depth of the first groove is less than a depth of the second groove.

4. The foldable support plate of claim 1, wherein the foldable support plate further comprises a third groove, and the local plating and the third groove are disposed opposite to each other on two sides of the foldable support plate.

5. The foldable support plate of claim 4, wherein a width of the third groove is greater than a width of the local plating.

6. The foldable support plate of claim 1, wherein the foldable support plate further comprises:
    a third transition support portion, wherein the third transition support portion is connected between the first transition support portion and the foldable support portion, and when the foldable support plate is folded:
    the third transition support portion is in the flat state; or
    the third transition support portion is in the bent state, and a bending radian of the third transition support portion is less than the bending radian of the first transition support portion and the bending radian of the foldable support portion.

7. The foldable support plate of claim 1, wherein the foldable support plate further comprises:
    a second support portion, wherein the second support portion and the first support portion are located on two sides of the foldable support portion, the second support portion is in the flat state when the foldable support plate is folded, and the second support portion and the first support portion are disposed in parallel.

8. The foldable support plate of claim 1, wherein the local plating is disposed on the one side of the foldable support plate which is away from the flexible display.

9. The foldable support plate of claim 1, wherein the local plating is a composite plating comprising nickel plating and silver plating.

10. A flexible display module, comprising a flexible display and a foldable support plate, wherein the flexible display is attached to the foldable support plate;
    wherein the foldable support plate comprises:
        a first support portion, wherein when the foldable support plate is folded, the first support portion is in a flat state;
        a foldable support portion, wherein, the foldable support portion is in a bent state when the foldable support plate is folded, and the foldable support portion is provided with a plurality of through grooves;
        a first transition support portion, wherein the first transition support portion is connected between the first support portion and the foldable support portion, a bending radian of the first transition support portion is less than a bending radian of the foldable support portion when the foldable support plate is folded, and the first transition support portion is provided with a plurality of groove structures; and
        a local plating disposed on one side of the foldable support plate.

11. The flexible display module of claim 10, wherein the plurality of groove structures are blind grooves or through grooves.

12. The flexible display module of claim 11, wherein the through grooves comprise a first groove and a second groove connected with each other, and a depth of the first groove is less than a depth of the second groove.

13. The flexible display module of claim 10, wherein the foldable support plate further comprises a third groove, and the local plating and the third groove are disposed opposite to each other on two sides of the foldable support plate.

14. The flexible display module of claim 13, wherein a width of the third groove is greater than a width of the local plating.

15. The flexible display module of claim 10, wherein the foldable support plate further comprises:
    a third transition support portion, wherein the third transition support portion is connected between the first transition support portion and the foldable support portion, and when the foldable support plate is folded:
    the third transition support portion is in the flat state; or
    the third transition support portion is in the bent state, and a bending radian of the third transition support portion is less than the bending radian of the first transition support portion and the bending radian of the foldable support portion.

16. The flexible display module of claim 10, wherein the foldable support plate further comprises:

a second support portion, wherein the second support portion and the first support portion are located on two sides of the foldable support portion, the second support portion is in the flat state when the foldable support plate is folded, and the second support portion and the first support portion are disposed in parallel.

17. The flexible display module of claim 10, wherein the local plating is disposed on the one side of the foldable support plate which is away from the flexible display.

18. The flexible display module of claim 10, wherein the local plating is a composite plating comprising nickel plating and silver plating.

19. A foldable electronic device, comprising a flexible display and a foldable support plate, wherein the flexible display is attached to the foldable support plate;
wherein the foldable support plate comprises:
a first support portion, wherein when the foldable support plate is folded, the first support portion is in a flat state;
a foldable support portion, wherein, the foldable support portion is in a bent state when the foldable support plate is folded, and the foldable support portion is provided with a plurality of through grooves; and
a first transition support portion, wherein the first transition support portion is connected between the first support portion and the foldable support portion, a bending radian of the first transition support portion is less than a bending radian of the foldable support portion when the foldable support plate is folded, and the first transition support portion is provided with a plurality of groove structures; and
a local plating disposed on one side of the foldable support plate.

20. The foldable electronic device of claim 19, wherein the plurality of groove structures are blind grooves or through grooves.

21. The foldable electronic device of claim 19, wherein the foldable support plate further comprises a third groove, and the local plating and the third groove are disposed opposite to each other on two sides of the foldable support plate.

22. The foldable electronic device of claim 19, wherein the foldable support plate further comprises:
a third transition support portion, wherein the third transition support portion is connected between the first transition support portion and the foldable support portion, and when the foldable support plate is folded:
the third transition support portion is in the flat state; or
the third transition support portion is in the bent state, and a bending radian of the third transition support portion is less than the bending radian of the first transition support portion and the bending radian of the foldable support portion.

23. The foldable electronic device of claim 19, wherein the foldable support plate further comprises:
a second support portion, wherein the second support portion and the first support portion are located on two sides of the foldable support portion, the second support portion is in the flat state when the foldable support plate is folded, and the second support portion and the first support portion are disposed in parallel.

24. The foldable electronic device of claim 19, wherein the through grooves comprise a first groove and a second groove connected with each other, and a depth of the first groove is less than a depth of the second groove.

25. The foldable electronic device of claim 19, wherein the local plating is disposed on the one side of the foldable support plate which is away from the flexible display.

26. The foldable electronic device of claim 19, wherein the local plating is a composite plating comprising nickel plating and silver plating.

* * * * *